(12) United States Patent  
Knapp et al.

(10) Patent No.: US 7,516,177 B2  
(45) Date of Patent: Apr. 7, 2009

(54) APPARATUS FOR DISTRIBUTING CONTENT OBJECTS TO A PERSONALIZED ACCESS POINT OF A USER OVER A NETWORK-BASED ENVIRONMENT AND METHOD

(75) Inventors: John R. Knapp, Seattle, WA (US); Edward K. E. Snyders, Seattle, WA (US)

(73) Assignee: Botalini Tera AB, L.L.C., Dover, DE (US)

( * ) Notice: Subject to any disclaimer, the term of this patent is extended or adjusted under 35 U.S.C. 154(b) by 825 days.

(21) Appl. No.: 10/879,640

(22) Filed: Jun. 28, 2004

(65) Prior Publication Data

US 2005/0021611 A1 Jan. 27, 2005

Related U.S. Application Data

(63) Continuation of application No. 09/569,361, filed on May 11, 2000, now Pat. No. 6,769,010.

(51) Int. Cl.
*G06F 15/16* (2006.01)
*G06F 12/00* (2006.01)
(52) U.S. Cl. ...................... 709/203; 709/217
(58) Field of Classification Search .............. 709/203, 709/205, 218, 225, 226, 227, 217; 707/10
See application file for complete search history.

(56) References Cited

U.S. PATENT DOCUMENTS

| 6,769,010 | B1 * | 7/2004 | Knapp et al. ............... 709/203 |
| 6,898,706 | B1 * | 5/2005 | Venkatesan et al. ......... 713/167 |
| 7,137,126 | B1 * | 11/2006 | Coffman et al. ............ 719/328 |
| 7,181,417 | B1 * | 2/2007 | Langseth et al. ............ 705/26 |

* cited by examiner

*Primary Examiner*—Zarni Maung
(74) *Attorney, Agent, or Firm*—Workman Nydegger

(57) ABSTRACT

An apparatus is provided for distributing content objects to a personalized access point of a user over a network-based environment. The apparatus includes a server, a selection client, and a retrieval client. The server includes a database operative to store indicia associated with at least one content object and further operative to store user identifiers as well as information about which content objects have been selected by a particular user. The selection client communicates with the server via a communication link. The selection client is configured to allow a user to select content objects to add to a personalized access point by submitting an indicia and a user identifier to the server. The retrieval client communicates with the server over a communication link allowing a user to retrieve information from a personalized access point. In response to the submission of the indicia and user identifier, at least one of: (a) a content object, and (b) a link to a content object are added to the personalized access point of the particular user and the particular user can retrieve the content object through the personalized access point from the retrieval client. A method is also provided.

20 Claims, 60 Drawing Sheets

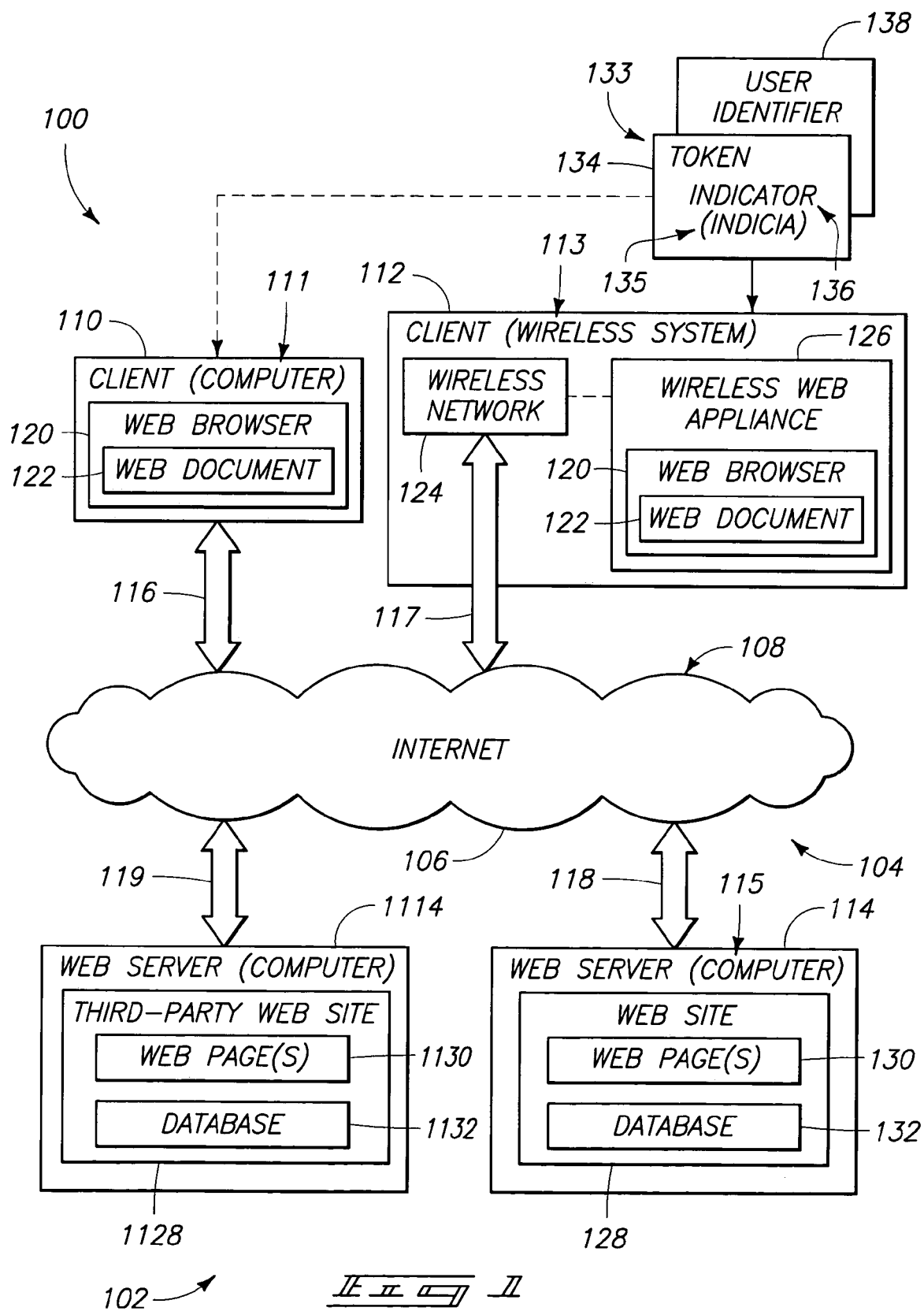

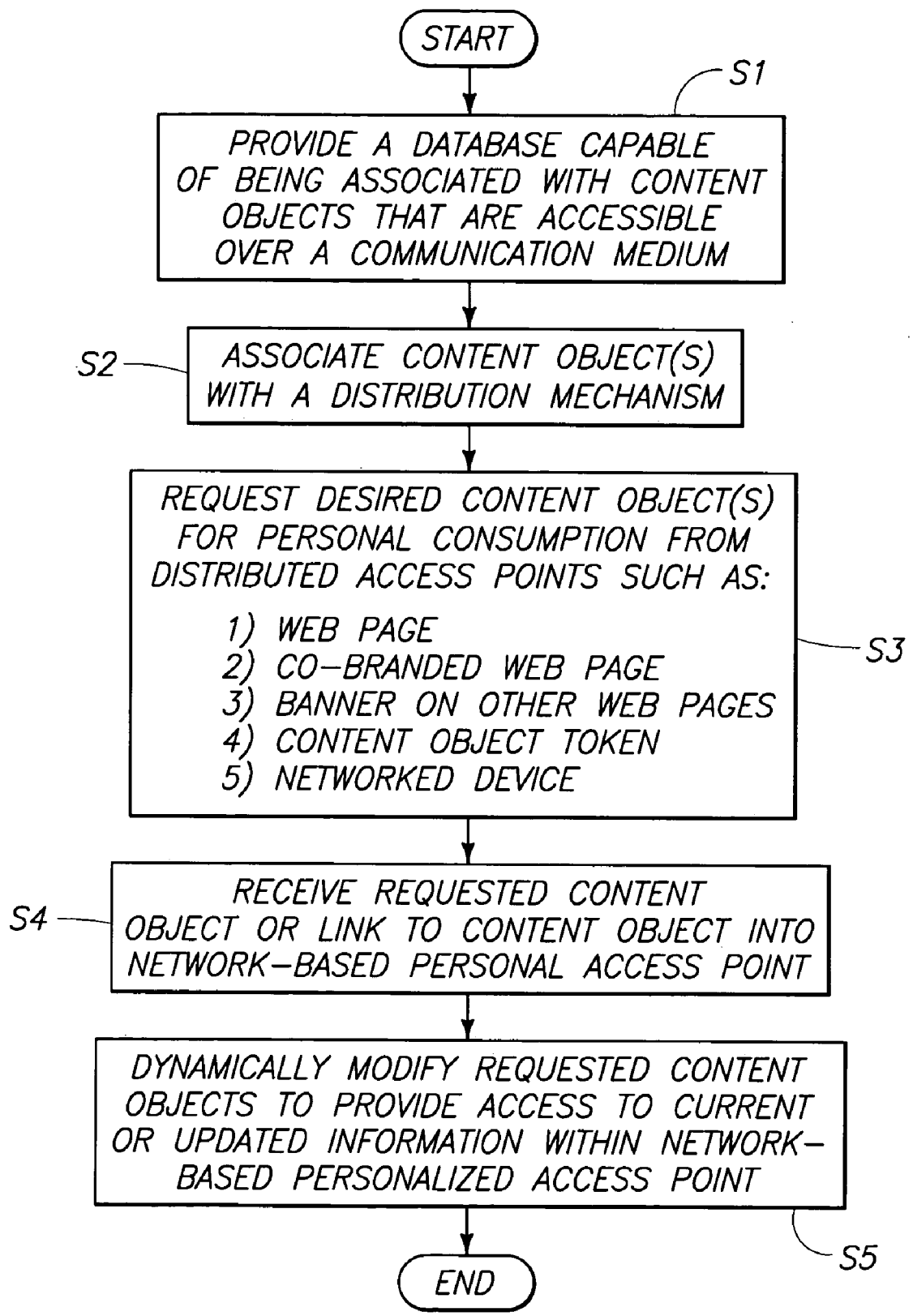

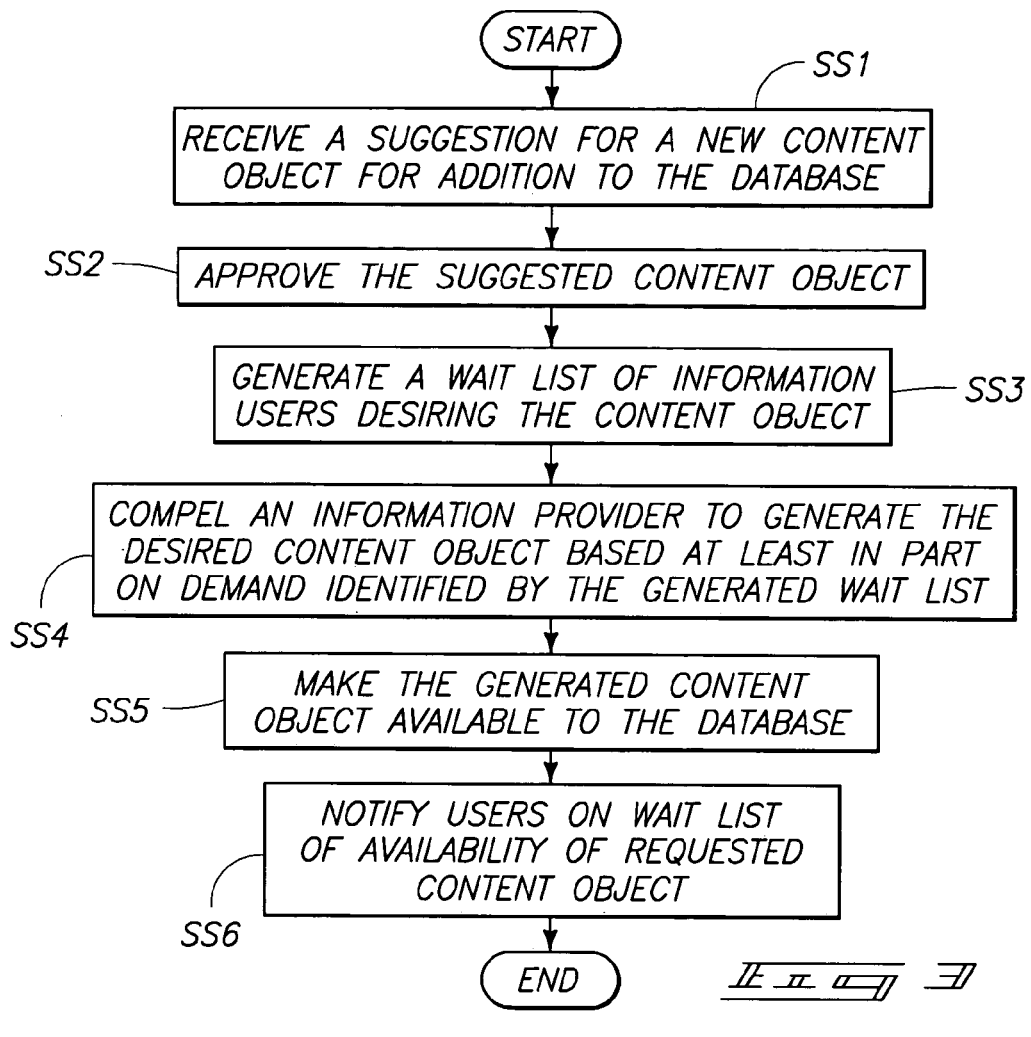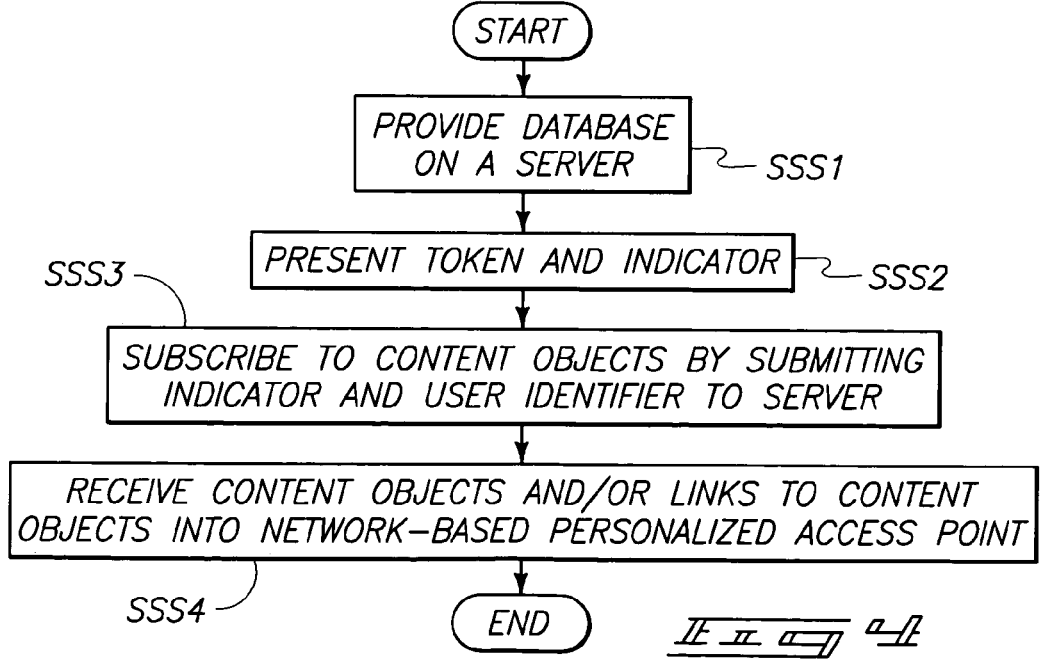

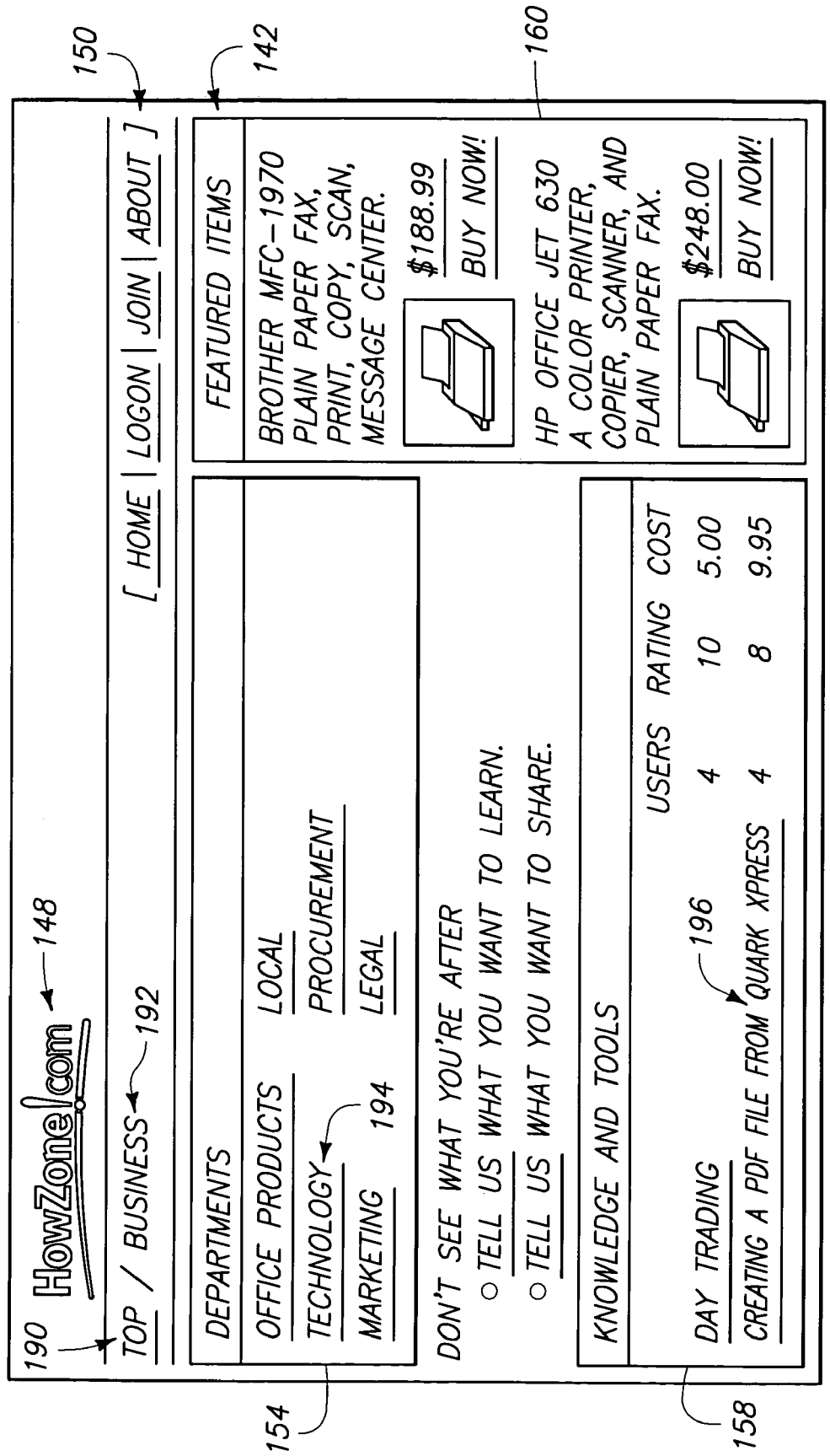

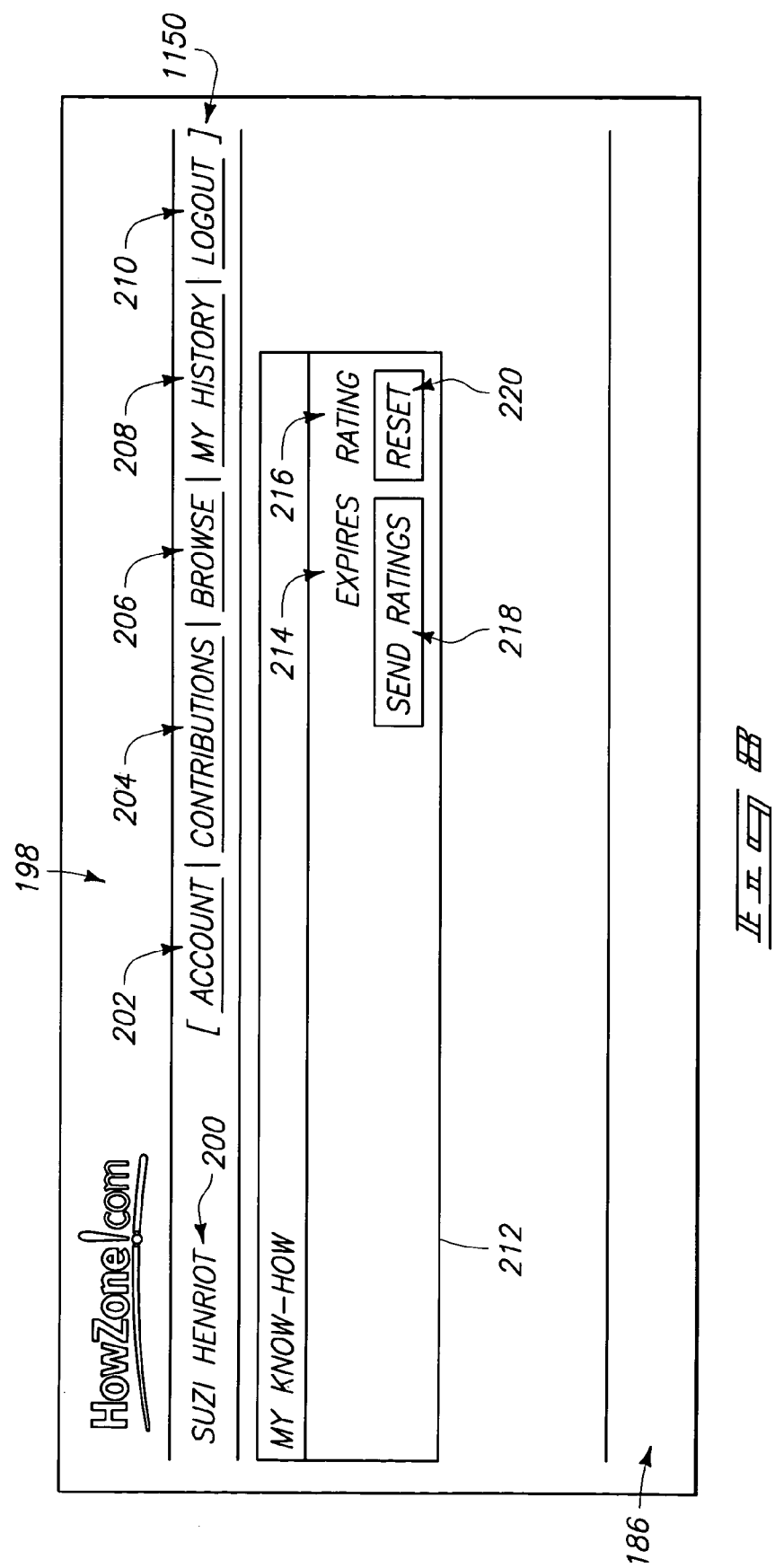

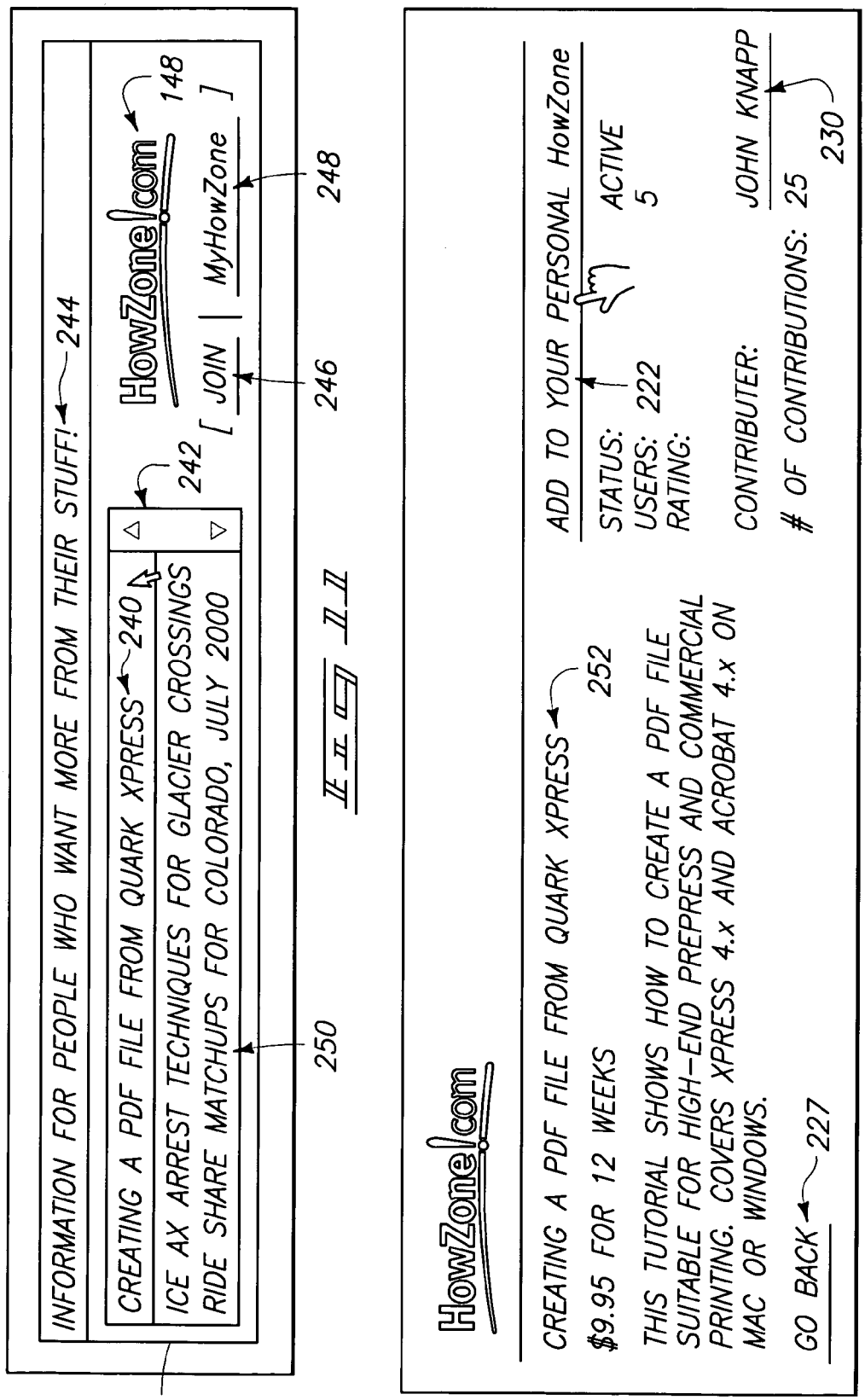

HowZone.com

PERSONALIZED FOR JOHN KNAPP [ ACCOUNT | CONTRIBUTIONS | BROWSE | MY HISTORY | LOGOUT ]

MY KNOW-HOW

| | EXPIRES | RATING |
|---|---|---|
| WIRELESS PHONE SERVICE COMPARISONS [ MORE ] | 2000-05-18 | 10 ▷ |
| WHAT IS A WIRELESS LAN? [ MORE ] | 2000-03-03 | 10 ▷ |
| PALM PILOT HANDBOOK (PDF) [ MORE ] | 2000-05-18 | 6 ▷ |
| WIRELESS PHONE COMPARISONS [ MORE ] | 2000-05-18 | 5 ▷ |
| CHOOSING WIRELESS LAN PRODUCTS [ MORE ] | 2000-03-03 | 4 ▷ |
| CREATING A PDF FILE FROM QUARK XPRESS [ MORE ] | 2000-05-19 | 3 ▷ |
| BENEFITS OF A WIRELESS LAN [ MORE ] | 2000-03-03 | 1 ▷ |
| | SEND RATINGS | RESET |

FIG 15

HowZone.com

[ HOME | LOGON | JOIN | ABOUT ]

TOP/BUSINESS

DEPARTMENTS — 154

OFFICE PRODUCTS

LOCAL

TECHNOLOGY

PROCUREMENT

MARKETING

LEGAL

— 158

FEATURED ITEMS — 142

BROTHER MFC-1970 PLAIN PAPER FAX, PRINT, COPY, SCAN, MESSAGE CENTER.   $188.99   BUY NOW!

HP OFFICE JET 630 A COLOR PRINTER, COPIER, SCANNER, AND PLAIN PAPER FAX.   $248.00   BUY NOW!

KNOWLEDGE AND TOOLS

| | USERS | RATING | COST |
|---|---|---|---|
| CREATING A PDF FILE FROM QUARK XPRESS — 196 | 5 | 9 | 9.95 |
| DAY TRADING | 4 — 180 | 8 — 182 | 5.00 — 184 |
| TUTORIAL FOR WAILERS | 0 | 0 | 0.00 |

FIG. 16

HowZone!com

CREATING A PDF FILE FROM QUARK XPRESS $9.95 FOR 12 WEEKS

THIS TUTORIAL SHOWS HOW TO CREATE A PDF FILE SUITABLE FOR HIGH-END PREPRESS AND COMMERCIAL PRINTING. COVERS XPRESS 4.x AND ACROBAT 4.x ON MAC OR WINDOWS.

GO BACK ←— 227

ADD TO YOUR PERSONAL HOWZONE

STATUS: ACTIVE
USERS: 222  5  ←— 230
RATING: 9

CONTRIBUTOR: JOHN KNAPP

OF CONTRIBUTIONS: 25

FIG. 17

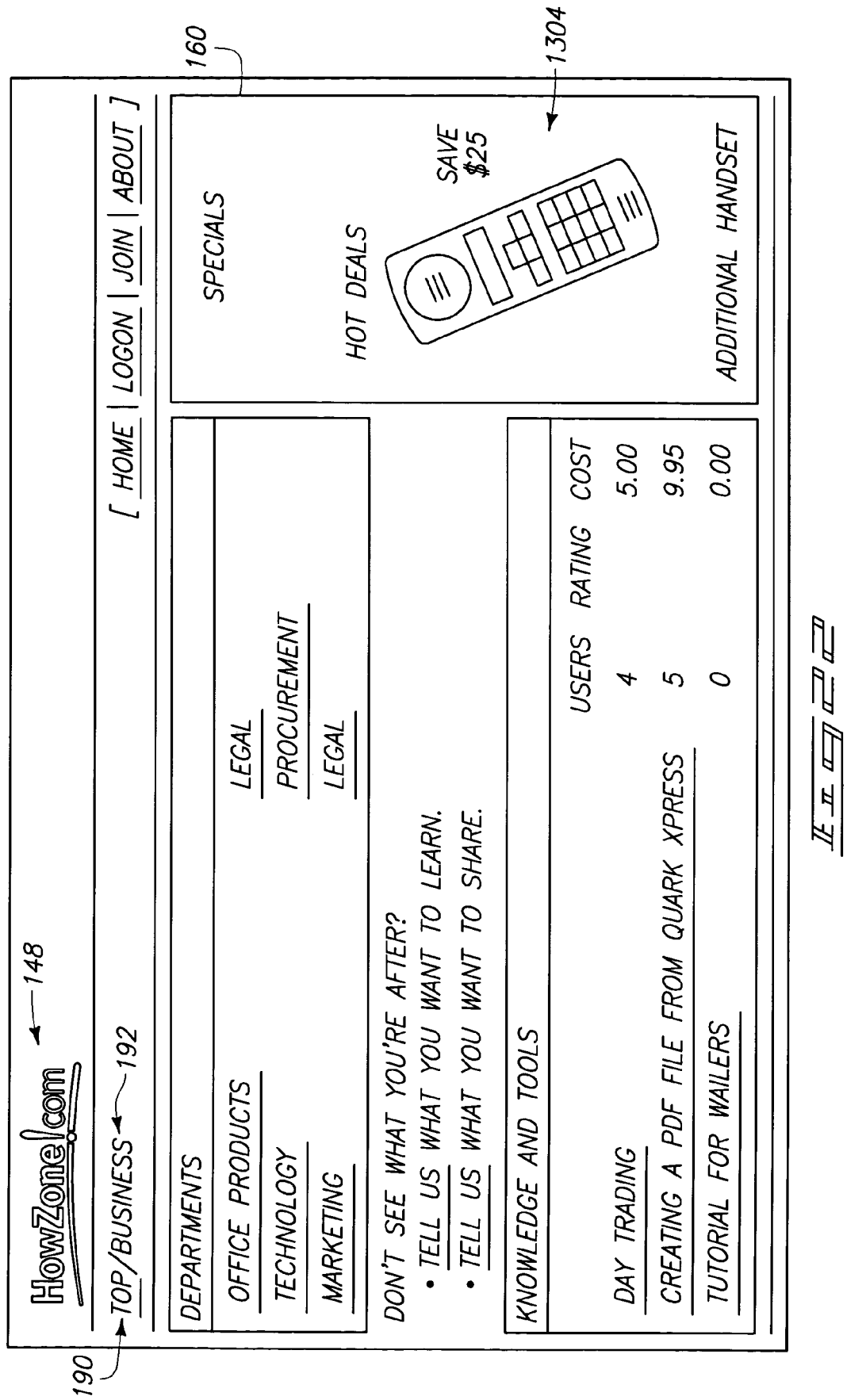

ABC OFFICE PRODUCTS —1148

BUSINESS —192        [ HOME | LOGON | JOIN | ABOUT ]—150

DEPARTMENTS

OFFICE PRODUCTS
TECHNOLOGY
MARKETING

FEATURED ITEMS —160

BROTHER MFC-1970 PLAIN PAPER FAX, PRINT, COPY, SCAN, MESSAGE CENTER.     $188.99  BUY NOW!

HP OFFICE JET 630 A COLOR PRINTER, COPIER, SCANNER, AND PLAIN PAPER FAX.     $248.00  BUY NOW! —304

DON'T SEE WHAT YOU'RE AFTER?
- TELL US WHAT YOU WANT TO LEARN.
- TELL US WHAT YOU WANT TO SHARE.

LEGAL
PROCUREMENT
LEGAL

KNOWLEDGE AND TOOLS

|  | USERS RATING | COST |
|---|---|---|
| DAY TRADING | 4 | 5.00 |
| CREATING A PDF FILE FROM QUARK XPRESS | 5 | 9.95 |
| TUTORIAL FOR WAILERS | 0 | 0.00 |

POWERED BY HOWZONE.COM

FIG. 23

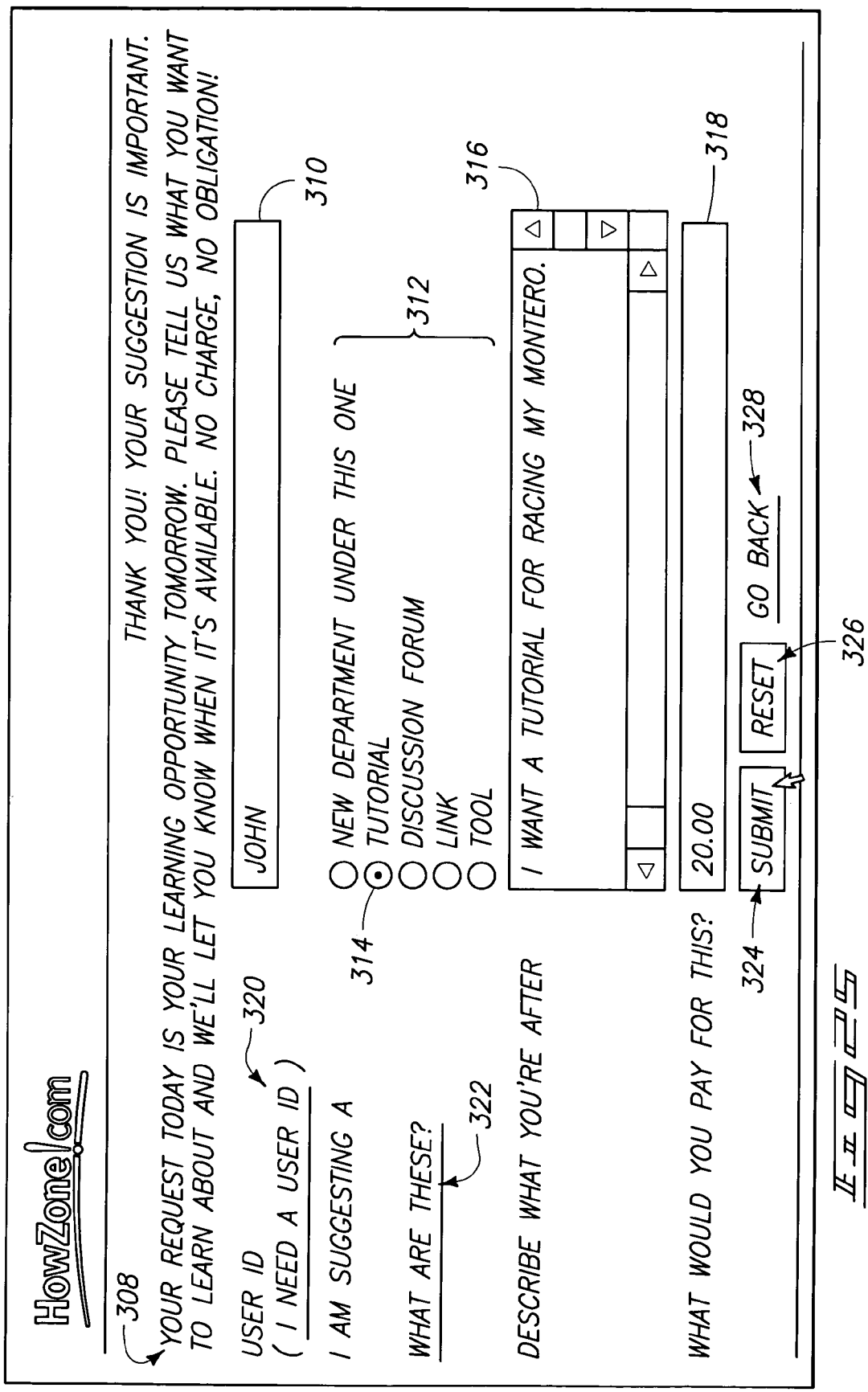

HowZone!com

330

EDIT CONTRIBUTION:

| | | |
|---|---|---|
| CONTRIBUTOR | JOHN KNAPP — 334 | 332 |
| TYPE OF CONTRIBUTION | TUTORIAL ← 336 | 338 |
| TITLE | MITSUBISHI MONTERO RACING | |
| DESCRIPTION | HERE IS A FANTASTIC TUTORIAL FOR ANYONE WANTING TO BREAK INTO THE FASCINATING WORLD OF MONTERO RACING. | 340 |
| DEPARTMENT | AUT.RAC ▽ | 342 |
| SUGGESTED LINK | | 344 |
| SUGGESTED USER ACCESS FEE | 20.00 | 346 |
| SUGGESTED USER ACCESS DURATION | 4 (WEEKS) | 348 |
| DISPOSITION | ○ CONCEIVED<br>352 — ⊙ LISTED<br>○ DENIED | 350  358 |

354 → [ EDIT CONTRIBUTION ] [ RESET ]  GO BACK

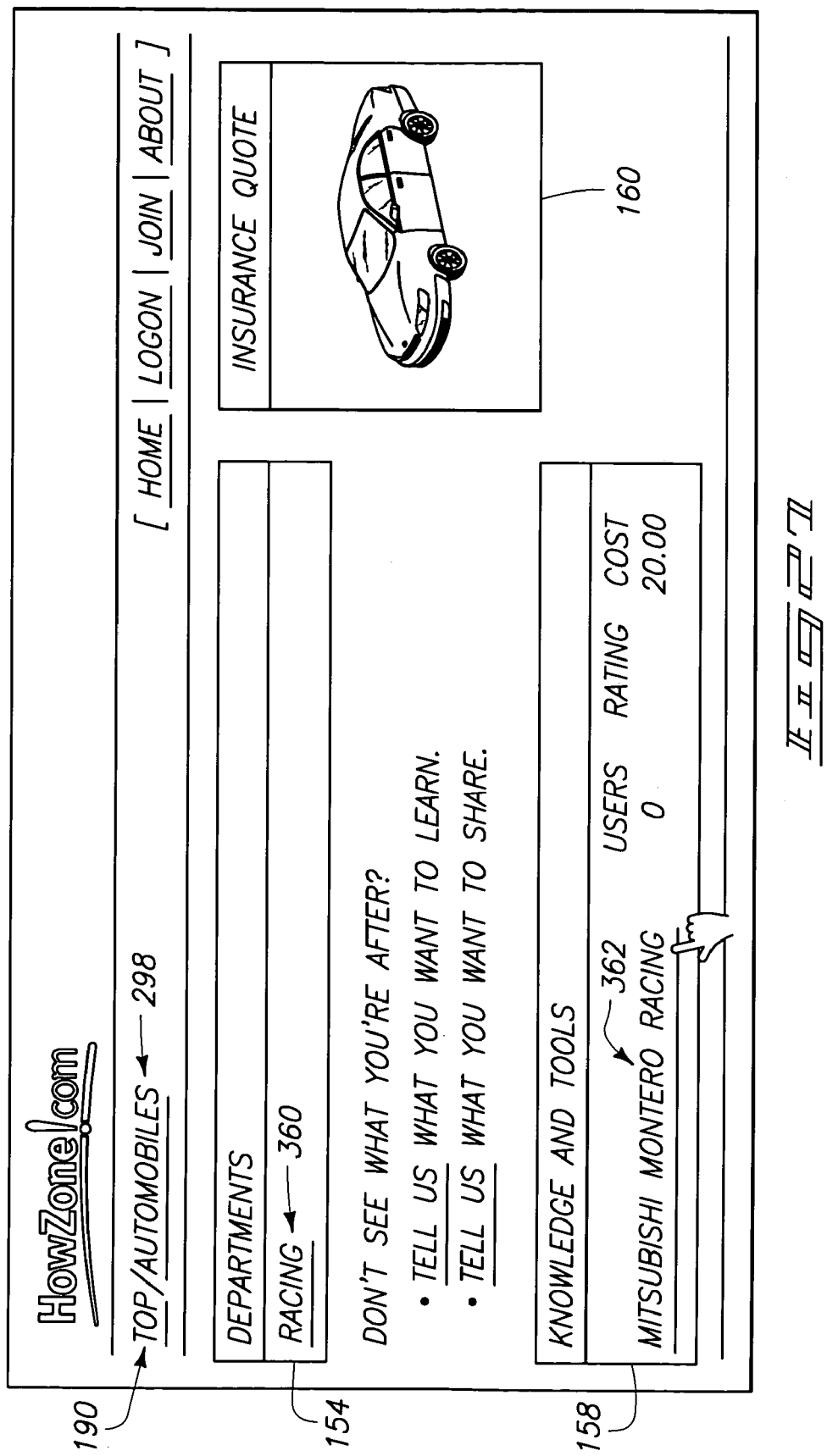

HowZone!.com

MITSUBISHI MONTERO RACING $20.00 FOR 4 WEEKS

HERE IS A FANTASTIC TUTORIAL FOR ANYONE WANTING TO BREAK INTO THE FASCINATING WORLD OF MONTERO RACING.

364

JOIN THE WAITLIST ← 366

MAKE IT HAPPEN (EARNINGS POTENTIAL $0)

368

STATUS: NEED TUTOR
USERS: 0   372
RATING: PERHAPS YOU!

CONTRIBUTOR: N/A
OF CONTRIBUTIONS:

370
GO BACK

FIG. 28

HowZone!.com

JOIN THE WAITLIST FOR MITSUBISHI MONTERO RACING

THERE IS NO COST OR OBLIGATION TO JOIN THE WAITLIST. WHEN YOU JOIN THE WAITLIST YOU ARE ASKING US TO SEND YOU AN EMAIL WHEN THE INFORMATION YOU WANT BECOMES AVAILABLE.

USER ID — 378
( I NEED A USER ID )     JOHN — 374

WHAT WOULD YOU PAY FOR THIS?     20.00 — 376

CURRENTLY ON THE WAITLIST     YOU WILL BE THE FIRST — 380

382 — SUBMIT    384 — RESET    GO BACK — 386

FIG. 29

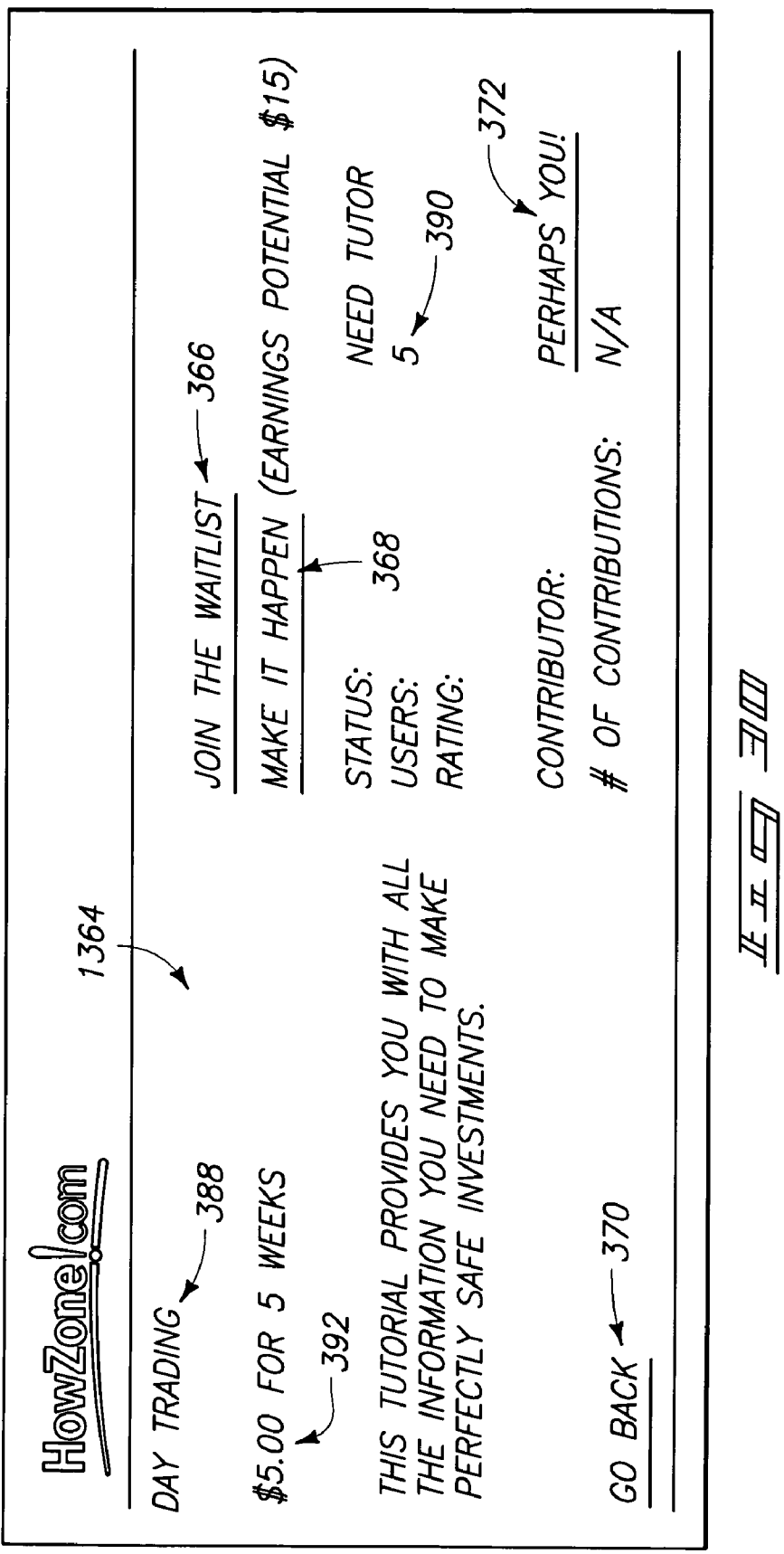

FIG. 32I

| FIG.32A |
| FIG.32B |
| FIG.32C |

HowZone!.com

CONTRIBUTE DAY TRADING TO BUSINESS
THE COST IS ONLY $5.00 FOR 5 WEEKS, 60% SHARE OF TUITION ← 394

CONTRIBUTORS MAKE IT HAPPEN! IF YOU BECOME THE CONTRIBUTOR FOR A TUTORIAL WHICH HAS AN ACCESS FEE, YOU ARE ELIGIBLE FOR A SHARE OF THOSE ACCESS FEES, INCLUDING THOSE PAID BY PEOPLE ON THE WAITLIST. IF YOU SHARE YOUR KNOWLEDGE AND YOU KNOW HTML, YOU'RE ON YOUR WAY TO MAKING A LITTLE EXTRA CASH WHILE YOU HELP OTHERS. WE CHARGE YOU TO HOST YOUR TUTORIAL ON OUR SERVERS.

USER ID ← 398
(I NEED A USER ID)

[ JOHN ] ← 390

5 ← 396

CURRENTLY ON THE WAITLIST

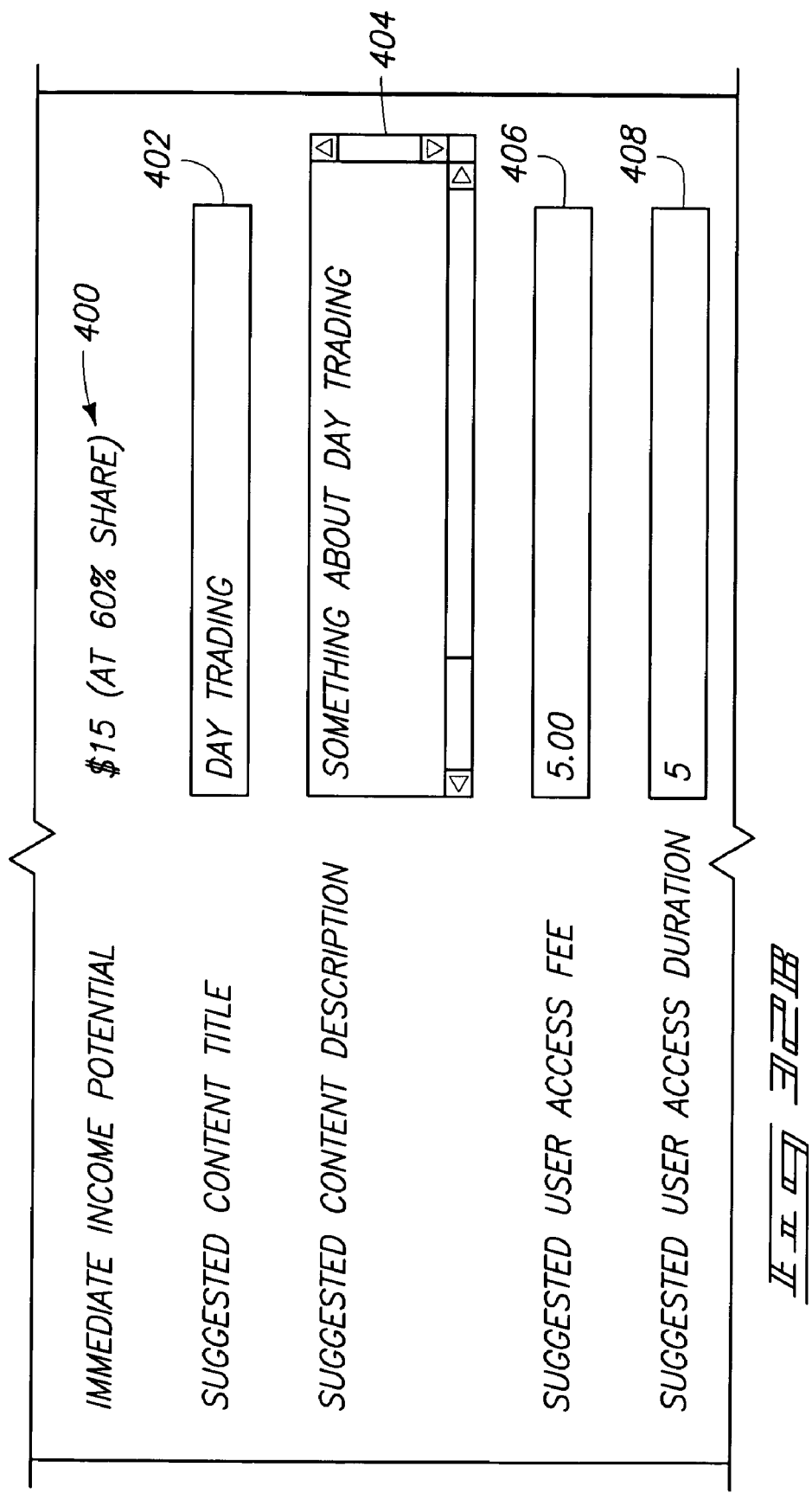

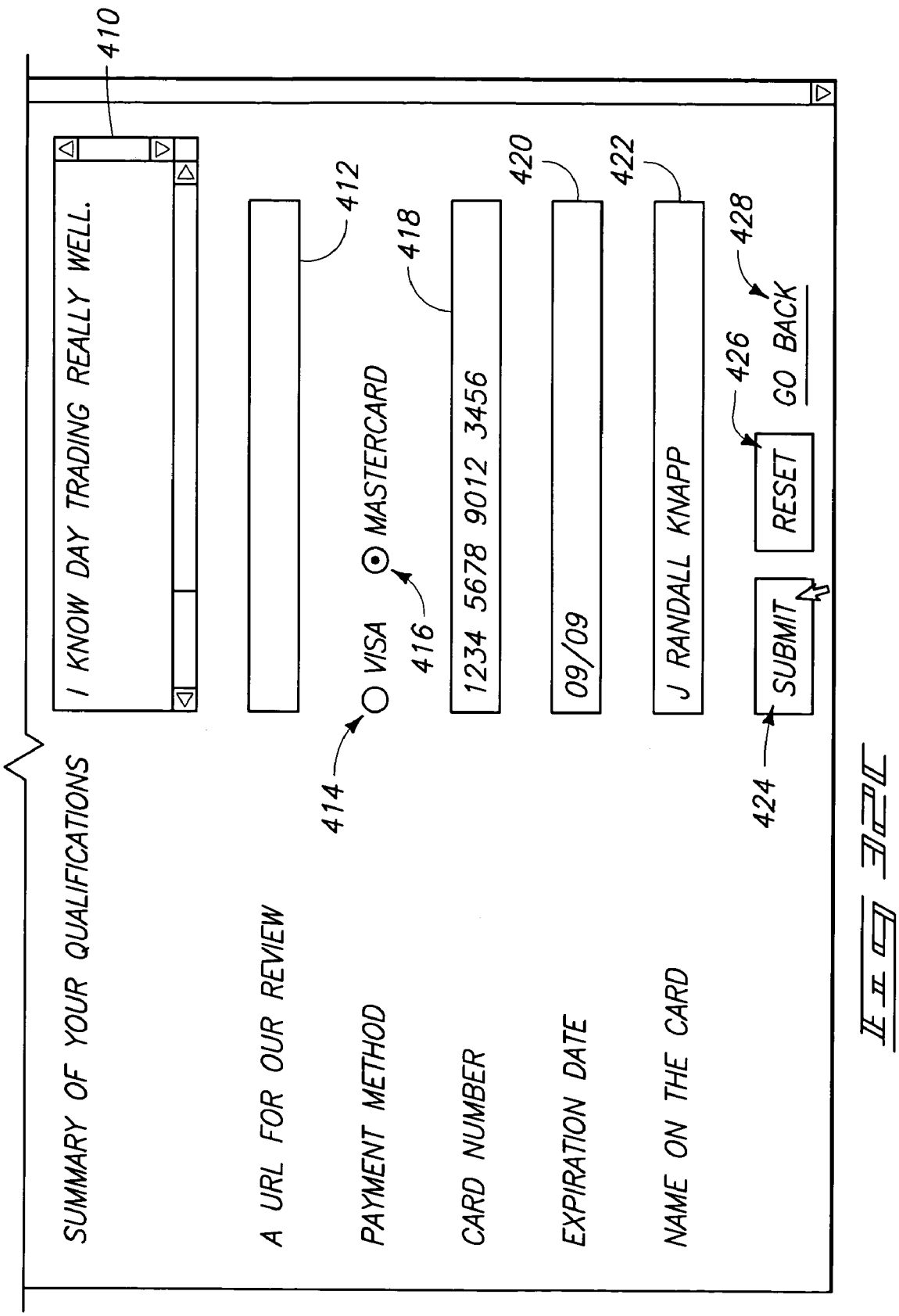

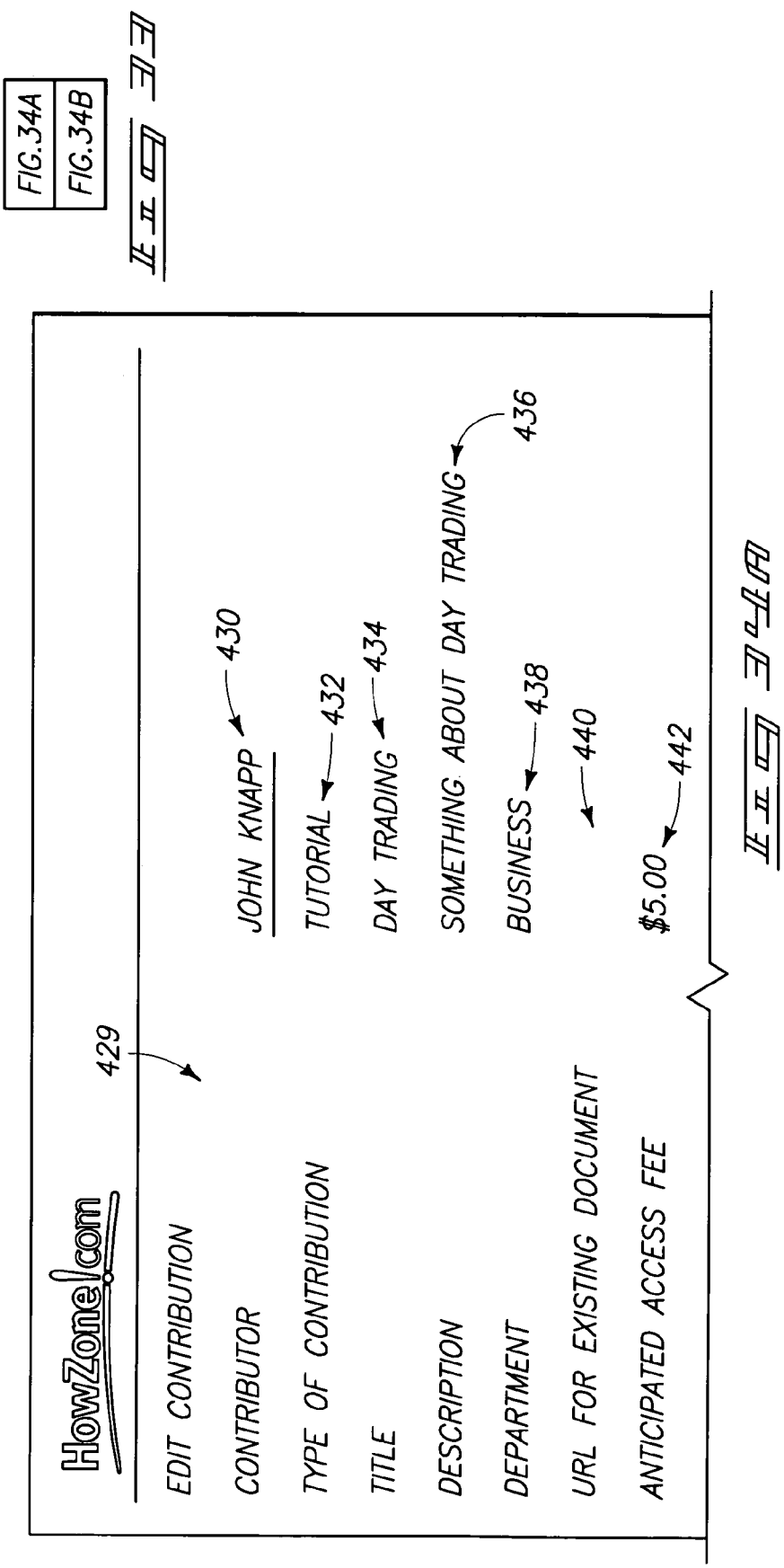

HowZone!com ←148

→ TOP/BUSINESS ←192    [ HOME | LOGON | JOIN | ABOUT ]

DEPARTMENTS

| OFFICE PRODUCTS | LOCAL |
| TECHNOLOGY | PROCUREMENT |
| MARKETING | LEGAL |

FEATURED ITEMS

BROTHER MFC-1970 PLAIN PAPER FAX, PRINT, COPY, SCAN, MESSAGE CENTER.
$188.99
BUY NOW!!

HP OFFICE JET 630 A COLOR PRINTER, COPIER, SCANNER, AND PLAIN PAPER FAX.
$248.00
BUY NOW!!

DON'T SEE WHAT YOU'RE AFTER?
• TELL US WHAT YOU WANT TO LEARN.
• TELL US WHAT YOU WANT TO SHARE.

KNOWLEDGE AND TOOLS

| | USERS RATING | COST |
|---|---|---|
| DAY TRADING | 4 | 5.00 |
| CREATING A PDF FILE FROM QUARK XPRESS | 5 | 9.95 |
| TUTORIAL FOR WAILERS | 0 | 0.00 |

FIG. 35

ABC OFFICE PRODUCTS —1148

BUSINESS —192    [ HOME | LOGON | JOIN | ABOUT ] —150

DEPARTMENTS

OFFICE PRODUCTS    LOCAL
TECHNOLOGY          PROCUREMENT
MARKETING           LEGAL

DON'T SEE WHAT YOU'RE AFTER?
- TELL US WHAT YOU WANT TO LEARN.
- TELL US WHAT YOU WANT TO SHARE.

KNOWLEDGE AND TOOLS

|  | USERS | RATING | COST |
|---|---|---|---|
| DAY TRADING | 4 |  | 5.00 |
| CREATING A PDF FILE FROM QUARK XPRESS |  | 5 | 9.95 |
| TUTORIAL FOR WAILERS | 0 |  | 0.00 |

FEATURED ITEMS —160

BROTHER MFC-1970
PLAIN PAPER FAX,
PRINT, COPY, SCAN,
MESSAGE CENTER.
$188.99
BUY NOW!

HP OFFICE JET 630
A COLOR PRINTER,
COPIER, SCANNER, AND
PLAIN PAPER FAX.
$248.00
BUY NOW!

POWERED BY HOWZONE.COM

FIG. 31G

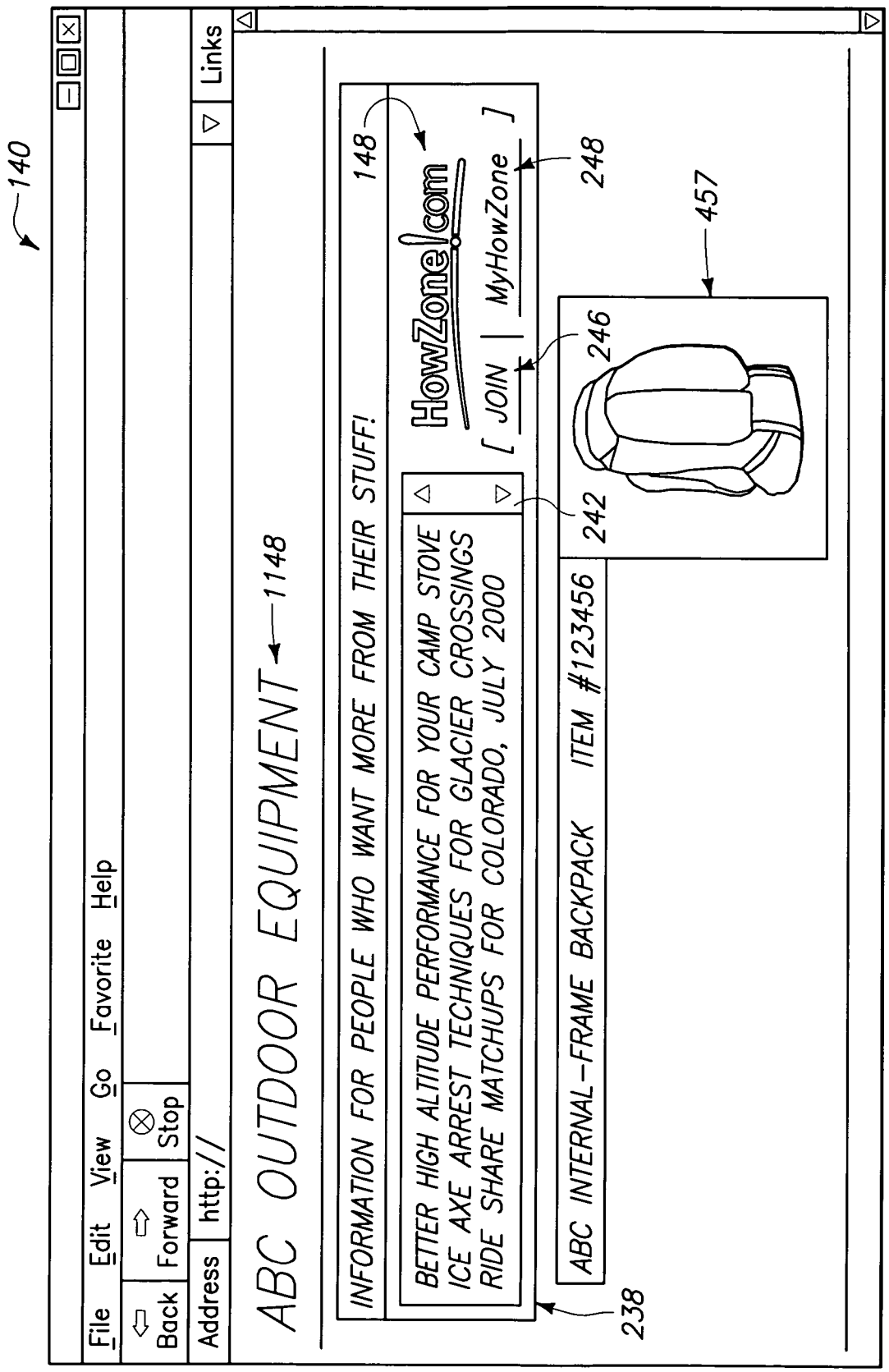

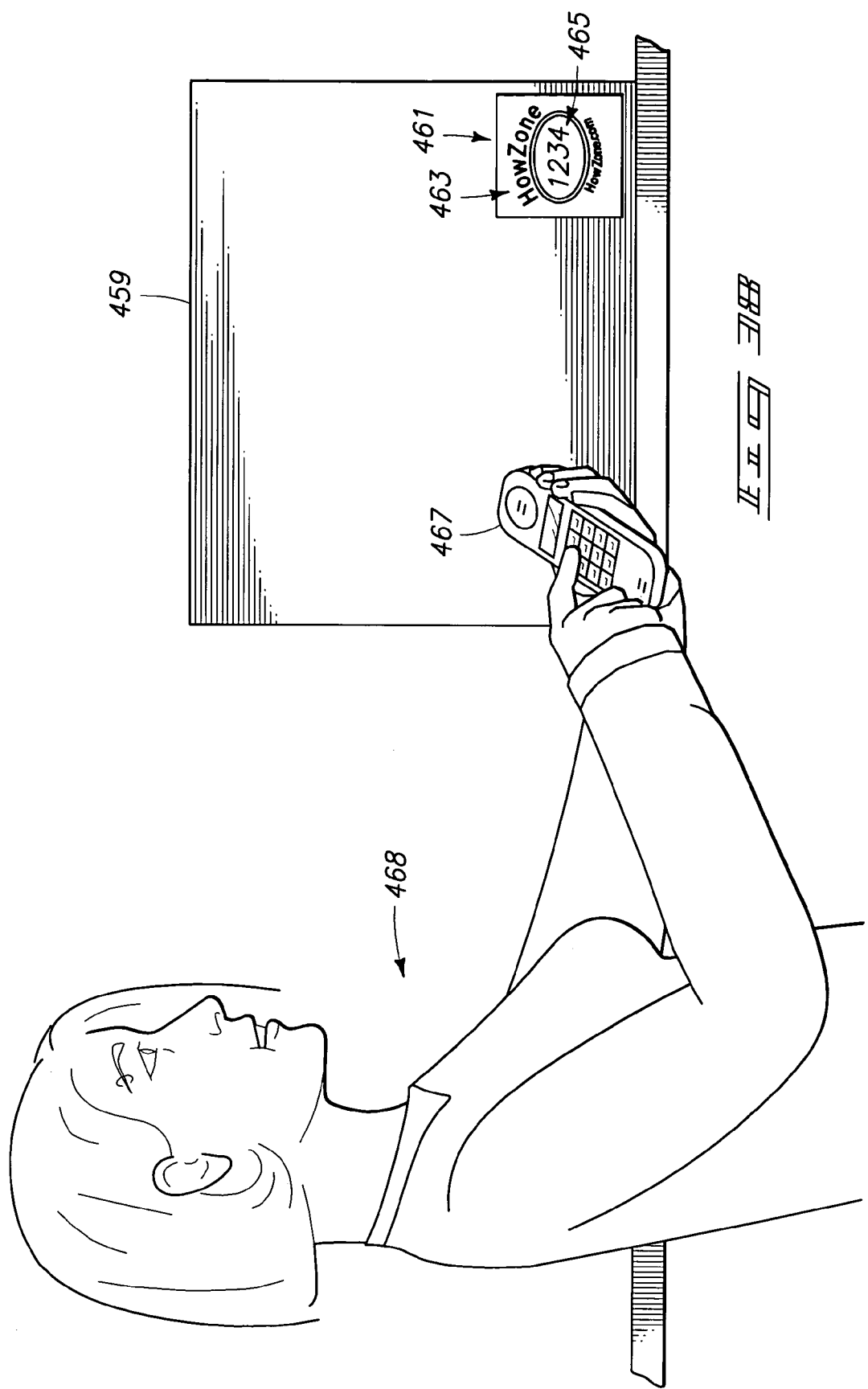

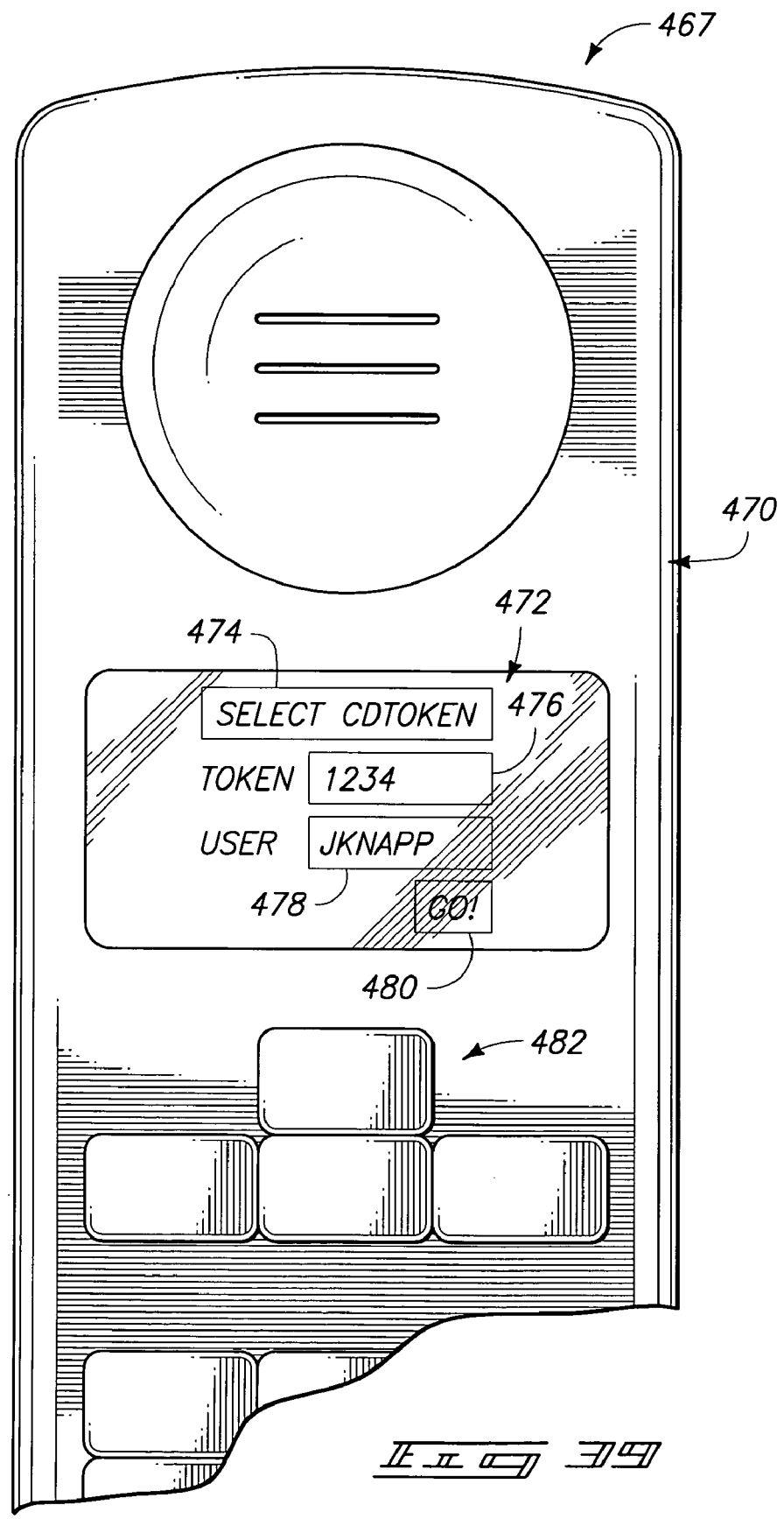

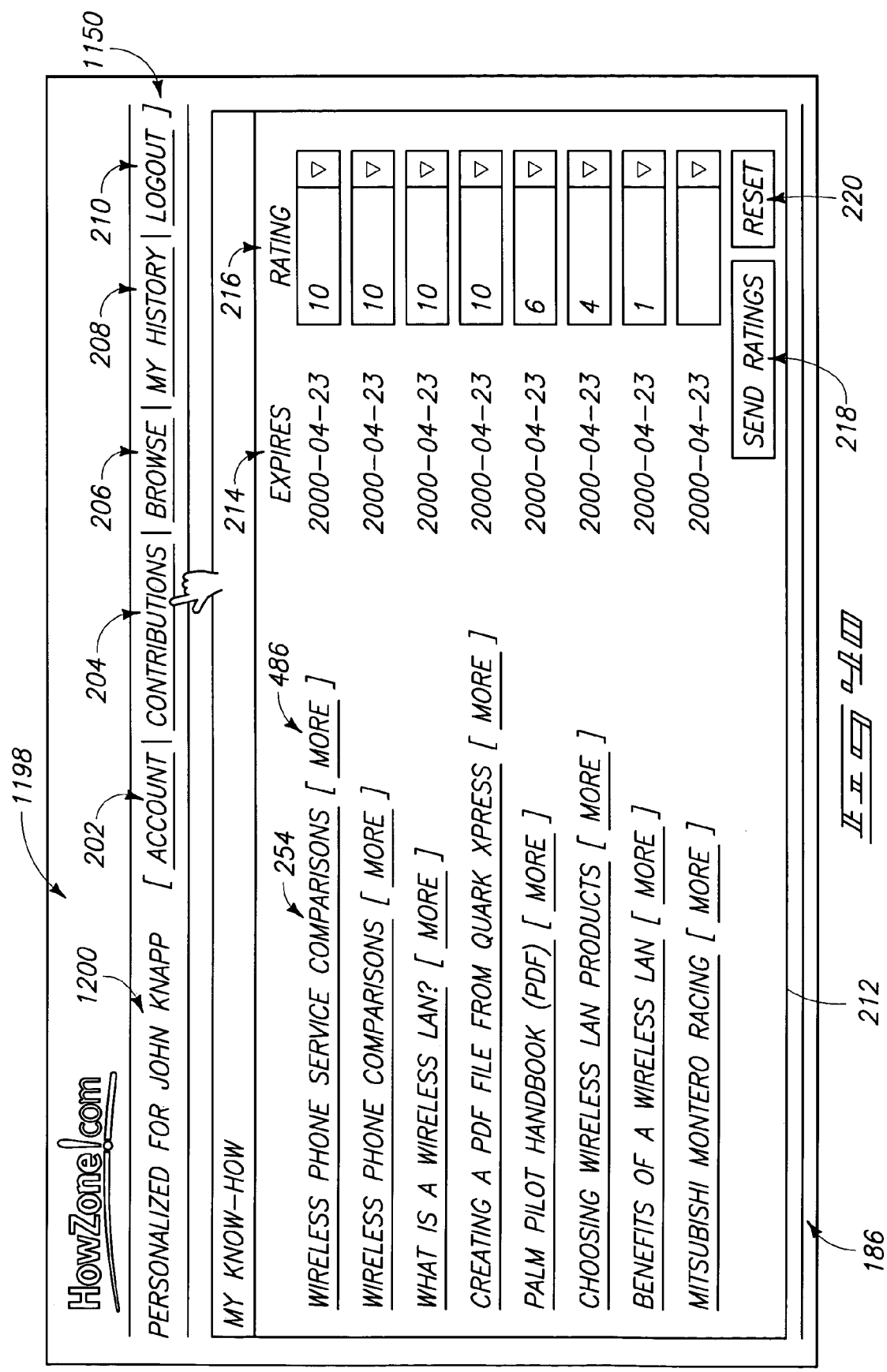

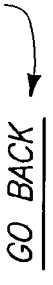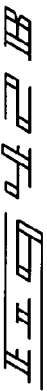
FIG. 42B

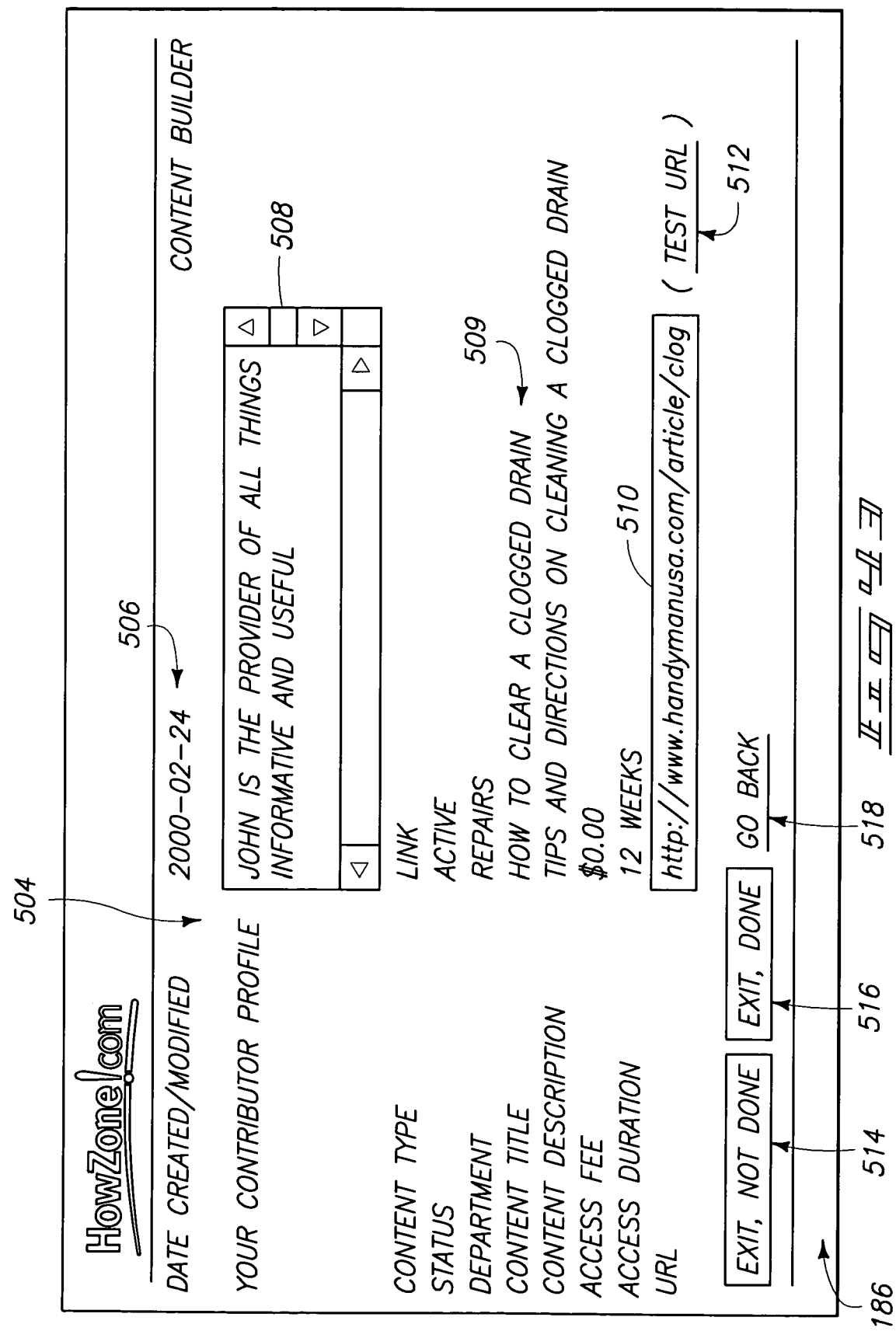

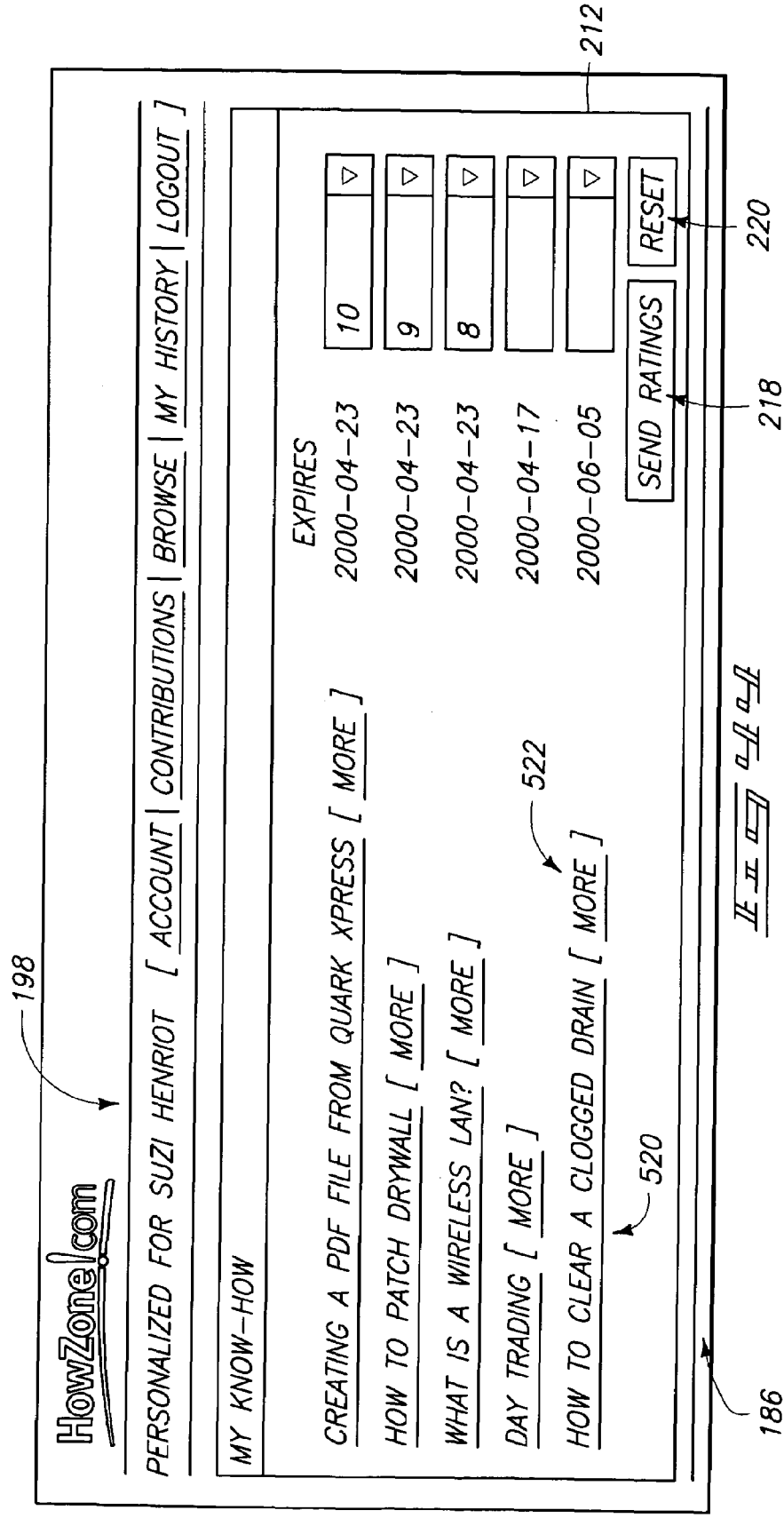

HowZone!com — 1504

CONTENT BUILDER

DATE CREATED/MODIFIED   2000-02-19/2000-03-13
YOUR CONTRIBUTOR PROFILE

[ I KNOW DAY TRADING REALLY REALLY WELL ] — 534

CONTENT TYPE          TUTORIAL — 536
STATUS                CONSTRUCTION
DEPARTMENT            BUSINESS
CONTENT TITLE         DAY TRADING
CONTENT DESCRIPTION   SOMETHING ABOUT DAY TRADING
ACCESS FEE            $5.00
ACCESS DURATION       5 WEEKS

| CONTENT ELEMENTS | | |
|---|---|---|
| FILE NAME OR LINK | ADDED | MODIFIED |
| | | 538 |

ADD PAGE — 541

[ EXIT, NOT DONE ]   [ EXIT, DONE! ]   GO BACK

FIG. 46

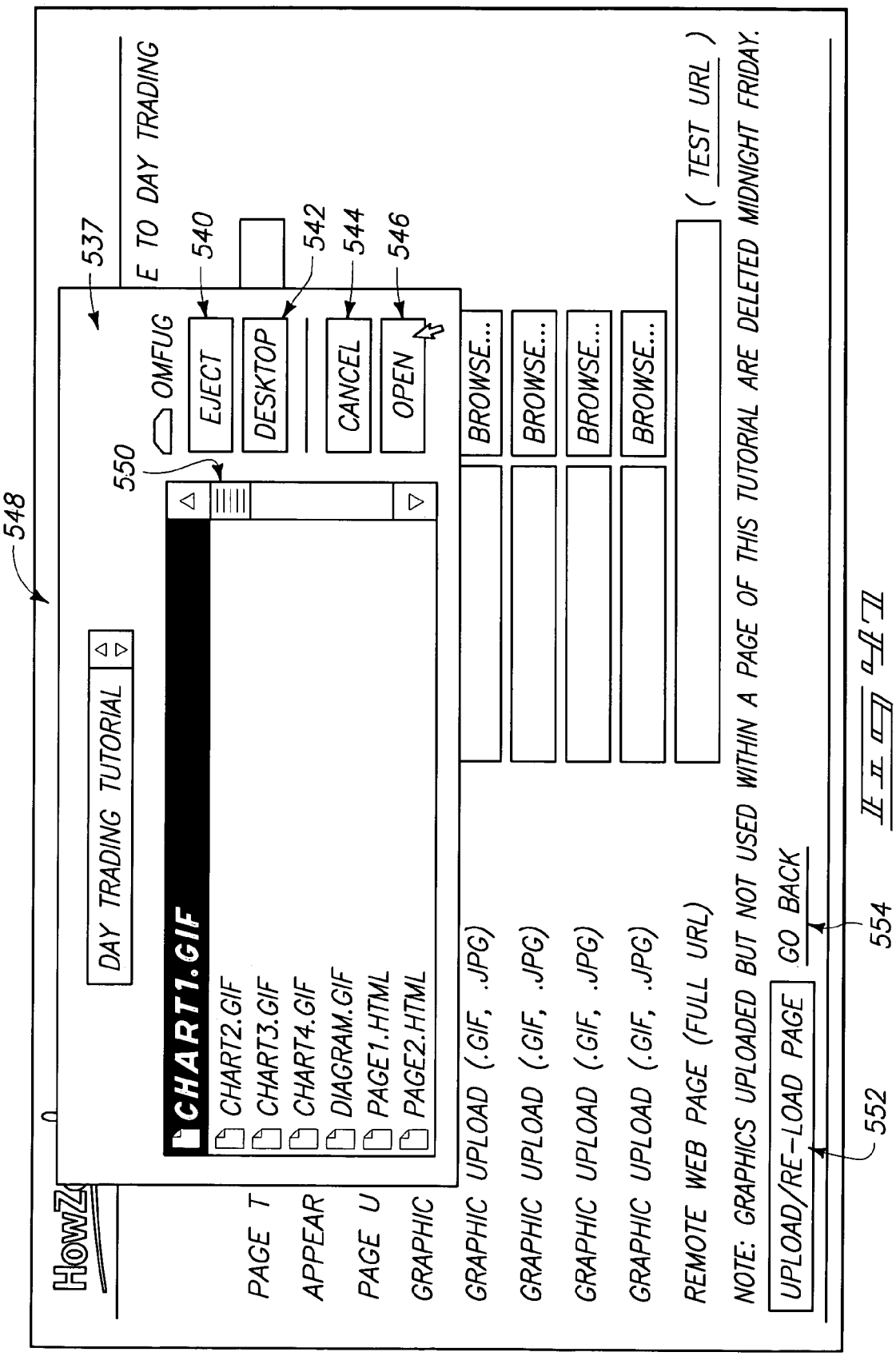

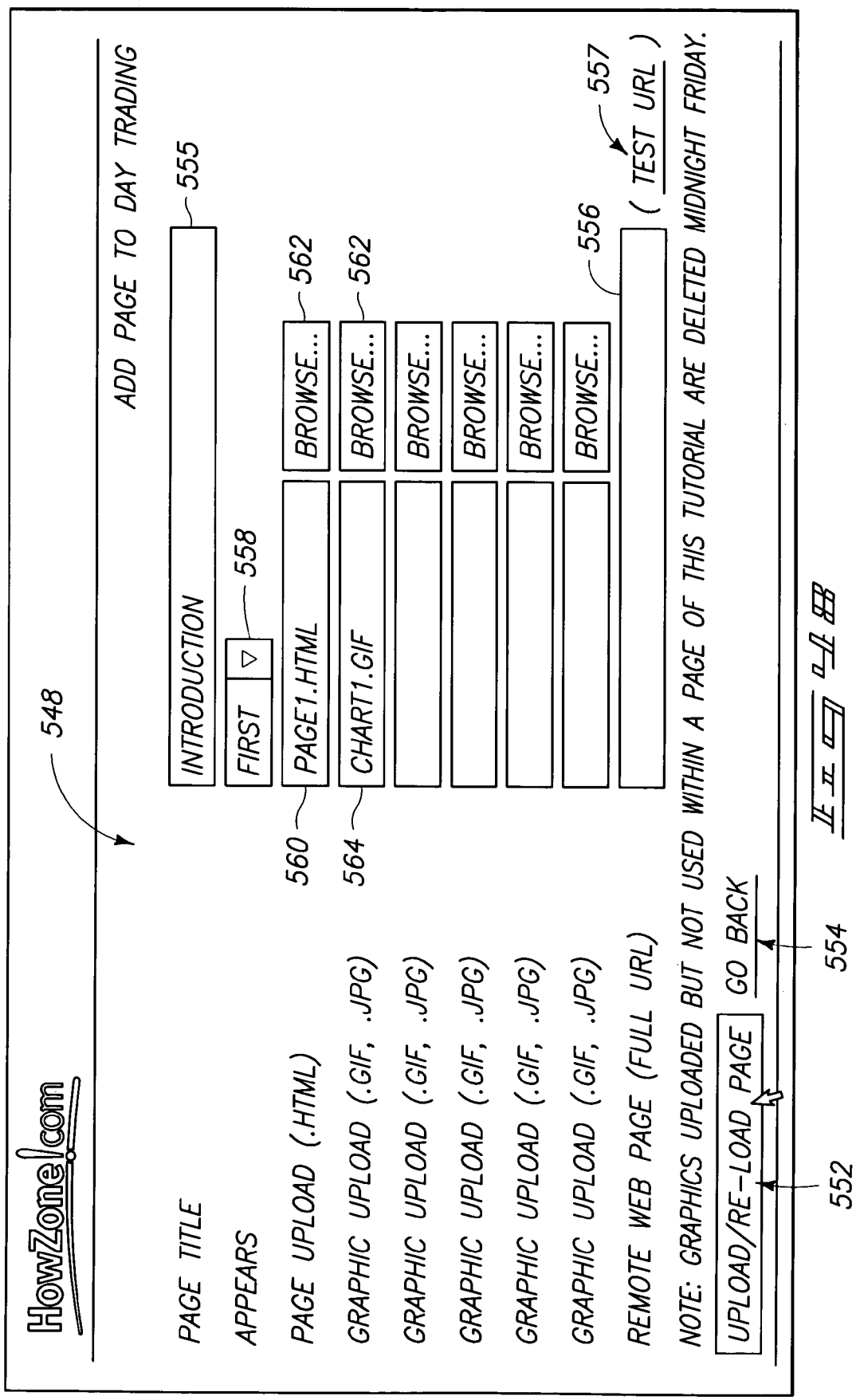

HowZone!.com

| | 1504 |
|---|---|
| DATE CREATED/MODIFIED | 2000-02-19/2000-03-13 |
| YOUR CONTRIBUTOR PROFILE | I KNOW DAY TRADING REALLY REALLY WELL  561 |

| | |
|---|---|
| CONTENT TYPE | TUTORIAL — 536 |
| STATUS | CONSTRUCTION |
| DEPARTMENT | BUSINESS |
| CONTENT TITLE | DAY TRADING |
| CONTENT DESCRIPTION | SOMETHING ABOUT DAY TRADING |
| ACCESS FEE | $5.00 |
| ACCESS DURATION | 5 WEEKS |

CONTENT ELEMENTS

FILE NAME OR LINK — 565    567      569 — ADDED  571 — MODIFIED    581
[ E ] PAGE1.HTML  [ ADD GRAPHICS ]    2000-03-13   2000-03-13   DELETE
      [ E ] CHART1.GIF                2000-03-13   2000-03-13   DELETE

ADD PAGE — 541
538
563

EXIT, NOT DONE   EXIT, DONE!   GO BACK

CONTENT BUILDER

| FIG.51A |
| FIG.51B |

FIG. 51A

HowZone!.com

CONTENT BUILDER

DATE CREATED/MODIFIED  2000-03-13/2000-03-13
YOUR CONTRIBUTOR PROFILE  I KNOW DAY TRADING REALLY REALLY WELL — 561

1504

CONTENT TYPE         TUTORIAL — 536
STATUS               CONSTRUCTION
DEPARTMENT           SPORTS & HOBBIES
CONTENT TITLE        DAY TRADING
CONTENT DESCRIPTION  SOMETHING ABOUT DAY TRADING
ACCESS FEE           $5.00
ACCESS DURATION      5 WEEKS

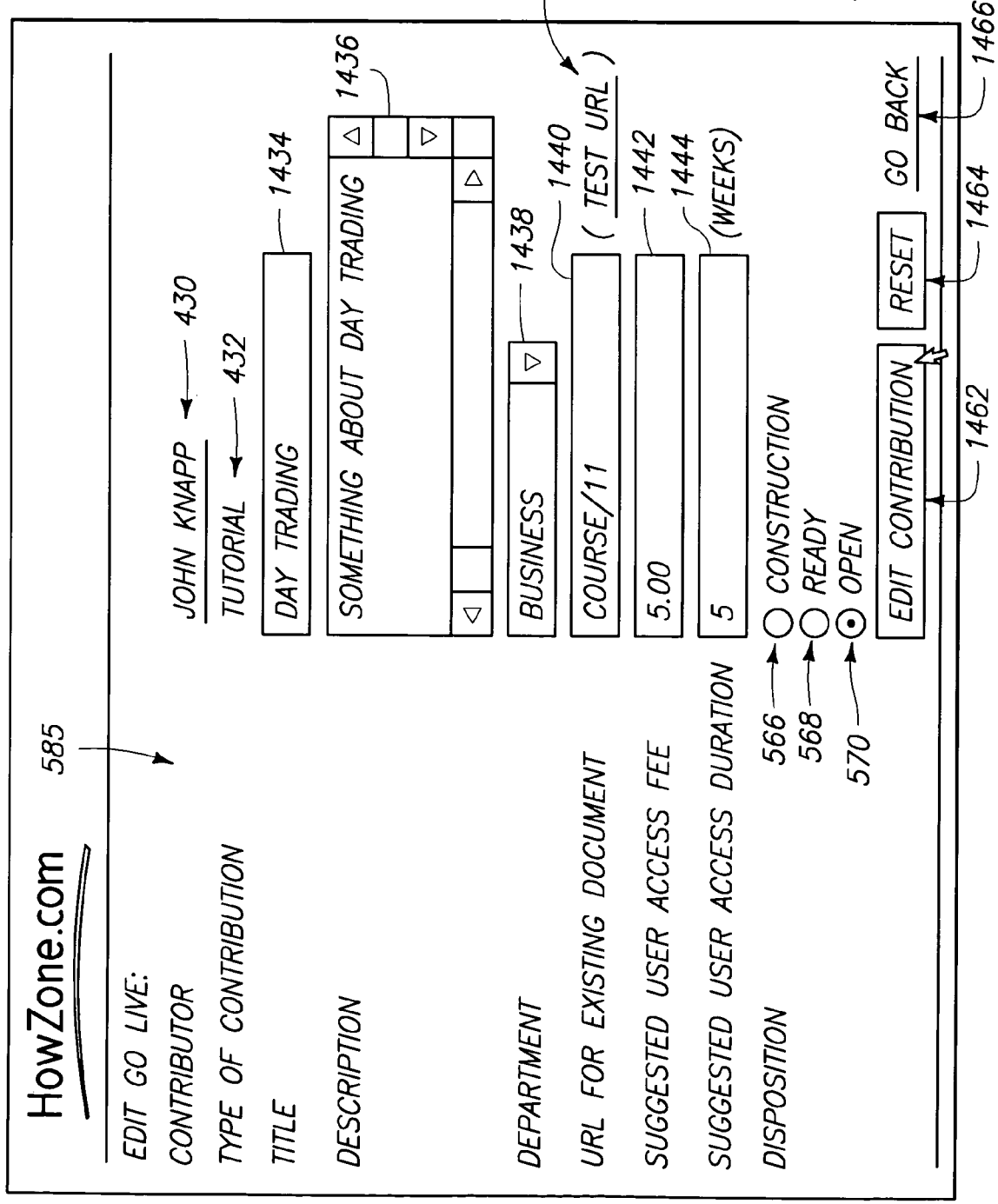

NETSCAPE:HOWZONE.COM

CREATING A PDF FILE FROM QUARK XPRESS | INTRODUCTION | ▽ [CLOSE]
BY JOHN KNAPP (ACCESS EXPIRES 2000-04-23)

CREATING PDF FROM QUARK XPRESS

INTRODUCTION

THIS TUTORIAL DETAILS THE PROCESS OF TAKING A QUARK XPRESS PUBLICATION AND CREATING AN ADOBE ACROBAT DOCUMENT SUITABLE FOR HIGH-END PRINTING AT A COMMERCIAL PRINTING PLANT. THIS TUTORIAL IS EQUALLY SUITABLE FOR USERS ON EITHER THE MACINTOSH OR WINDOWS PLATFORM.

THE BASIC PROCEDURE AS OUTLINED IN THIS TUTORIAL IS STRAIGHTFORWARD

1. MAKE SURE YOUR PUBLICATION IS COMPLETE AND PERFORM A FINAL PREFLIGHT CHECK
2. CREATE A POSTSCRIPT FILE USING THE PRINT COMMAND
3. SET THE CORRECT JOB OPTIONS IN ACROBAT DISTILLER
4. PROCESS YOUR POSTSCRIPT FILE USING DISTILLER TO CREATE YOUR ACROBAT PDF FILE

THE FOLLOWING PAGES DETAIL THE PROCESS STARTING WITH A FINISHED XPRESS PUBLICATION AND CONCLUDING WITH THE ACROBAT DISTILLATION PROCESS.

FIG. 53

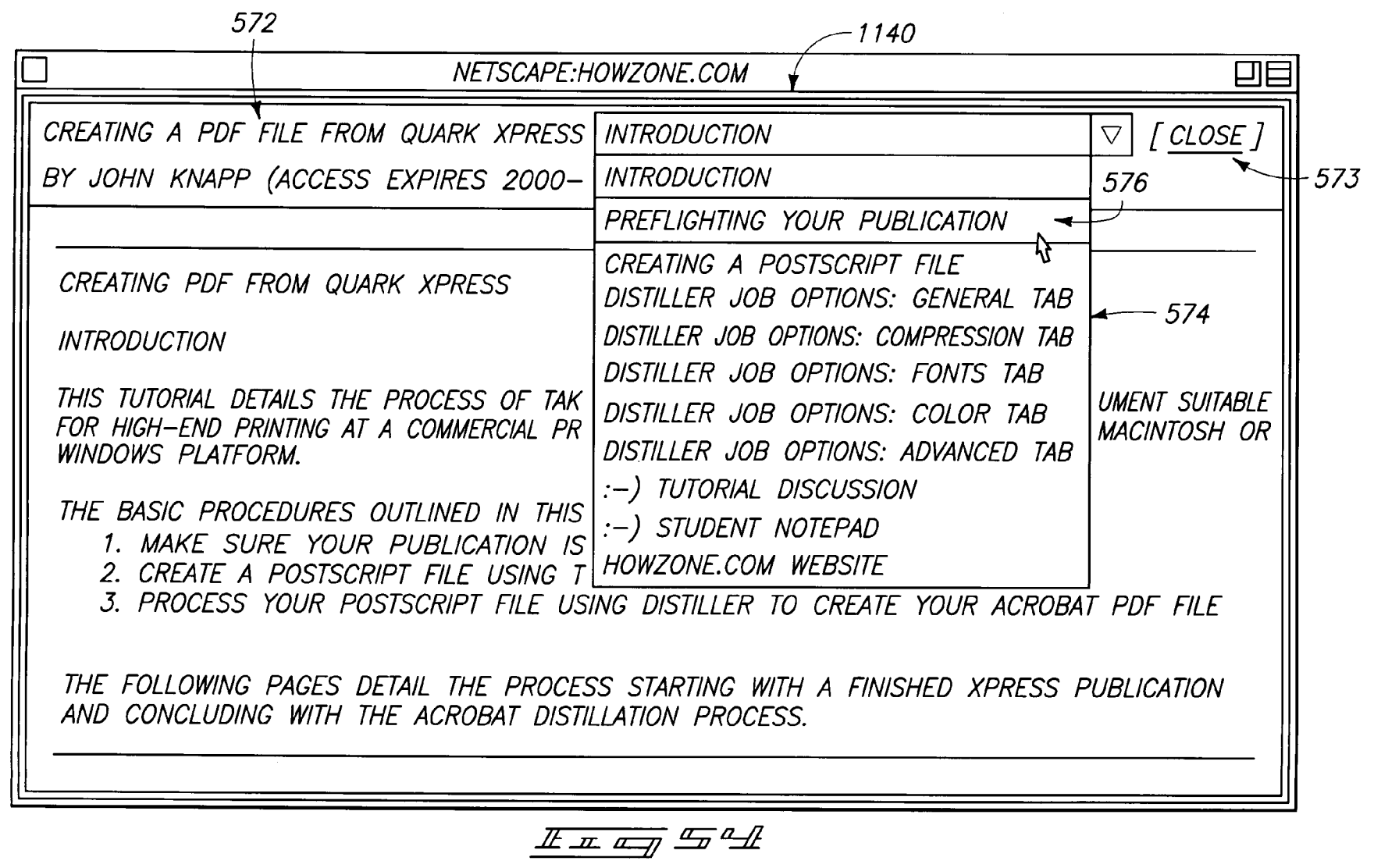

NETSCAPE:HOWZONE.COM — 1140

CREATING A PDF FILE FROM QUARK XPRESS
BY JOHN KNAPP (ACCESS EXPIRES 2000– — 572

| INTRODUCTION |
|---|
| INTRODUCTION |
| PREFLIGHTING YOUR PUBLICATION — 576 |
| CREATING A POSTSCRIPT FILE |
| DISTILLER JOB OPTIONS: GENERAL TAB |
| DISTILLER JOB OPTIONS: COMPRESSION TAB |
| DISTILLER JOB OPTIONS: FONTS TAB |
| DISTILLER JOB OPTIONS: COLOR TAB |
| DISTILLER JOB OPTIONS: ADVANCED TAB |
| :-) TUTORIAL DISCUSSION |
| :-) STUDENT NOTEPAD |
| HOWZONE.COM WEBSITE |

[CLOSE] — 573

574 → UMENT SUITABLE MACINTOSH OR

CREATING PDF FROM QUARK XPRESS

INTRODUCTION

THIS TUTORIAL DETAILS THE PROCESS OF TAK
FOR HIGH-END PRINTING AT A COMMERCIAL PR
WINDOWS PLATFORM.

THE BASIC PROCEDURES OUTLINED IN THIS
1. MAKE SURE YOUR PUBLICATION IS
2. CREATE A POSTSCRIPT FILE USING T
3. PROCESS YOUR POSTSCRIPT FILE USING DISTILLER TO CREATE YOUR ACROBAT PDF FILE

THE FOLLOWING PAGES DETAIL THE PROCESS STARTING WITH A FINISHED XPRESS PUBLICATION AND CONCLUDING WITH THE ACROBAT DISTILLATION PROCESS.

FIG. 54

| FIG.56A |
| FIG.56B |

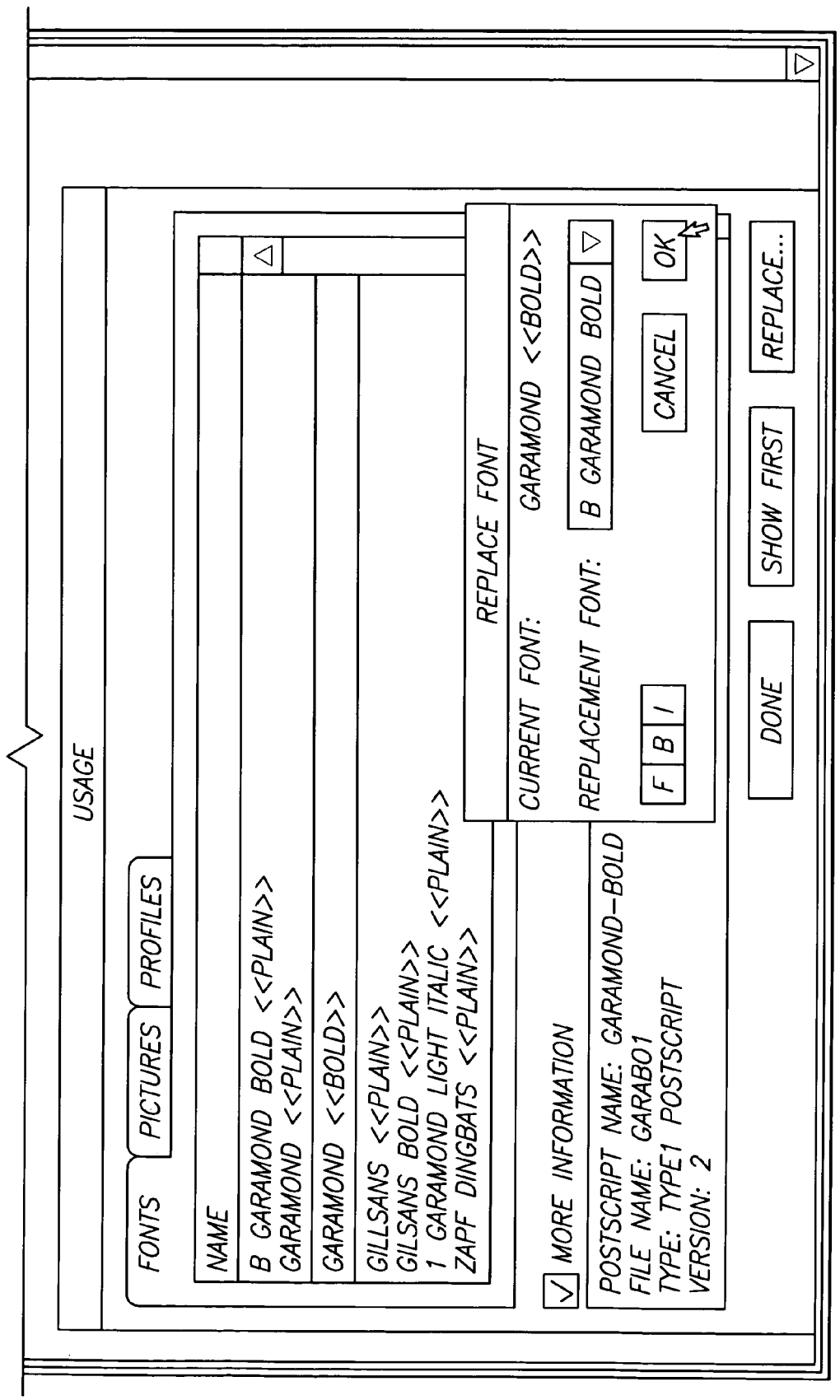

NETSCAPE:HOWZONE.COM

CREATING A PDF FILE FROM QUARK XPRESS  :) STUDENT NOTEPAD ▽  [CLOSE]

BY JOHN KNAPP (ACCESS EXPIRES 2000-04-23)

CREATING PDF FROM QUARK XPRESS

STUDENT PRIVATE NOTES FOR THIS COURSE

HERE IS A COURSE-SPECIFIC LOCATION WHERE STUDENTS CAN KEEP PRIVATE NOTES RELATING TO THE COURSE.

LIKE NOTES IN THE MARGIN OF A TEXTBOOK, IT WILL INCREASE THE STICKINESS OF THE TUTORIAL AND ENCOURAGE THEM TO RENEW THEIR ENROLLMENT.

THERE IS NO ADDITIONAL LOGON REQUIRED.

NO LINKS OUT OF THIS PAGE.

FIG. 58

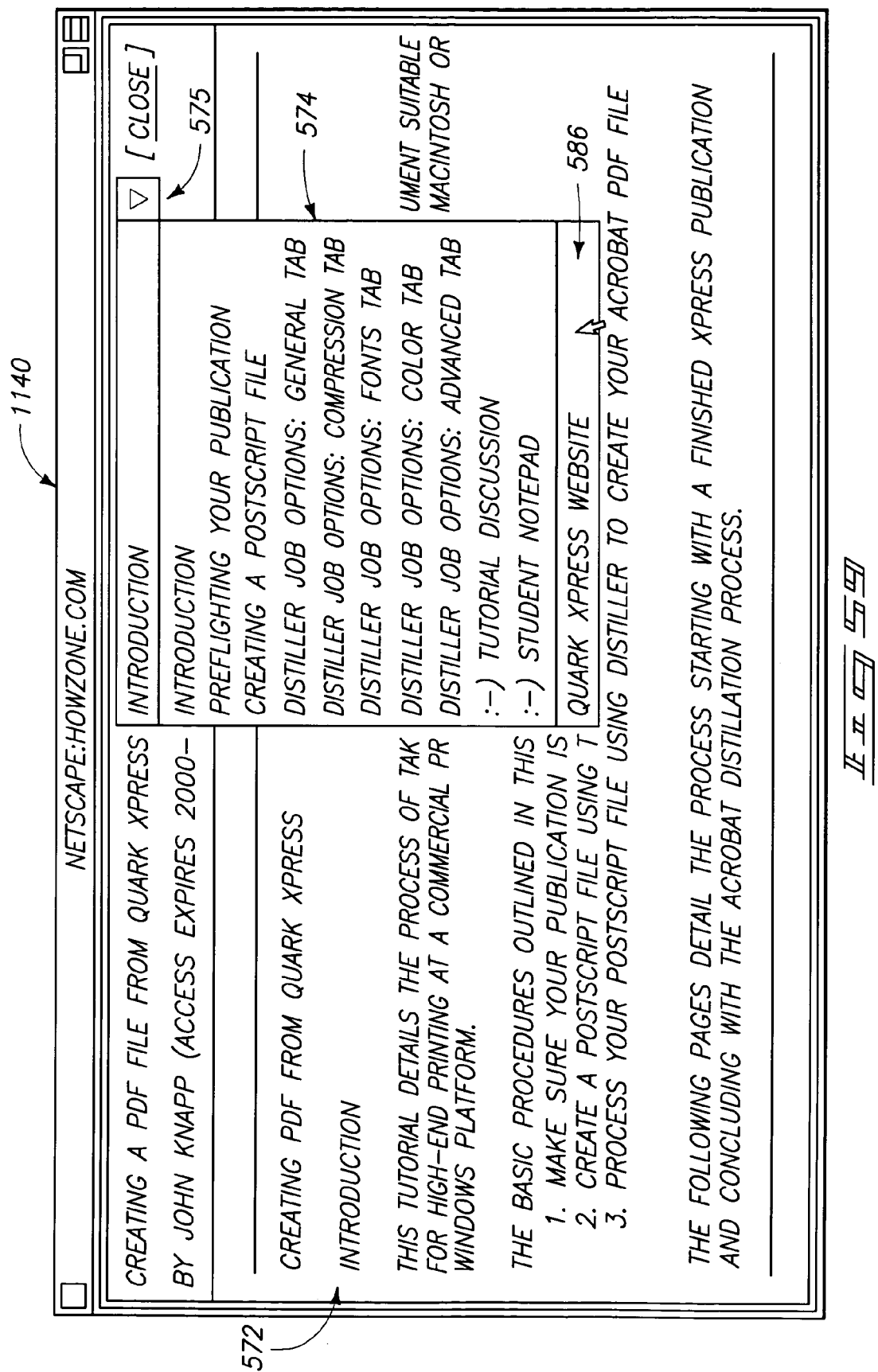

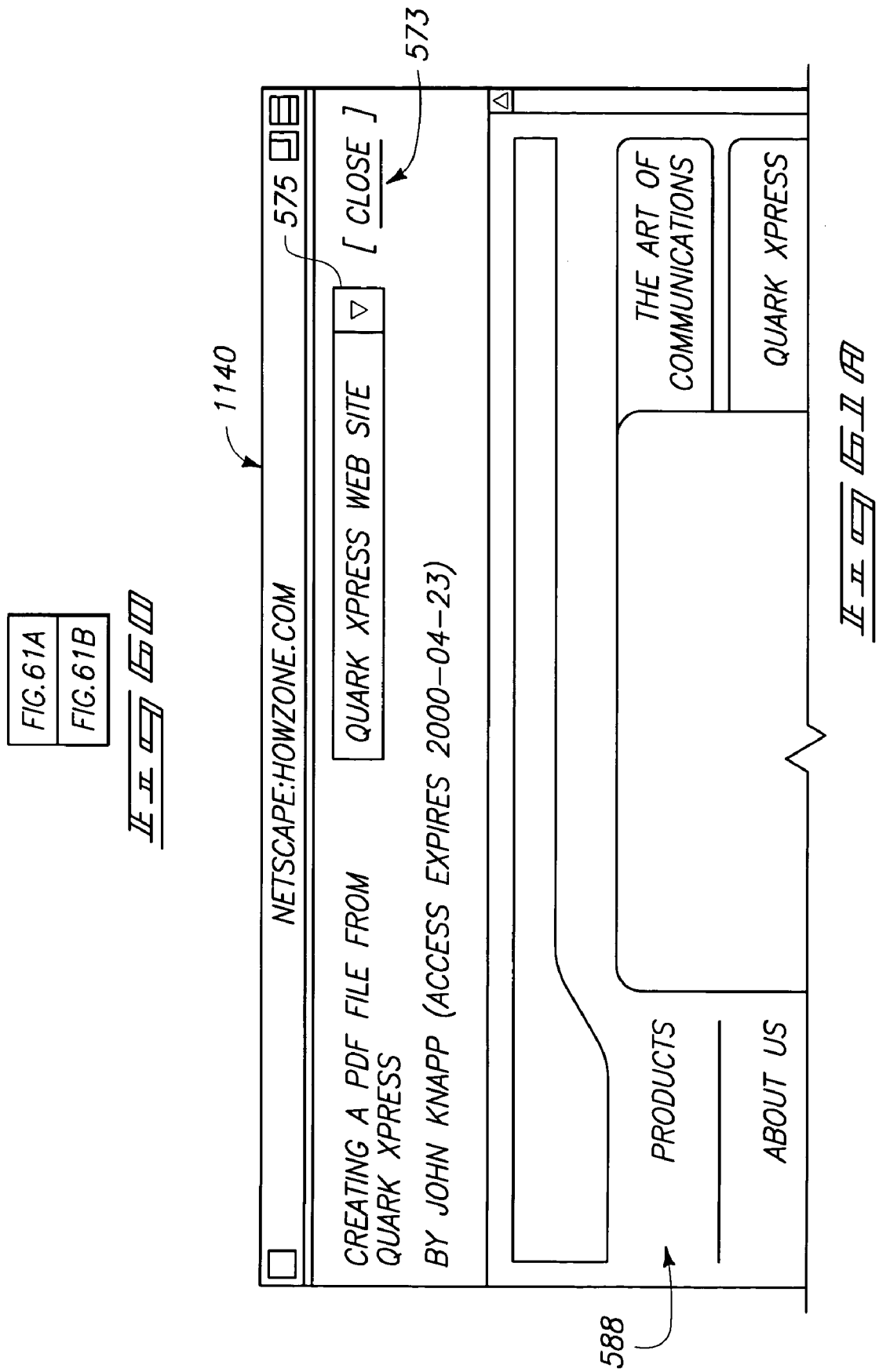

| NEWS/EVENTS | QUARK DIGITAL MEDIA SYSTEM |
| --- | --- |
| SUPPORT ← 590 | QUARKWRAPTURE |
| DOWNLOADS | AVENUE.QUARK |
| HOW TO BUY | ESTAGE |

QUARK'S TRIBUTE TO THE PAST AND FUTURE OF COMMUNICATION MORE>>

MEDIA-INDEPENDENT PUBLISHING ⌵
AN INTERVIEW WITH MARK LEMMONS, VICE PRESIDENT OF STRATEGIC DEVELOPMENT

LIVE WEBCAST ⌵
QUARK DELIVERS THE FUTURE OF PUBLISHING

QUARK INTERNATIONAL ⌵
VISIT OUT SITE

XTENSIONS CATALOG ⌵
XTEND THE POWER OF QUARK PRODUCTS

QUARKED ⌵
NOW AVAILABLE

FIG. 61B

APPARATUS FOR DISTRIBUTING CONTENT OBJECTS TO A PERSONALIZED ACCESS POINT OF A USER OVER A NETWORK-BASED ENVIRONMENT AND METHOD

RELATED PATENT DATA

This patent application is a continuation application of U.S. patent application Ser. No. 09/569,361, filed May 11, 2000, entitled "Apparatus for Distributing Information Over a Network-Based Environment, Method of Distributing Information to Users, and Method for Associating Content Objects With a Database Wherein the Content Objects are Accessible Over a Network Communication Medium by a User", naming John R. Knapp and Edward K. E. Snyders as inventors, and which is now U.S. Pat. No. 6,769,010, the disclosure of which is incorporated by reference herein.

TECHNICAL FIELD

This invention pertains to electronic commerce and business. More particularly, the present invention relates to aggregating, enhancing, and distributing content objects with customers over a network-based environment such as via the Internet or some other form of interactive network.

BACKGROUND OF THE INVENTION

The storage and retrieval of information has evolved from storing and retrieving information in textbooks and libraries, to storing and retrieving information from online networks such as the Internet. More particularly, the recent adoption and acceptance of online networks such as the Internet has led to a significant increase in the availability of information to the general public. Users frequently access information from the Internet using a personal computer (PC) and a modem. With such a computer, a user can search through the world's best libraries, connect into computer systems located anywhere on the planet, and read online magazines. Furthermore, users can shop for almost anything, located nearly anywhere in the world. However, this greatly expanded capability to retrieve information has led to a syndrome that can best be characterized as "sipping information from a fire hose". As a result, users become overwhelmed and either fail to find the information they seek or they lose track of the information. As a result of losing track of the information, they cannot find it again at a later point in time. Several techniques have evolved in order to enable a user to collect desirable information from the Internet. However, each of these techniques falls far short of meeting the needs of information providers and information users.

More recently, the World Wide Web (WWW) has become the main vehicle for delivering information over the Internet to users. The World Wide Web (WWW) is a network system that enables easy access to distributed documents over the Internet using a client/server architecture. The World Wide Web provides an Internet facility that links documents locally and remotely. A Web document, referred to as a Web page, includes links in a page that let users jump from page to page (hypertext links) whether the pages are stored on the same server or on servers around the world. These Web pages are accessed and read via a Web browser such as Netscape Navigator or Internet Explorer.

A user often looks for information on the World Wide Web (WWW) during an online session using a Web search engine, such as AltaVista, Google, or Yahoo! In order to locate items of interest by way of hypertext links, many search engines gather information about content that is available on the Internet using Web crawlers. A Web crawler is a program that gathers information by following hypertext links that have been encountered by the program. The program sends a universal resource locator (URL), as well as document text, back to indexing software on the search engine for each encountered document. The indexing software extracts information from the documents. For example, words, document size and date of creation can be extracted by the indexing software. Such information has been organized into a database, typically based on the frequency of use of individual words present within a document. Accordingly, a keyword search that is implemented by a user with the search engine results in a database being searched, and a search result being generated without actually going directly to the World Wide Web (WWW). The search engine then generates a results page having hypertext links to the Web pages that were located in the database. A user then merely clicks on the link in order to go to the corresponding Web page. However, the World Wide Web (WWW) has merely increased the accessibility of large amounts of information to Internet users.

There is a need, therefore, to provide improvements in the way demand for information is identified, content is generated in response to a defined demand, and the way in which users access desired information.

SUMMARY OF THE INVENTION

A system and method are provided to document and quantify demand for particular information that is a requested by an individual user by sampling a worldwide user community by way of a networked system. Accordingly, user demand is aggregated in order to learn what information is desired by people. The aggregated demand is then used to compel a contributor to contribute information such as content objects. Additionally, information in the form of content objects available on the networked system is enhanced by way of an approval process, by ranking content, and by categorizing content. Furthermore, content is distributed to users in several manners: by way of a primary Web site, and by way of predetermined but dynamic groups of aggregated content objects which are made available via banners and/or tokens.

According to one aspect, an apparatus is provided for distributing information over a network-based environment. The apparatus includes a first client, a server, and a second client. The server communicates with the first client via a communication link and includes a database operative to store indicia associated with at least one content object and user identifiers. The second client communicates with the server over a communication link. The second client is remote from the first client and is operative to submit indicia and a user identifier to the server. In response to submission of the indicia and the user identifier, at least one of: (a) a content object, and (b) a link to the content object are received into a personalized access point of the server. The user can access the personalized access point of the server with the first client.

According to another aspect, a method is provided for distributing information to users. The method includes: providing a database capable of being associated with content objects that are accessible over a communication medium by a user at a client; associating at least one content object with a distribution mechanism; requesting a desired one of the at least one content object; and receiving the requested content object into a network-based personalized access point.

According to yet another aspect, a method is provided for associating content objects with a database wherein the content objects are accessible over a network communication medium by a user. The method includes: receiving a suggestion for a new content object for addition to the database; approving the suggested content object; generating a list of information users desiring the approved content object; compelling an information provider to provide the desired content object based at least in part on demand identified by the generated list; and making the generated content object available to the database.

According to even another aspect, a method is provided for distributing information to users. The method includes: providing a database on a server at a first location operative to store indicators that are associated with content objects, wherein the content objects are accessible over a communication link; presenting an indicator at a visually perceptible location to a user; while at a second location, submitting the indicator and a user identifier to the server at the first location; and in response to submitting the indicator and the user identifier, subscribing to one of: (a) a content object associated with the link, and (b) a link to the content object; and receiving one of the content object and the link into a personalized access point; wherein the personalized access point is viewable at a third location provided in communication with the web-based server over a communication link.

BRIEF DESCRIPTION OF THE DRAWINGS

Preferred embodiments of the invention are described below with reference to the following accompanying drawings.

FIG. 1 is a block diagram overview of a basic system configuration of an exemplary system for aggregating, organizing, ranking, and distributing content objects between information providers and information users over a network-based environment according to one embodiment of the present invention.

FIG. 2 is a process flow diagram showing part of the logic processing for aggregating and distributing content objects.

FIG. 3 is second process flow diagram showing part of the logic processing for enhancing aggregated content objects by assessing demand for content and compelling content providers to contribute content objects to the network.

FIG. 4 is a third process flow diagram showing part of the logic processing for distributing aggregated content objects to users via a wireless Web appliance and product associated indicia that identify a set of predefined, yet dynamic aggregated content objects.

FIG. 7 is a diagram of a screen display for a Web page illustrating a "Business" category page that is at a down-tree location from the screen display of FIGS. 6A and 6B.

FIG. 8 is a diagram of a screen display for a personal HowZone for a new user prior to selecting any content objects.

FIG. 12 is a diagram of a screen display for the HowZone content detail page which is generated by selecting an item from the scrolling list of FIG. 11, and containing a link that enables a user to add the selected item to their personal HowZone.

FIG. 13 is a diagram of a screen display for the personal HowZone of FIG. 10 showing the aggregation of content objects within the personal HowZone after selecting the link of FIG. 12 which enables adding the selected item to the personal HowZone.

FIG. 14 is a diagram of a screen display showing one exemplary personal HowZone for a specific user containing a listing of all content objects previously selected by such user and showing a pop-up menu selected by a user for enabling the assignment of a ranking to a content object.

FIG. 15 is a diagram of the screen display of FIG. 14, but showing a user selecting the send ratings button in order to send ratings of the user's content objects to the HowZone server, or system.

FIG. 16 is a diagram of the screen display of FIG. 7 illustrating a page from the content object listing and further illustrating the number of users, rating and cost for each content object.

FIG. 17 is a diagram of a screen display for a content detail page for a single content object of FIG. 16.

FIG. 22 is a diagram of the screen display of FIG. 21 where the "business" category page includes a different commerce banner caused by using a different "include" file for the commerce banner.

FIG. 23 is a diagram of a screen display similar to the screen display of FIG. 22, but wherein an original entry point is provided to the corresponding screen display, thereby illustrating a "multiple-point-of-entry" capability of the HowZone network.

FIG. 25 is a diagram of a screen display for a user request form.

FIG. 26 is a diagram of a screen display for a HowZone administrative page used to approve user requests for new content.

FIG. 27 is a diagram of a screen display showing a freshly requested and approved content object provided within a HowZone category network.

FIG. 28 is a diagram of a screen display showing a content detail page for a content object which is not yet available on the HowZone system, and further showing information about the content object, and providing a link which enables a user to join a waitlist.

FIG. 29 is a diagram of a screen display showing a page where a user joins the waitlist.

FIG. 30 is a diagram of a screen display for a content detail page having a waitlist and showing a potential contributor that they can earn money for making this contribution.

FIG. 31 is a diagram showing the assembly of FIGS. 32A through 32C.

FIGS. 32A through 32C together form a diagram of a screen display providing a form usable by an expert to indicate their interest in making a specific contribution to the HowZone system.

FIG. 33 is a diagram showing the assembly of FIGS. 34A and 34B.

FIGS. 34A and 34B together form a diagram of a screen display for a HowZone.com administrative page that enables approval of a potential contributor to the HowZone system.

FIG. 35 is a diagram of a screen display for a "business" category entry present within a category network and below a "top" category entry.

FIG. 36 is a diagram of a screen display similar to that depicted in FIGS. 34A and 34B, but illustrating a "multiple-point-of-entry" category tree capability wherein the parent category "top" does not appear above the category "business".

FIG. 37 is a diagram of a screen display illustrating an alternative vehicle for distributing content comprising a content object window which will be embedded within pages of other web sites.

FIG. 38 is a simplified schematic diagram of a point-of-purchase customer at a bricks and mortar store, and further showing merchandise containing a HowZone.com content distribution token having product-associated indicia, enabling a customer to remotely select aggregated content objects for their personal HowZone via a wireless web appliance.

FIG. 39 is an enlarged partial view of the wireless web appliance of FIG. 38 further showing the user interface.

FIG. 40 is a diagram of a screen display for a user's personal HowZone, and showing a user graphically selecting a contributions link.

FIG. 41 is a diagram showing the assembly of FIGS. 42A and 42B.

FIGS. 42A and 42B together form a diagram of a screen display showing an exemplary list of contributions made by a user.

FIG. 43 is a diagram of a screen display for a content builder for a content object type of link.

FIG. 44 is a diagram of a screen display for a user's personal HowZone and including a recently approved content object which has appeared within a HowZone.com category network, and selected by the user for addition to their personal HowZone.

FIG. 45 is a diagram of a screen display for a content object that has been selected by user from within the user's personal HowZone, and which is presented within a separate window from the user's personal HowZone.

FIG. 46 is a diagram of a screen display of a content builder for a content object type of tutorial.

FIG. 47 is a diagram of a screen display illustrating a user selecting a file from the user's hard disk in order to upload using a HowZone.com content builder, wherein the uploaded files are stored on a HowZone.com web server.

FIG. 48 is a diagram of a screen display for a completed tutorial page with graphics being uploaded to HowZone.com.

FIG. 49 is a diagram of a screen display showing a content builder having one page, and further showing the contributor adding a second page.

FIG. 50 is a diagram showing the assembly of FIGS. 51A and 51B.

FIGS. 51A and 51B together form a diagram of a screen display showing a completed tutorial being saved into the HowZone.com system.

FIG. 52 is a diagram of a screen display for an administrative page usable by HowZone.com personnel, or staff, to approve a content object.

FIG. 53 is a diagram of a screen display for a content object type of tutorial illustrating a HowZone.com navigation system extending across a top-most portion of the screen display.

FIG. 54 is a diagram of a screen display illustrating a dynamically generated pop-up navigation tool present within the HowZone.com tutorial delivery system.

FIG. 55 is a diagram showing the assembly of FIGS. 56A and 56B.

FIGS. 56A and 56B together form a diagram of a screen display illustrating another page which is just been selected using the pop-up navigation tool of FIG. 54.

FIG. 58 is a diagram of a screen display showing that each tutorial has a dedicated student note taking function, where users can keep personal notes similar to margin notes a person might write in the margin of a textbook.

FIG. 59 is a diagram of a screen display showing that tutorials can contain links to external Web pages, and that access to such pages is implemented via the same pop-up navigational tool present within the HowZone.com system.

FIG. 60 is a diagram showing the assembly of FIGS. 61A and 61B.

FIGS. 61A and 61B together form a diagram of a screen display showing an external web page appearing within the HowZone.com tutorial display and navigation system.

DETAILED DESCRIPTION OF THE PREFERRED EMBODIMENTS

Figures 5, 6A:
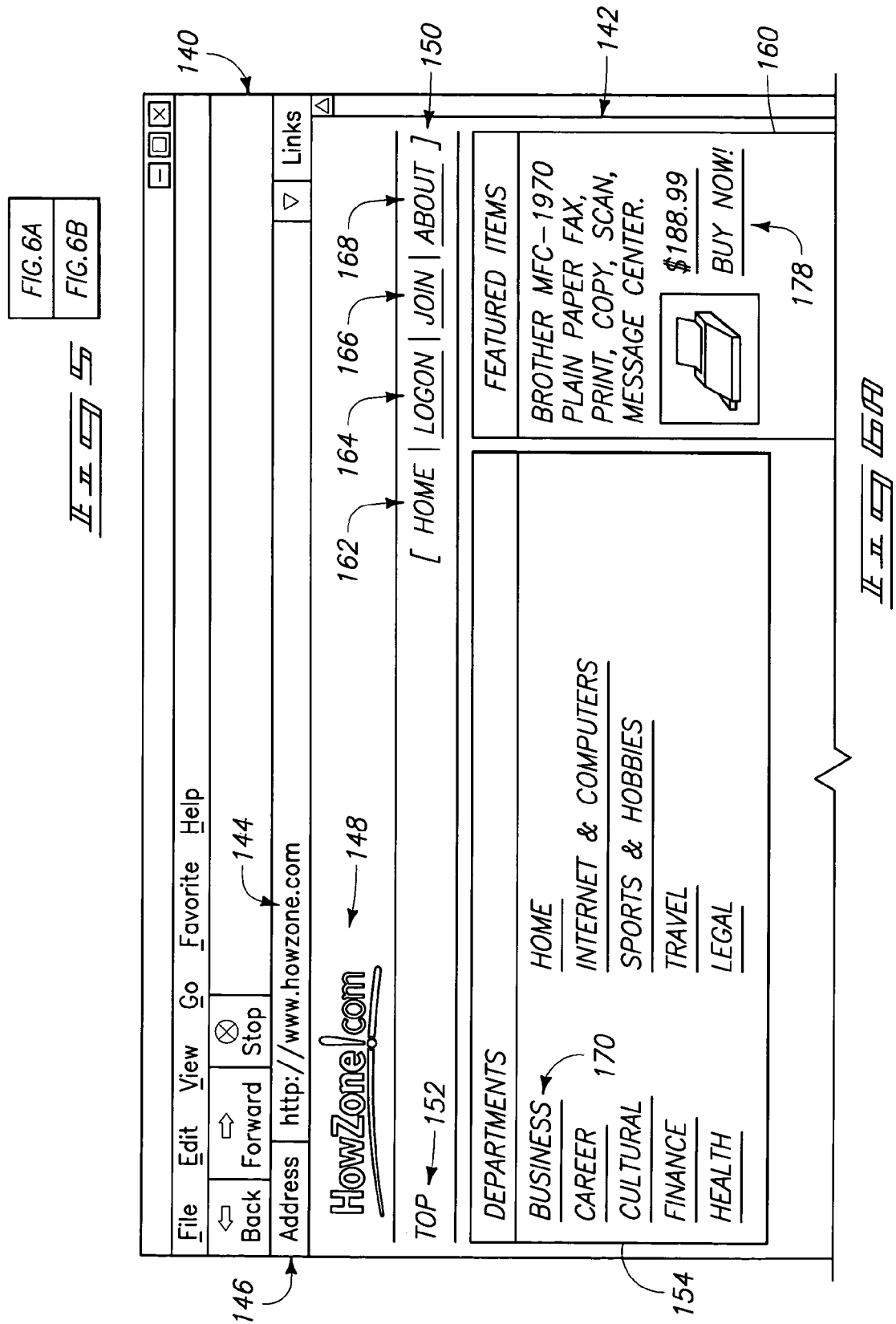
FIG. 5 is a diagram showing the assembly of FIGS. 6A and 6B.
FIGS. 6A and 6B together form a diagram of a screen display for a HowZone.com home page comprising a point of entry into a HowZone.com web site having a dynamically generated category network.

This disclosure of the invention is submitted in furtherance of the constitutional purposes of the U.S. Patent Laws "to promote the progress of science and useful arts" (Article 1, Section 8).

I. Overview

A system and a method are described for aggregating, enhancing, and distributing content objects with users over a network-based environment. According to one implementation, the users are customers and the content objects are provided by experts who desire to share information with such customers. First, a determination is made as to specific information that is desired by individuals. Secondly, a provider of information is encouraged to contribute information that matches the information that has been determined to be desired by individuals. Furthermore, contributors are given the ability to contribute information by uploading content and/or by distributing links to content that is available over a network system. Contributed information is distributed to individuals by making such information perceptible to individuals at distributed information access points. One technique entails making the information visually perceptible to individuals.

One suitable distributed information access point is provided by a token placed on a product, product packaging, a sign or an advertisement. Other distributed information access points comprise viewer perceptible screen displays on client computers or wireless web appliances. Distributed information access points enable placement of visually perceptible information in front of individuals, with distribution of such information being centralized through the network-based system. One form of a distributed information access point comprises a rich media banner ad. Another form of a distributed information access point involves co-branding information by placing a visually perceptible medium on a third-party web site where it can be viewed by an individual.

In order to organize links and/or uploaded content so that it can be viewed by individuals, a dynamically generated category network is implemented to sort and distribute information. By using a category network, portions of the network can be utilized to co-brand specific information using distributed access points.

A web site provided by Applicant's invention enables users to select links and/or content objects from the dynamically generated category network, placing such selections into a personalized access point. One form of such personalized access point comprises a personal web page present on Applicant's web site.

Yet another feature described below entails users ranking selected information, with the rankings giving indications that help other users select desirable information from Applicant's web site.

In order to learn more information about the specific information that individuals desire, a system and a method are provided to document and quantify demand for particular information that has been requested by an individual user. The quantification and documentation is carried out by sampling a world-wide user community which accesses Applicant's web site within a network environment and through use of a network system. Such a system and method use a user comment form, a centralized editorial and approval function, and a "Join the Waitlist" function. All of these functions are accessed through a distributed stand-alone access point, as will be described below with reference to the following figures and embodiments.

In operation, a user requests information, Applicant's web site (via a system administrator/staff) checks the requested information, then posts the request in public where other users can join a waiting list. The waiting list, or waitlist, publicly displays a proven demand to potential contributors of information.

In order to entice a potential contributor to contribute information that has been documented as being desired by specific individuals, a system and method are provided to use documented and quantified world-wide user demand for particular information in order to compel an individual and/or organization to contribute the particular information using a network system. In other words, a perspective contributor is shown a "waiting list" of users who desire particular information.

The system and method allow anyone to make a contribution by uploading web pages with graphics to be stored on Applicant's web site and system. The system and method then present the information to individuals who potentially desire such information. Additionally, users are allowed to provide links to other pages, and to add such links to Applicants' web site.

The system and method uses distributed information access points to more effectively reach a world-wide user community. User convenience is increased by providing a greater number of access points to information that is demographically selected to be more highly desired by users at that particular distribution point. The system and method uses a host web site that is connected to a world-wide network system in order to provide space for the distributed access points. The system and method also uses a centralized server system that is connected to a world-wide network system in order to provide the information and functionality found within the distributed access points. However, any type of network environment can be used. Applicant's system creates subsets of information, and loads the subsets of information into a file which can be included in a web page. A server on Applicant's web site then drives the information and functionality located in such file.

The use of a dynamically generated category network supports co-branding, wherein a portion of a category network is presented on a third-party web site. Information contained within distributed information access points is provided to a world-wide user community through the use of such dynamically generated category network and within a network system.

Personal web pages on Applicant's web site provide a system and method that allows any individual user within the world-wide user community to select information from any distributed stand-alone access point that is capable of being accessed within a network system. The information selected by any individual user is added to their own personalized, centralized consumption access point that is accessed with a network system. In one form, the personalized access point comprises a personal web site. Typically, such access is carried out using a client, such as a client computer. Accordingly, a user's personal web page keeps all of their collected information in one place, on a server of Applicant's web site.

Enabling users to rank selected information and drive content ranking simplifies the content object selection process of other users. Accordingly, contributors will be encouraged to do a good job so that they receive a relatively high ranking, and are listed higher within a listing on Applicant's web site that ranks orders from contributors based upon how highly they are ranked by previous users.

As will be described below in greater detail, staff and administrators at Applicant's web site are able to manage content categories, manage suggestions for content objects, manage content contributors, manage content objects, co-brand categories, and place commerce on content categories. Accordingly, the operation of Applicant's web site, as well as related web properties, is highly automated and is browser based. Accordingly, such administrative implementation scales, or can be increased in capacity or size, without limitation.

Content categories provide an organizational framework for Applicant's web site. The categories can be added, moved, hidden, deleted and have their appearance modified using a web browser by way of a dial-up or other Internet connection. Accordingly, a user does not need to be trained with HTML programming in order to carry out such tasks.

In order to manage suggestions for content objects, site visitors make suggestions which staff at Applicant's web site review and approve. The process consists of displaying an administrative page, as will be discussed below in greater detail. The administrative page contains suggestions, and the staff review and optimally reword such suggestions, then approve the content object for posting within one or more categories. This task is also performed using a web browser via an Internet connection.

For purposes of managing content contributors, content contributors are the organizations and individuals who contribute content objects to Applicant's web site. It is required that the content contributors be approved before they are allowed to make contributions to Applicant's web site. The process comprises displaying an administrative page that shows qualifications submitted by the contributors, reviewing the contributors, and approving the contributors. This task is also performed using a web browser and an Internet connection.

For purposes of managing content objects, content objects are assigned to one or more categories, with the content objects appearing within the category network for review, selection and use by site visitors. The content objects can be added, moved, edited, hidden or deleted using a web browser on an Internet connection.

With respect to co-branding of content categories, content categories are dynamically generated, database-driven web pages whose appearance is driven by separate files. Once these files have been assigned to a content category, the content category takes on the respective appearance assigned by such files. Based on input from sales and marketing personnel, staff at Applicant's web site will assign such files to these categories using a web browser on an Internet connection. According to one implementation, such files can be resident on a client's server, and can be maintained by the client. Alternately, such files can be uploaded and stored within the Applicant's system or another web server.

When placing commerce on content categories, content categories support commerce by assigning separate files which appear on the content categories. Once these commerce files have been assigned to respective content categories, commerce carried out within these categories is made visible to site visitors. Based on input from customers and sales and marketing personnel, staff at Applicant's web site will assign these commerce files to respective categories using a web browser and an Internet connection. The commerce files can also reside on a client's server, and can be maintained by such client.

II. Implementation Details

Reference will now be made to a preferred embodiment of Applicant's invention. One exemplary implementation is described below and depicted with reference to the drawings comprising a system and method for aggregating demand for information, compelling contributors to contribute content that satiates the demand, aggregating content so that users can easily access the aggregated content, enhancing the existing content, and distributing the content to users over a network system. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

A. Client/Server Exemplary Architecture

FIG. 1 illustrates a preferred embodiment of Applicant's invention wherein a basic system configuration is provided for aggregating demand, enhancing content, and distributing content objects with customers, and is identified with reference numeral 100. System 100 is usable with an online network 102 within a network-based environment in the form of a networked computer system 104. According to one construction, network 102 is provided by the Internet 106, and more particularly, the World Wide Web (WWW) 108.

According to one construction, network 102 is a client/server network having one or more clients, such as clients 110 and 112, and a web server 114. According to one construction, client 110 comprises a client computer 111, client 112 comprises a client wireless system 113, and web server 114 comprises a web server computer 115. One suitable wireless system 113 comprises a cellular system.

For purposes of this disclosure, the term "client" is understood to include a workstation or a computer, such as a personal computer, a hand-held computer, or a portable electronic device such as a wireless web appliance having computing capabilities, and provided within a client/server environment. A "client" is also intended to include a device present in a network, such as the Internet, that includes a software program for enabling a user to interact with the network and send and receive files, electronic mail, and/or data. Even furthermore, "client" is intended to include, in a network environment, a computer or workstation connected to the network and the server and including web-enabled appliances, or any other device having processing capabilities. It is further understood that a "client" can include a software component such as a web browser.

Also for purposes of this disclosure, the term "server" is understood to include one or more computers located at one or more physical locations and having a hardware component that serves code and data to the World Wide Web (WWW), and includes a web server computer including a software program that receives, manages, and responds to requests for documents and files. For example, such request can be structured using Hypertext Transfer Protocol (HTTP), wherein the requests are processed and then sent back to the client. Furthermore, for the purposes of this disclosure, the term "server" is understood to include computers located at one or more physical locations. These computers are understood to have a hardware component that serves data from a relational database as well as computers which provide the logic processing to access database information that is used to dynamically generate the code and data served to the World Wide Web (WWW) by the web server computer.

As shown in FIG. 1, it is understood that one form of online network 102 comprises a networked computer system 104. Networked computer system 104 includes a web server computer 115 as well as client computer 111 and client wireless system 113.

More particularly, client computer 111 includes a web browser 120, including a web document 122. According to one construction, web browser 120 comprises a software program configured to enable a user to access files from any computer that is interconnected with the Internet 106. Web document 122 comprises an electronic page or document that is visually perceptible by a user as an image on a visually perceptible interface for a client, such as a client computer.

Similarly, client wireless system 113 includes web browser 120 and web document 122, wherein web browser 120 and web document 122 are provided within a wireless web appliance 126. Wireless web appliance 126 remotely communicates via a wireless network 124 and a communication medium, or link, 117 via the Internet 106 with online network 102. Furthermore, web server 114 communicates with Internet 106 via communication medium, or link, 118.

With respect to client computer 111 and client wireless system 113, two variations of a client 110 and 112 are illustrated which are suitable for implementing the features of Applicant's invention. For purposes of explanation, client 110 will be used for the following discussion. More particularly, web server computer 115 comprises a hardware component capable of serving code and data to the World Wide Web (WWW) 108. Web server computer 115 enables the implementation of web server 114, and includes a software program that receives, manages, and responds to client requests for web documents and files. Accordingly, web server 114 includes system 100 for aggregating, enhancing, and distributing content objects that are consumed by users over a network-based environment. Web server 114 includes a web site 128 upon which system 100 is implemented, and is viewable by a user with a web browser 120 at clients 110 and 112, respectively. Web site 128 includes one or more web pages 130 and a database 132, in which links of searchable content objects are catalogued, and from which such links and/or content objects can be retrieved by a user at client 110.

As shown in FIG. 1, web site 128 includes one or more web pages 130 and a database 132. Each web page 130 includes a unit of information provided in the form of a data unit that includes text and/or graphics, audio, video, and/or other dynamic media. Client 110 and/or 112 can be used by a user in order to present such a data unit on a screen to a user, such as an individual searching for content objects identified by links which are retrieved from database 132.

For purposes of this disclosure, individual web pages can be active and include "hot buttons", or "clickable icons", or "links" which will also be referred to hereafter as "triggers". "Triggers" enable the launching of a simple application-software program and/or access to linked pages. It is understood that database 132 includes a collection of inter-related and/or non-related data including links that are stored together on web server computer 115, and which can include individual web sites that are accessible by a user via clients 110 and/or 112.

As also shown in FIG. 1, it is understood that a client computer 110 or 112 forms a general purpose machine capable of processing data by way of a set of instructions that is stored in a data storage device, such as memory. For the case where a computer is involved, the computer and peripheral components include hardware on which one or more software programs are implemented. Such hardware can include a processor or microprocessor; a hard disk drive; interface devices such as a display screen, a keyboard and a tactile input device; and other associated components that are readily understood in the art.

Furthermore, it is understood that web server computer 115 can include hardware such as one or more processors, or microprocessors; one or more data storage devices, such as a hard disk drive (HDD); memory, such as random access memory (RAM); and interface devices, such as a display screen, keyboard and/or a tactile input device.

As shown in FIG. 1, a visually perceptible medium 133, such as a token 134, can be applied directly on a product or on provided packaging, or printed on advertising materials, brochures, flyers or other notices. According to one construction, medium 133 comprises token 134, which is in the form of an adhesive applique or sticker on which an indicator 136 comprising indicia 135 is printed. In one form, indicia 135 includes an identification number that identifies a specific set of content objects, a single content object, or a link to one or more content objects. A user identifier 138, such as a user identification element, is presented by a user along with indicia 135 which has been retrieved by the user from token 134 at a visually perceptible location for submission to a client 110 or 112.

As utilized herein, the term "indicator" refers to anything that indicates, points out, shows or reveals something. Furthermore, the term "indicia" refers to an indicator such as an identifying marking or statement used to single out one thing from another thing, or to serve as a directional guide that shows the location, nature, quality or existence of something, such as an item.

According to FIG. 1, client computer 111 communicates with Internet 106 by way of a communication medium, or link, 116, such as an Integrated Services Digital Network (ISDN) telecommunications line, or a landline telephone line. ISDN is an international telecommunications standard for transmitting voice, video and data over digital telephone lines. However, it is understood that communication medium 116 can also include an analog telephone line, or any other communication medium or communication link capable of interconnecting a client 110 with an online network 102.

According to the implementation illustrated by client wireless system 113, communication medium 117 comprises a wireless communication link provided between a wireless network 124, such as a cellular network, and the Internet 106. One presently commercially available implementation for client wireless system 113 is provided by Sprint PCS Wireless Web, a wireless internet solution comprising a client wireless system 113 presently available from Sprint PCS, P.O. Box 140, London, Ky. 40744-7960, with further information available on the World Wide Web (WWW) at http://www.sprintpcs.com/wireless/index.html. Such client wireless system 113 includes a wireless web appliance 126 comprising a wireless telephone, including a wireless web browser 120 on which web documents 122 are visually perceptible and viewable by a user remotely, and in a wireless manner with web server computer 115. Accordingly, such solution includes a wireless web connection that is provided between wireless web appliance 126 and wireless network 124. It is further understood that web browser 120 comprises a compact web browser that is capable of being implemented on a wireless web-enabled telephone. However, it is understood that wireless web appliance 126 can take the form of a laptop computer, a pen computer, a hand-held computer, an electronic organizer, or any other device having wireless connectivity and a web browser capable of being interconnected with the Internet 106.

According to another construction, it is envisioned that client wireless system 113 utilizes a Wireless Application Protocol (WAP). WAP comprises a carrier-independent, transaction-oriented protocol provided for wireless data networks, and designed for substantially all types of networks. One version of WAP has been initially implemented on GSM networks. Suitable wireless telephones, such as digital wireless telephones, are presently available from Nokia Americas, of Irving, Tex.; Erickson North America, of Richardson, Tex.; and Motorola, Inc., of Schaumburg, Ill., which are capable of being utilized with WAP Version 1.1, which was released in June 1999. These web telephones include relatively large viewable screens and a scrolling mouse such that a visually interactive computer telephony system is provided to a user that enables remote and wireless connectivity via web browser 120 with web sites such as web site 128 on web server computer 115. However, it is understood that other wireless technologies can also be used.

As illustrated in FIG. 1, a visually perceptible medium 133 is presented for visual identification to a user of client 110 or client 112. Where a user visually perceives medium 133 at client 110, typically medium 133 comprises a portion of a screen display which is displayed to a user on a monitor of client computer 111 by way of web browser 120. As will be described below with reference to FIGS. 5-59, there exist a number of embodiments for presenting medium 133 in a visually perceptible manner to a user at client 110.

According to another implementation, medium 133 is presented to a user in a visually perceptible manner. The user visually identifies indicia 135, then logs into web site 128 via Internet 106 and wireless web appliance 126. The user then submits an identification number 136, comprising indicia 135, and their user identifier 138 to web server computer 115 such that content objects associated with identification number 136 are made available to this user via a network-based personalized access point within web site 128, as will be discussed below in greater detail. It is further understood that such selection of content objects may be carried out on behalf of the User by another user or automated selection system as directed by the user.

For example, the selection of content objects may be carried out by a clerk at a cash register within a store on behalf of a customer. Similarly, the selection of content objects can be carried out by a salesperson at a sales booth within a trade show on behalf of a user wherein the user carries a smart card that identifies the user and the user's personal web page, and the salesperson swipes the smart card into a card reader in order to retrieve the user's identification. An even further example contemplates such selection of content objects being carried out when a user purchases a product at a web site, and the web site checkout page requires an inputting of personal user and payment information, and includes a checkbox that directs the transfer of information into the user's personal web page when the user checks the box.

According to such implementation, a user selects indicia 135 at one location using appliance 126, and consumes information that corresponds with indicia 135 at another location. For example, a user submits indicia 135 via web appliance 126, then receives content objects and/or links to content objects and consumes content objects corresponding with indicia 135 when they return home from the store using their home-based personal computer. The content objects can be consumed directly by viewing received content, or by accessing content objects using links.

Accordingly, client wireless system 113 comprises a mobile internet service that allows access by way of links which are retrieved from web site 128 to content objects present within online network 102. The collection of such content objects, the provision of such content objects, and the availability with which such content objects are aggregated, ranked, distributed, dispersed, and received by the user falls within the novel aspects of Applicant's invention, as described below with reference to FIGS. 2-61.

Accordingly, system 100 of FIG. 1 enables the aggregation of content objects according to the process flow diagram of FIG. 2, and as detailed in FIGS. 5-61. Furthermore, system 100 enables the enhancement of aggregated content objects by assessing demand for content and compelling content providers to contribute content objects to the network, as described below with reference to the process flow diagram of FIG. 3, and further in reference to FIGS. 5-61. Even furthermore, system 100 illustrates one technique for distributing aggregated content objects to users by way of a wireless web appliance, and by using product-associated indicia that identify a set of predefined, yet dynamic aggregated content objects, as shown in the process flow diagram of FIG. 4 and in reference to FIGS. 5-61.

It is understood that system 100 aggregates content objects in a number of different ways. FIG. 2 illustrates one implementation for aggregating content objects, as will be described below with reference to FIG. 2. System 100 also enhances aggregated content objects by assessing the demand for content and compelling content providers to contribute content objects to the network. FIG. 3 illustrates one exemplary implementation for enhancing aggregated content objects in such manner. System 100 also distributes aggregated content objects to users by way of a wireless web appliance and product-associated indicia that identify a set of predefined, yet dynamic aggregated content objects. FIG. 4 illustrates one exemplary implementation for distributing such aggregated content objects to users. However, it is understood, with respect to the implementations depicted in FIGS. 2-4, that other implementations are readily known for aggregating, enhancing and distributing content objects to users, as will be described below with reference to screen displays 5-61. Furthermore, it is understood that alternative implementations will be readily understood with reference to the following general discussion relating to the novel aspects of Applicant's invention.

In order to better understand the claimed aspects of Applicant's invention, a detailed example is presented below for aggregating content objects, enhancing aggregated content objects, and distributing aggregated content objects with respect to FIGS. 2-4, respectively.

FIG. 2 forms a process flow diagram showing the logic processing for aggregating content objects using system 100 (of FIG. 1). More particularly, FIG. 2 illustrates logic processing used to aggregate content objects.

As shown in FIG. 2, a logic flow diagram illustrates the steps implemented by the system of Applicant's invention when aggregating content objects.

In Step "S1", a web site on a web server provides a database capable of being associated with content objects that are accessible over a communication medium. One such database comprises database 132 of web site 128, accessible over one or more of communication links 116, 117, and 118 (of FIG. 1). After performing Step "S1", the process proceeds to Step "S2".

In Step "S2", the system associates one or more content objects with a distribution mechanism. One suitable distribution mechanism is provided by a visually perceptible medium 133 in the form of token 134 having indicia 135 such as identification number 136. It is understood that identification number 136 can take a number of forms, including numerical code, alpha-numeric code, alpha code, universal product code (UPC), electronic product code (EPC), or bar code. Another form of distribution mechanism is the utilization of any other form of visually perceptible medium 133, such as presenting an icon, window, banner, or electronic token over a visually perceptible interface to a user, such as a display of a client computer 111 (of FIG. 1). After performing Step "S2", the process proceeds to Step "S3".

In Step "S3", an individual requests a desired content object for personal consumption from distributed information access points such as a visually perceptible medium. Various forms of a visually perceptible medium are envisioned, including one or more objects and/or links located within a web page, a portion of a co-branded web page, a banner, a button, a clickable icon, a clickable graphic, or a hypertext link located on someone else's web page, a content object token, and/or a networked device such as a networked cash register, bar code scanner or electronic product code reader. After performing Step "S3", the process proceeds to Step "S4".

In Step "S4", requested content objects or links to content objects are received into a network-based personalized access point. One such network-based personalized access point comprises a personal web page located within a web site 128 of a web server computer 115 in system 100 (of FIG. 1). After performing Step "S4", the process proceeds to Step "S5".

In Step "S5", the requested content objects are dynamically modified to provide subscribing users with access to current or modified information within their personalized access point. After performing Step "S5", the aggregating of content objects of Applicant's invention terminates.

It is understood that FIG. 1 illustrates one aspect of Applicant's invention. However, it is also understood that Applicant's invention can be applied to any device that is capable of connecting to a network-based environment such as intranets, or any interconnected arrangement of devices capable of aggregating and distributing information to users.

FIG. 3 forms a process flow diagram showing the logic processing for enhancing aggregated content objects by assessing demand for content and compelling content providers to contribute content objects to a network.

In Step "SS1", a server of Applicant's web site receives a suggestion from a user for a new content object for addition to a database. For example, database 132 of web site 128 can be accessed by a user via client 110 in order to suggest a new content object which is to be added to database 132 (of FIG. 1). Optionally, client 112 can be used to access database 132 where full web browser capabilities are provided on the corresponding wireless web appliance. After performing Step "SS1", the process proceeds to Step "SS2".

In Step "SS2", a third party, such as a provider and/or web site administrator for web site 128, approves the suggested content object. For example, a web administrator can review the suggested new content object of Step "SS1", then approve the suggested content object, thereby presenting the suggested content object onto a web page 130 of web site 128 (of FIG. 1). After performing Step "SS2", the process proceeds to Step "SS3".

In Step "SS3", a list of information users desiring the content object, or a waitlist, is generated or created which includes information users that desire the suggested or approved content object. After performing Step "SS3", the process proceeds to Step "SS4".

In Step "SS4", an information provider is compelled to generate the desired content object which was suggested, approved and placed onto a waitlist, based at least in part on demand that is identified by the generated waitlist. After performing Step "SS4", the process proceeds to Step "SS5".

In Step "SS5", the generated content object is contributed, or made available, to the database. For example, a generated content object is consequently added to database 132 of web site 128 (of FIG. 1). After performing Step "SS5", the process proceeds to Step "SS6".

In Step "SS6", users placed on waitlists are notified of the availability of a requested content object. Accordingly, users who have previously joined a waiting list, or waitlist, are notified that a content object that they are waiting for is now available. Such users can then gain access to the content object. For example, one notification technique involves notifying the users by e-mail where an e-mail message contains a clickable link that allows a user to add the content object to their personal web page by clicking on the link. After performing Step "SS6", the process is terminated.

As shown in FIG. 4, a logic flow diagram illustrates the steps implemented by the system of Applicant's invention showing part of the logic processing for distributing aggregated content objects to users by way of a wireless web appliance and product-associated indicia that identify a set of predefined, yet dynamic aggregated content objects.

In Step "SSS1", a database is provided on a server at a first location. The database is operative to store indicators that are associated with the content objects. The content objects are accessible over a communication link. After performing Step "SSS1", the proceeds to Step "SSS2".

In Step "SSS2", an individual or user observes a visually perceptible medium in the form of a token upon which an indicator such as visually perceptible indicia is/are provided or presented to the individual/user. The product-associated indicia identify a set of predefined, yet dynamic aggregated content objects. The dynamic feature of the aggregated content objects relates to the ability of a content provider and/or system administrator to periodically change or update components of the set of predefined aggregated content objects that are identified by the product-associated indicia. After performing Step "SSS2", the process proceeds to Step "SSS3".

In Step "SSS3", a network user subscribes to content objects by submitting the indicator as well as user information, or identifier, to a web page. For example, a user submits indicia 135 in the form of an identification number 136 and user identifier 138 to web page 130 (of FIG. 1). According to one implementation, user identifier 138 comprises a user-assigned alpha-numeric identification which identifies the particular user so that a content object corresponding with identification number 136 can be deposited within such user's personal web page at Applicant's web site. The indicia are understood to identify a set of predefined, yet dynamic aggregated content objects to which the user wishes to subscribe. After performing Step "SSS3", the process proceeds to Step "SSS4".

In Step "SSS4", a subscriber, or user who has subscribed to content objects, receives the content objects and/or links to the content objects into a network-based personalized access point. For example, a user of client 110 or 112 subscribes to content objects by submitting indicia and user information to web page 130. One or more aggregated content objects that are identified by the indicia are received within a personal web page of web site 128 which forms a network-based personalized access point which is accessible by the user at client 110 and/or 112. Exemplary details are provided below with reference to FIG. 15. After performing Step "SSS4", the process terminates.

It is understood that FIGS. 2-4 each illustrate a particular aspect of Applicant's invention. However, it is also understood that Applicant's invention can be applied to other systems and methods for aggregating content objects, enhancing aggregated content objects, and distributing aggregated content objects to users by way of a network.

FIGS. 5-61 illustrate by example graphical user interface features as seen from a client by a user or system administrator and comprising hypertext mark-up language (HTML), front end user tools that are provided as an extension to a web server 114, and software resident in memory on web server computer 115 (of FIG. 1). Such user interface features are implemented on a web server computer and are presented below to illustrate one implementation of Applicant's system and method for aggregating, enhancing, and distributing content objects with customers over a network-based environment. According to one implementation, the network-based environment comprises an online network which is shown as the Internet, and more particularly, as the World Wide Web (WWW).

As shown in FIGS. 5-61, a graphical user interface on a client such as a display screen is used to display individual web pages in the form of screen displays, or screens. Each screen contains icons, or triggers, that may be clicked on in order to select different services and/or to navigate between the web pages.

FIGS. 5-19, 21-37, and 40-61 each form diagrams of exemplary screen displays that the computerized system of Applicant's invention provides to a user during various steps when navigating through the content object web site. For purposes of this disclosure, it is understood that a screen displays at least a portion of a web page, and that the screen includes a window which is a predefined part of virtual space. Accordingly, a screen can include selection buttons, pop-up menus, pull-down menus, icons, links, buttons, scrolling lists, data entry fields, embedded content objects, radio buttons, check boxes, and other usable and selectable items capable of being configured or selected with a cursor using a tactile input device such as a pointer, a mouse, and/or a keyboard or button. It is further understood that in dynamically generated, database driven web sites such as these that web pages are created, upon demand, from data stored in databases within the Applicant's web site and system and on other web servers elsewhere on the World Wide Web (WWW).

Applicant's system and method are implemented by way of Applicant's web site, HowZone.com, corresponding to web site 128 of online network 102 (of FIG. 1). One exemplary web site address is http://www.HowZone.com. Individual, private web ages within such web site are only accessible by registered and assigned users who want to aggregate, enhance, and/or distribute content objects within the system of Applicant's invention and on Applicant's web site. For example, the screen displays of FIGS. 13 and 14 illustrate personal user web pages, or "personal HowZones", where a user can access links to content objects and/or content objects which have been collected therein using Applicant's web site.

Each user's "personal HowZone" is accessed by an opening security screen (not shown) which can be presented to a user who is accessing Applicant's web site or presented to a user via other distributed information access points managed by Applicant's system. Such an opening security screen to a user's "personal HowZone" prevents the general public from accessing information which has been provided to that user's personal HowZone, or personal web page.

Furthermore, the aggregating of content objects encompasses the adding of particular links to content objects. Additionally, such aggregation encompasses the provision of content within content objects to the personal web site by a user and/or an authorized party such as a system administrator on Applicant's HowZone.com web site.

An opening security screen (not shown) is provided as a login screen to users that are entering their "personal HowZone". Such an opening security screen, or login screen, includes user identification information (identifier 138 of FIG. 1) and a password which are entered into a web site identification block in the form of text and/or numeric information. For example, an opening security screen to a user's "personal HowZone" comprises a login and password access screen that is presented to the user by way of Applicant's HowZone.com web site as described below in greater detail with reference to FIGS. 5-61. Further details of such access are also described below in greater detail.

B. Category Network

Figure 6B:
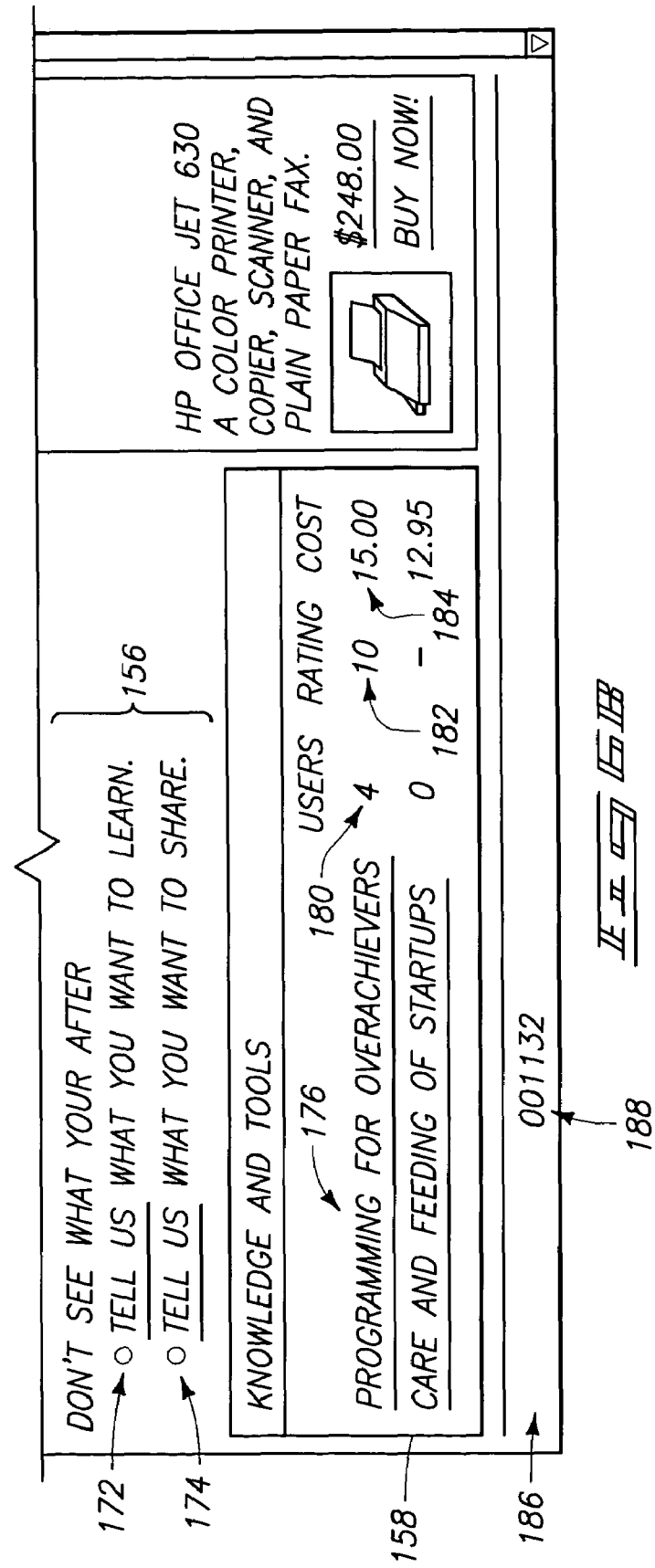

FIGS. 6A and 6B (referred to herein as FIG. 6), assembled according to FIG. 5, together form a diagram of a home page screen display that a client 110 (of FIG. 1) provides to a user immediately following access to the web site of FIG. 1. For the case of individuals who want to search the web site for information, the user merely navigates through the web site using a web site browser. A generic browser overlay 140 is shown in FIG. 6 in which the screen display 142 is presented. With reference to FIGS. 7-19, 21-37, and 40-52, overlay 140 has been omitted in order to simplify the drawings. However, it is understood that overlay 140 will be used to access and present the corresponding screen displays for such figures to a user. A similar overlay 1140 is shown with respect to FIGS. 53-61.

The screen display of FIG. 6 is presented to a user following access to Applicant's HowZone.com web site. One technique for accessing the web site comprises entering a Uniform Resource Locator (URL), or address, that defines the route to a file located on the World Wide Web (WWW). As shown in FIG. 6, the URL address http://www.HowZone.com is entered within an address entry field 146 so as to access screen display 142.

With respect to navigation within Applicant's web site, HowZone.com, a dynamically generated category network is employed in order to provide relatively easy access to content objects within the web site. A user of Applicant's web site can browse the category network, further described below with reference to FIG. 20, in order to quickly find relevant information in the form of content objects. Various links are provided within the screen displays of Applicant's web site to enable up-tree (toward a point of entry) and down-tree (downward away from a point of entry) navigation within the category network.

For example, clicking on a link within the category tree as displayed on screen display 142 results in the display of a content detail page corresponding with such link. The content is then categorized and the presentation order is determined by a relative ranking of the content. In order to organize content, Applicant's web site performs content categorization and ranking. Furthermore, Applicant's web site assigns relative value to the organized content, and further helps users find the organized content, as will be described below in greater detail in the screen displays corresponding with the following figures.

Applicant's web site, HowZone.com, provides a descriptive content detail page for each content object. Additionally, users of a content object can rank the content object, with the rankings being aggregated on Applicant's web site where they are periodically generated and displayed. Details of the above-described content object categorization and ranking techniques will be described below in greater detail with reference to FIGS. 8-61.

FIG. 6 illustrates a home page screen display which forms a point of entry for a user accessing Applicant's web site by way of an interface at a client. For example, a user accesses web site 128 of client 110 by way of a computer monitor, a keyboard and a mouse (see FIG. 1). Screen display 142 of FIG. 6 includes a URL 144 which is entered by a user desiring to access Applicant's web site which is entered within an address entry field 146 of browser overlay 140. Screen display 142 includes a header 148 which is herein illustrated as a graphical and textual entry, or logo, identifying Applicant's web site as "HowZone.com". Screen display 142 also includes a "site navigation bar 150" which includes a home page identifier 152. Furthermore, screen display 142 includes a "current category" listing box 154, a "user input" section 156, a "content object links" listing box 158, and an "other embedded" content box 160.

As shown in FIG. 6, site navigation bar 150 includes home page identifier 152, which comprises a point of entry for a user entering Applicant's web site, HowZone.com. Such identifier 152 forms a base entry point, or point of entry (POE), for the category tree which is used to hierarchically categorize content objects associated with Applicant's web site. For example, node 1 of FIG. 20 corresponds with the "top" home page identifier 152 of FIG. 6, according to one organization of a category tree. Additionally, site navigation bar 150 includes a "HOME" link 162, a "LOGIN" link 164, a "JOIN" link 166, and an "ABOUT" link 168.

As shown in FIG. 6, "HOME" link 162 is disabled because link 162 enables a user to access the screen display of FIG. 6. "LOGIN" link 164 enables a user to navigate to a login screen (not shown) and access their personal HowZone. "JOIN" link 166 enables a user to navigate to a join screen display for enabling a user to obtain their own personal HowZone comprising a personal web page on Applicant's web site and corresponding with FIG. 14. "ABOUT" link 168 enables a user to navigate to a screen display (not shown) that provides information about Applicant's HowZone.com web site to the user.

Sub-category listing box 154 includes a plurality of dynamically generated links to sub-categories of the current category. For example, a "business" link 170 enables a user to navigate to a corresponding screen display associated with a node in Applicant's category tree. An associated set of categories, comprising sub-categories of such "business" category, will be displayed within a similar current category listing box.

An "other embedded content" box 160 contains embedded content associated with a third-party web site, and containing links which enable a user to access third-party information and/or to conduct purchases. For example, a "buy now" link 178 enables a user to submit a purchase request to a third-party web site in order to buy content such as a featured printer which is displayed within box 160.

"User input" section 156 can notify Applicant's web site about information that is not seen on Applicant's web site. For example, "Tell us what you want to learn" link 172 enables a user to inform Applicant's web site about information that they would like to learn. Similarly, "Tell us what you want to share" link 174 enables a user to inform Applicant's web site as to information that they would like to submit to Applicant's web site in order to meet a perceived demand for such information by other users of Applicant's web site.

A "content objects link" listing box 158, entitled "knowledge and tools", contains an updatable listing of dynamically generated links to content objects that are stored within Applicant's web site, and which correspond with the category presently associated with box 154. For example, a "programming for overachievers" link 176 comprises a link to a content detail page that is accessible by way of a network system that is retrievable over a network-based environment, such as the Internet. Applicant's web site tracks information associated with the content objects that are represented and identified by link 176. For example, a "number of users" field 180 tracks the number of users that have selected the content object represented by link 176. A "current rating" field 182 tracks the average rating that such users have attributed to link 176, after reviewing the content that is associated with link 176. Furthermore, an "access fee" field 184 displays an access fee, or cost, associated with a user retrieving information via link 176.

Furthermore, screen display 142 of FIG. 6 includes a footer capable of containing information such as copyright notices for Applicant's web site, as well as a counter 188 that indicates the number of users that have accessed such web site, or a particular screen display associated with such web site. It is envisioned that additional information can be provided within footer 186, such as information that identifies Applicant's web site, wherein such information is easily updatable due to the features of footer 186.

FIG. 7 is a diagram of a "business" category screen display that a client provides to a user after clicking on the business sub-category link 170 on the screen display of FIG. 6. More particularly, navigation bar 150 includes a "top" link 190 which allows a user to navigate back to the screen display of FIG. 6, and a "business" present page identifier 192 which corresponds with the "business" category displayed in FIG. 7.

As shown in FIG. 7, business present page identifier 192 corresponds with a business category that has a parent of "top" which is located in an up-tree direction from the business category. Current category listing box 154 lists the "departments" or sub-categories that are present in a down-tree direction within the business category. For example, a "technology" sub-category link 194 is provided within current category listing box 154.

Furthermore, content objects link listing box 158 contains knowledge and tools associated with the "business" category. For example, content objects link listing box 158 includes a "creating a pdf file from Quark XPress" link 196.

A user can navigate to the "technology" sub-category of the "business" category by selecting link 194. Similarly, a user can navigate to a screen display and page which allows a user to gain access to information about how to create a pdf file from Quark XPress by selecting link 196.

For purposes of understanding the navigation between screen displays of FIGS. 5-61, it is understood that web site 128 (of FIG. 1) comprises a database-driven web site such that the illustration of fields is understood to include a database behind such fields. Furthermore, a category network is dynamically generated. The category network, described below in greater detail with reference to FIG. 20, uses a building block called a "category" which uses a concept referred to as a "parent". It is understood that each "category" has a corresponding "parent". Accordingly, a grandparent, parent, child relationship forms an association which generates a tree structure. It is understood that categories can have multiple parents. However, it is also understood that one or more of the categories may have no parent relationship.

As illustrated by the categories and sub-categories provided within navigation bar 150 and listing box 154, each category is displayed to a user by a web browser via Applicant's HowZone.com web site or via a third-party web site. The use of such a third-party web site can potentially have a different visual appearance. Each of such displayed categories has an "up-tree parent" unless the category is point of entry, or home page, identifier 152 (of FIG. 5). Such "up-tree parent" provides a navigable back path, or a hyperlink, that enables a user to navigate all the way up the tree to the point of entry identified by the point of entry, or home page, identifier 152 (of FIG. 5). Additionally, each category has a "down-tree child" which extends as far as the inheritance continues to exist as a navigable path, or hyperlink. Such "down-tree child" is manifest in the form of the sub-categories present within box 154. It is further understood that a selected sub-category, such as "technology" link 194 identified in box 154 will allow a user to navigate to a new screen display which will provide yet further sub-categories to a "technology" category.

Additionally, each category has a listing of content objects assigned to the category. It is understood that content objects can be assigned to multiple categories, and that the listing of content objects are assigned to each category as navigable hyperlinks which lead to a page containing information about that content object and providing links to allow the user to join a waitlist, contribute to the content object, or subscribe to the content object.

Each category also includes header information. For example, a "HowZone.com header 148" is depicted in FIGS. 6 and 7. Such header information can include one or more of a logo or other graphics, a clickable button, a hyperlink, or other visually perceptible medium.

Other information associated with categories includes footer information, such as copyright notices and other information. For example, counter 188 is illustrated in footer 186 of FIG. 6. Finally, each category can have other information such as commercial offerings or sponsorship of third-party links, as will be described below in greater detail with reference to several figures. The use of a footer makes updating of the information relatively easy.

A password-protected administrative function is provided in association with the HowZone.com category network. Each category is provided with a unique name, a display name which is not necessarily unique, a parent attribute, a date of creation and date modified fields, one or more display and delete toggles, and include files for use with a page header, a footer, and other embedded information or commerce links. It is understood that all of the "include" files have an optionally selected "subs" inherent function which causes each subcategory beneath this category to inherit and display the same "include" files. Each category is provided with a category identification, or I.D. Additionally, the administrative function includes a display which lists each category, an "add new category" function, and an "edit existing category" function.

As discussed above, one characteristic of "categories" present within a category tree is that such "categories" have "include" files. Examples of "include" files are provided by a header, a footer, embedded commerce links or other information. These "include" files have an optionally selected "down-tree inheritance" characteristic which passes on the "include" file. In this case, the inherited "include" file causes all down-tree categories to display the same "include" file. For the case where there is no "include" file assigned to a page or none is inherited from a parent, a default "include" file is caused to be selected and visually displayed. "Include" files can reside on any server that is connected to the World Wide Web (WWW). As a category page is displayed, the "include" files are read and placed into the page. Given the dynamic nature of a category network structure, it is possible for a given department to have multiple parents. In such a case, the inheritance of "include" files is arbitrated by making a specific declaration as to the parent from which an "include" file is inherited.

Reference is made to "other information" above. One example of such "other information" is provided by commerce listings such as the content provided within the "other embedded content" box 160 of FIG. 6.

The box descriptor "departments" present within listing box 154 describes all the branches extending from a "business category" of the category tree. According to the category tree implemented by Applicant's web site, a user is enabled access at multiple points of entry within the category tree, or network. More particularly, a back path is dynamically generated by forming an ordered list of user selections. This list can be created at any time so as to enable a user to access a point of entry at multiple locations by merely selecting the locations from within the site navigation bar 150 where they are generated and displayed to the user.

A user gains access to any particular category page within what the Applicant calls a dynamically generated multiple point of entry category network (DMPCN) by entering a [URL]+[?cid=#], where the "?cid=#" is a category identification. Accordingly, a user can specify any category in this way, and enter the network at that specified point. The point is then referred to as a point of entry (POE). Although the point of entry category may have parent categories, they will not appear to the user entering the category network at this point. Only down-tree children are displayed to a user via the site navigation bar 150 and only once they navigate in a down-tree direction by clicking links in box 154. For example, the point of entry category may not actually be at the top of the network. In the case of the tree shown in FIG. 20, the point of entry may be located at node 2 such that the point of entry is not located at the top of the network, but only down-tree categories appear to a user who uses node 2 as a point of entry. Accordingly, if a user enters the network part way down the tree structure, no upward navigation path is provided to the user, unless a link is explicitly added to the corresponding header file.

The provision of a dynamically generated multiple point of entry category network (DMPCN) enables a web site provider to sell sponsors a "private tree". Sponsors link to the "private tree" by adding to their web site, a hypertext link, button or trigger linking to a HowZone provided URL+ [?cid=#] as described above. Such "private trees" can be used to display the sponsors' co-branded commerce by using "include" file. To add further value to the sponsors' web site, no access is provided in an up-tree direction from their private area unless a HowZone.com administrator optionally puts a specific "go-to-top" link in the header of the sponsors' web page. Accordingly, a HowZone.com web site administrator is provided with the ability to sell portions of the overall tree to selected sponsors, and furthermore to implement co-branded commerce.

C. Personal Web Page

FIG. 8 is a diagram of a "personal HowZone" comprising a private or personal web page for a new user of Applicant's web site, HowZone.com. Users can add relevant information to their personal web page, making selections that are identified from a visually perceptible medium. The screen display of FIG. 8 is absent of any content objects because no content objects have been selected by the new user at this point. A membership login screen (not shown) is provided to a user who wishes to join Applicant's web site in order to obtain a "personal HowZone", or personal web page. Once registered, the user receives a "personal HowZone" web page, with an associated user identification and a password. Upon receipt of such "personal HowZone" web page, the web page does not initially contain any content objects. A user is then provided with the ability to browse for content objects within Applicant's web site, HowZone.com or within other co-branded HowZones that are accessed via a partner's web site or other distributed information points managed by Applicant's system. Upon finding content objects of interest, the user can add these content objects to their personal web page, or "personal HowZone".

For purposes of this disclosure, it is understood that the term "personal HowZone" comprises a dynamically generated personal web page that is presented and tailored for use specifically by a single, identified user. Upon creation, such web page is empty of any content objects.

As shown in FIG. 8, a "personal HowZone", or personal web page, 198 is shown for "Suzi Henriot", who is identified within site navigation bar 1150. Navigation bar 1150 includes a user identifier 200, herein identifying "Suzi Henriot", an "account" link 202, a "contributions" link 204, a "browse" 206, a "my history" link 208, and a "logout" link 210. User identifier 200 enables a user to access their personal account. Link 204 enables a user to make contributions to the HowZone.com web site, as will be described below in greater detail. Link 206 enables a user to browse the HowZone.com web site for content objects which are of potential interest to the user. Link 208 enables a user to review the history of use of content objects they have subscribed to in the past. Link 210 enables a user to logout from their personal web page.

A personal content object listing box 212 contains a box descriptor entitled "MY KNOW-HOW". Within such box 212 are provided specific content objects which have been selected for consumption by the user. However, the screen display of FIG. 8 does not show any content objects since such screen display represents a personal web page for a brand new user. Personal content object listing box 212 also includes an "expires" descriptor 214 and a "ratings" descriptor 216 which identify when access to selected content objects expires, and further identify user-issued ratings for such content objects, which will be described below in greater detail. A bottom portion of listing box 212 includes a "send ratings" button 218 which enables a user to submit and send ratings for content objects that have been added to the user's personal web page and displayed within listing box 212. "Reset" button 220 enables a user to reset "ratings" information that has been entered within "ratings" pull-down menu 236 below "ratings" descriptor 216.

Figure 9:
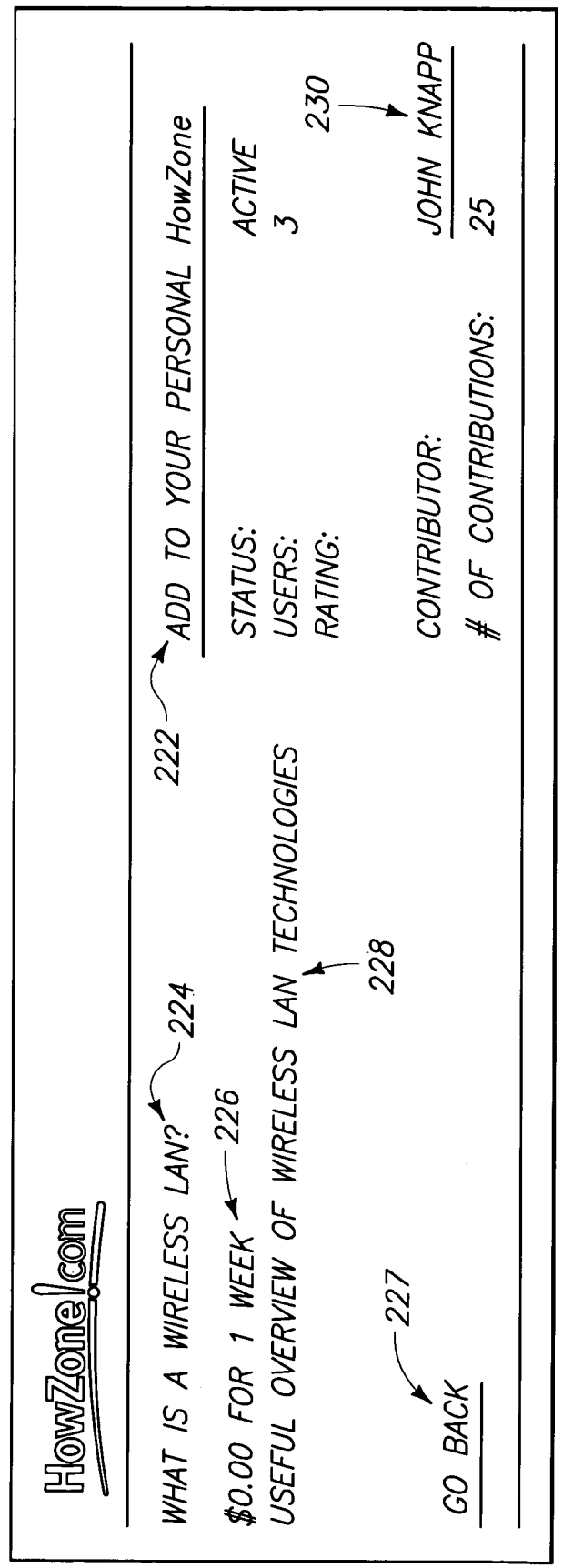
FIG. 9 is a diagram of a screen display for a content detail page having a link usable to add the described content object to a user's personal HowZone.

FIG. 9 is a diagram of a content detail page which has been selected by a user of the HowZone.com web site corresponding with selecting a link from within content objects link listing box 158 (of FIGS. 6 and 7). By navigating through the dynamic category network of Applicant's web site or other distributed information access point, a user encounters such content objects when browsing through the web site or other distributed information access point, then selects such content objects if they are of interest.

The screen display of FIG. 9 comprises a content detail page and includes an "add to your personal HowZone" link 222, which adds the corresponding content object to the user's personal web page 198 (of FIG. 8). More particularly, a corresponding content object entitled "what is a wireless LAN?" will be added to the listing box 212 of FIG. 8 when a user clicks on link 222 of FIG. 9. A content object title 224 is displayed to a user, along with a subscription cost statement 226 and a description 228 of the content object. "Go back" link 227 enables a user to navigate backwards to the screen display of FIG. 8. A "contributor" link 230 opens up a pop-up menu (not shown) that shows a profile of the specific content object contributor. Here, the content object contributor is identified as "John Knapp". When a user identifies a content object of interest, the user views the content detail page shown by the screen display of FIG. 9. If the user wants to add the content object to their personal HowZone, the user clicks link 222, thereby adding the content object to the user's personal HowZone present within box 212 of FIG. 8. If there is cost associated with adding such content object, the user can pay for the corresponding charge by way of a credit card transaction which is implemented by way of an associated commerce page (not shown) which provides a credit card transaction screen display to be displayed to a user, and from which credit card information can be entered and transmitted therefrom.

It is understood that, when a user adds a content object to their personal HowZone, they are actually adding a "link" to that specific content object, wherein the link is actually provided on the user's personal web page, within box 212 of FIG. 8. Such link then enables the user to navigate to the specific content object when viewing their personal HowZone. Once a content object link has been added to a user's personal HowZone, the user can then navigate to such content object by selecting the link from their personal HowZone present within box 212 of FIG. 8.

For purposes of this embodiment, link 222 is present in all currently active content objects that are capable of being displayed to a user from Applicant's web site or from a partner's web site. Any user who has an account with Applicant's web site can select content objects by clicking a link on a content detail page and, if required, by paying an access fee.

In operation, a selected content object is added to an enrollments database table which maintains a relationship between the specific user and the content objects which have been selected. The enrollments table includes fields for user identification (I.D.), content object identification (I.D.), rating, date record created, date record modified, and date subscription expires. In summary, the following functionality becomes available to a user: browsing content listings, viewing content detail pages, selecting content objects, and paying fees (if required).

Figure 10:
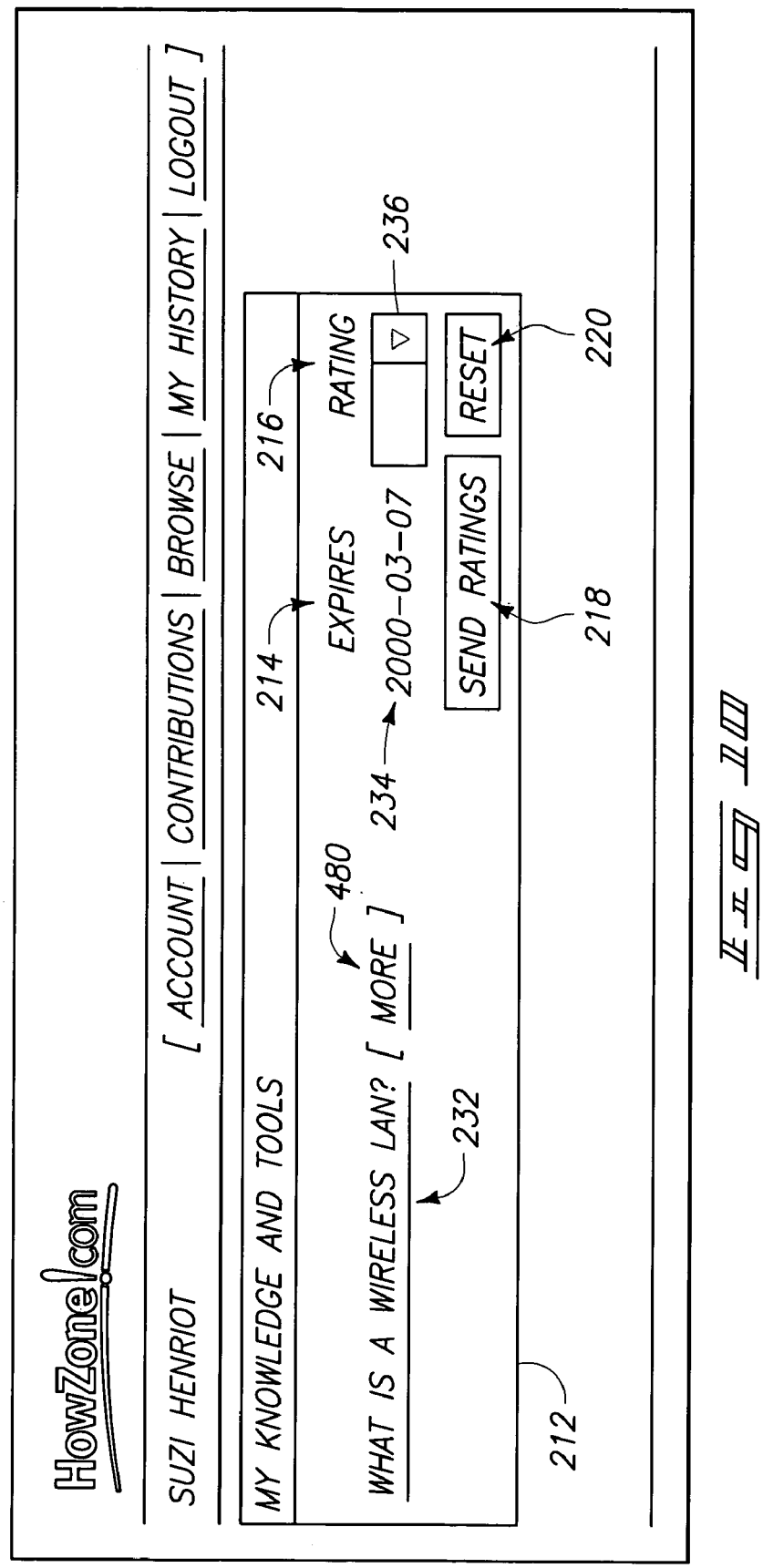
FIG. 10 is a diagram of a screen display for the personal HowZone of FIG. 8, after the addition of a content object to the user's personal HowZone.

FIG. 10 is a diagram of the personal web page, corresponding with the personal web page of FIG. 8, but showing the addition of a link to a content object that has been added to the user's personal web page, or personal HowZone. As shown in FIG. 10, a specific content object access link 232 is provided which corresponds with the content object title 224 entitled "what is a wireless LAN?" of FIG. 9.

As shown in FIG. 10, box 212 contains link 232 to a specific content object. An expiration date field 234 lists an expiration date of 2000-03-07 beneath the "expires" descriptor 214. A "ratings" pull-down menu 236 is provided beneath the "ratings" descriptor 216, enabling a user to select one of a plurality of ratings that correspond with the content object identified by link 232. A user merely selects button 218 in order to submit, or send, the ratings to Applicant's HowZone.com web site. A user merely selects reset button 220 in order to reset the selected ratings for the content object corresponding with link 232.

It is understood that, after selecting a content object by selecting link 222 of FIG. 9, the user can return to his/her personal HowZone in order to access one or more specific content objects by way of link 232 in FIG. 10. After selecting such content object(s) via link 222 of FIG. 9, link 232 appears within the user's "personal HowZone", or personal web page. In order to create such a dynamically generated personal web page, Applicant's HowZone.com system reads from enrollments tables, and retrieves links to all content objects for that user where the enrollment expiration date is greater than the current date, corresponding with an expiration date provided within date field 234.

Figure 11:
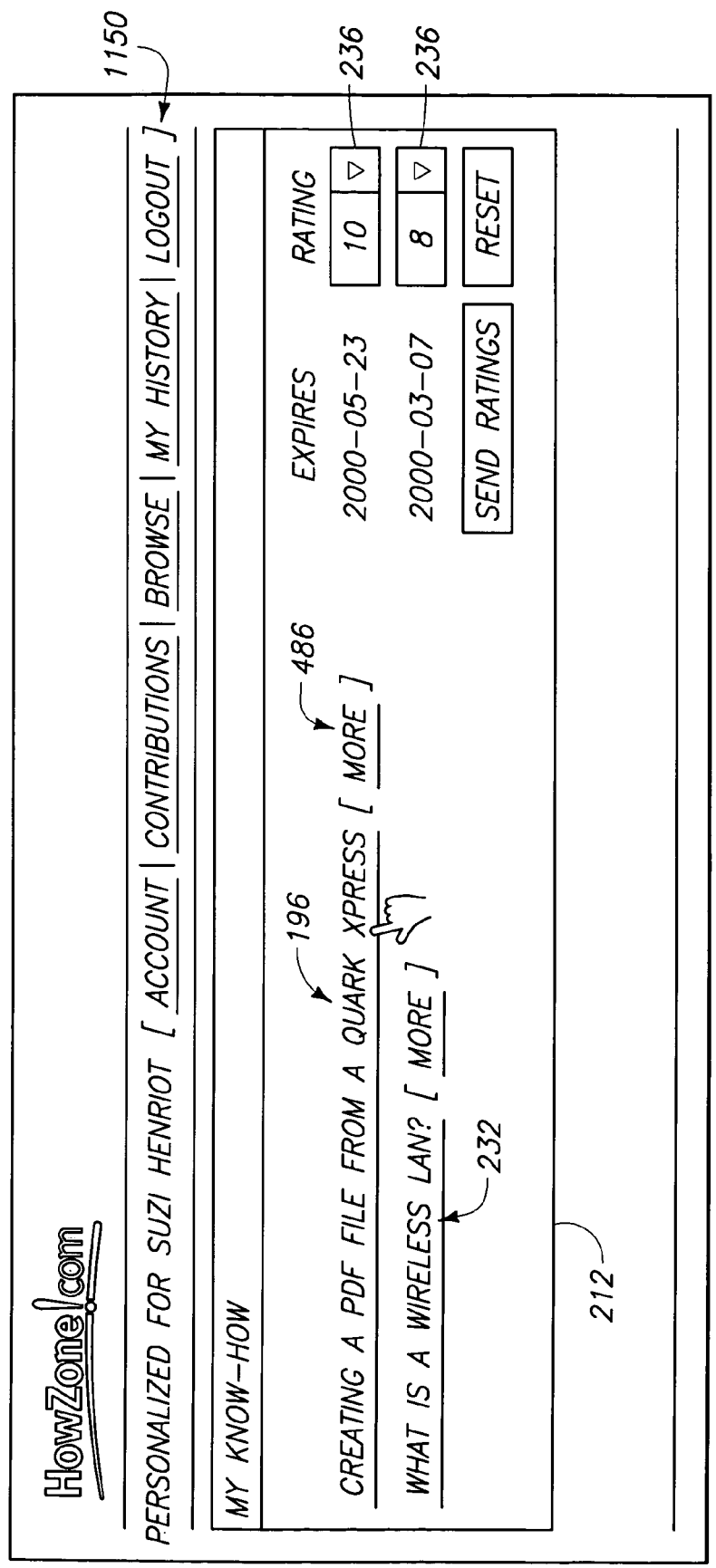
FIG. 11 is a diagram of a screen display for a hosted, or distributed, HowZone which is located on another Web site, and showing an alternate method for displaying HowZone content objects.
Figure 11A:
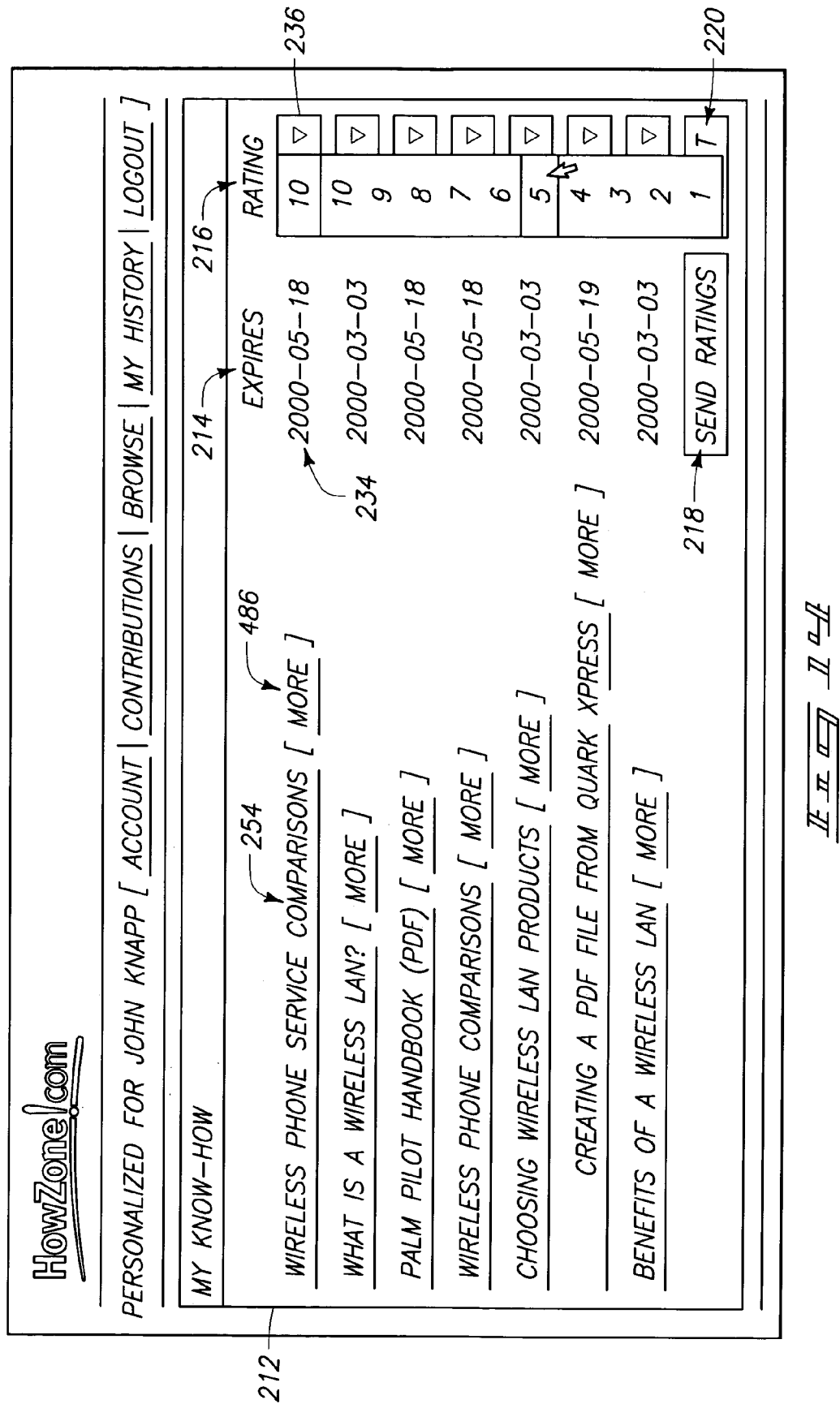

FIG. 11 is a diagram of a screen display showing one of many alternate methods for displaying content objects associated with Applicant's system. More particularly, "HowZone" content objects are displayed to a user in a small area by way of a hosted, or distributed, HowZone which is located on another web site, such as a third-party web site. These distributed information access points may appear to the user like a banner containing one of a variety of selection methods, a box containing hypertext links or a button, clickable icon or graphic, indicia or link.

As shown in FIG. 11, a HowZone.com banner 238 is displayed to a user who is navigating around the World Wide Web (WWW). Upon encountering banner 238, the user can select content objects, and can view the corresponding content detail pages. For example, users will encounter specific HowZone.com banners 238 located on web sites other than HowZone.com's web site. Additionally, users will encounter HowZone.com banners 238 attached or affixed within e-mail. In each case, the user is able to select any content object they desire, and view the corresponding content detail pages. For example, in FIG. 11, banner 238 includes a banner descriptor 244, a scrolling list 242, a "HowZone.com" header 148, a "JOIN" link 246, and a "MyHowZone" link 248. Scrolling list 242 enables a user to scroll through text 250 that corresponds with and describes the content, or content object(s), described by content object link 240 of scrolling list 242.

A user who encounters banner 238 merely needs to click on "JOIN" link 246 in order to navigate to a corresponding web page that enables the user to join HowZone.com and to register for their own personal web page. Selection of "MyHowZone" link 248 enables a user who has already registered to access their "personal HowZone". Selection of link 240 displays a corresponding content detail page which is described below in greater detail with reference to FIG. 12.

FIG. 12 is a diagram of a content detail page screen display that a client provides to a user after clicking on the content object link 240 on the screen display of FIG. 11. The corresponding content detail page illustrated in FIG. 12 includes an "add to personal HowZone" link 222. A user can review the content detail page in order to determine whether they want to add a link corresponding with the content object to their "personal HowZone".

If a user decides that they would like to add such link to their personal web site, the user merely clicks link 222. If there is a cost associated with adding such link, the user is then required to complete a credit card transaction by way of a commerce page (not shown) which requests credit card transaction information and authorization from the user. Upon selection of link 222, the link corresponding with the content object is then made available for consumption by the user at the user's personal web page.

According to one implementation, the link corresponding to a specific content object is added to the user's personal web page. According to another implementation, an actual content object is added to the user's personal web page. In further implementations, one or more content objects and/or links corresponding with such content objects are added to a user's personal web page in response in selecting link 222. For example, link 222 may add a link and/or a plurality of aggregated content objects to a user's personal web page.

Link 222 is present in the content detail pages which correspond to all currently active content objects. A user of Applicant's web site who has an account can select content objects by merely clicking link 222 on the content detail page of FIG. 12 and, if required, by paying an access fee. Selection of the content object is added to an enrollments database table which contains the relationship between a user record within the user database table and the selected content object within the content objects database table. The enrollments table includes fields for user identification, object, identification, rating, date record created, date record modified, and date subscription expires, as was previously described above.

Another feature provided by Applicant's system comprises the ability for users to rank content objects in order to help other users select information from Applicant's web site. For example, users can rank content objects that are displayed on Applicant's HowZone.com web site, and other users can review the rankings. Based at least in part on the rankings, those other users can then select information corresponding with the ranked content objects. Individual rankings that are implemented by each user are stored within the enrollments database table. Those rankings are read, and an average ranking is created and stored in a content object database table. This average ranking is read from this database table, and is displayed beside the content object in the content object listing. Furthermore, the average ranking is displayed in the content detail page, and the display order in the content object listing is sorted with the highest ranked content objects being listed first. A content object title 252 is provided, corresponding with the content object associated with link 240 of FIG. 11.

FIG. 13 is a diagram of a screen display for a user's personal web page, or "personal HowZone", that a client provides to a user after clicking on link 222 of FIG. 12. Box 212, shown also in FIGS. 8 and 10, is then updated in response to a user selecting link 222 of FIG. 12, thereby causing the addition of link 196 to a specific content object entitled "creating a pdf file from Quark XPress". Accordingly, link 196 is added into box 212, along with existing link 232. Accordingly, links 196 and 232 enable a user to access two distinct content objects by way of box 212, and view an expiration date corresponding with each link, as well as to submit a rating for each link via a respective pull-down menu 236. It is further understood that more than one content object can be associated, or integrated, with one link.

D. User Ranking of Content Objects

As shown in FIG. 14, a user's personal web page, or "personal HowZone", aggregates content objects that are accessible over a communication medium by a user at an access point. One such access point is provided by the content detail page of FIG. 9, via link 222. Another such access point is provided via banner 238 (of FIG. 11) and by clicking on link 222 (of FIG. 12). The aggregated content objects are selected by a user from one of such access points, wherever such access points reside, and Applicant's web site presents all the content objects to a user in one central location; namely, at the user's personal web page, or "personal HowZone".

After selecting a content object, a user can return to their "personal HowZone" where they can access their content, as shown in FIG. 13. Following selection of the content object, a link corresponding with the content object appears in the user's "personal HowZone". Alternatively, an actual content object is displayed to a user in their "personal HowZone", or personal web page. In creating such a dynamically generated personal web page, Applicant's web page and system reads from an enrollments table, and retrieves all content objects from the content object database table for that specific user where the enrollment expiration (or expiry) date is found to be greater than the current date.

FIG. 14 is a diagram of a personal web page, or "personal HowZone", for a user named "John Knapp". The personal web page contains a listing within box 212, with box 212 having a box descriptor entitled "MY KNOW-HOW". Box 212 contains a listing of links corresponding with all content objects that the user has selected. Each content object link has a reminder that tells the user when the content object subscription will expire beneath "expires" descriptor 214 in the form of expiration date field 234. Additionally, each content object has an ability to display a rating beneath "ratings" descriptor 216 via "ratings" pull-down menu 236. As shown in FIG. 14, a content object access link 254 is provided to a content object entitled "wireless phone service comparisons". The content object corresponding with link 254 is set to expire on 2000-05-18, and a user has selected pull-down menu 236, and is about to assign a rating of "5", wherein ratings are available ranging between 1-10. Following the selection of rating "5", a user then merely needs to send the rating by selecting button 218. Accordingly, the screen display of FIG. 14 shows a user in the process of using pull-down menu 236 in order to assign a ranking to a specific content object identified by link 254.

As shown in FIG. 14, a user has selected pull-down menu 236 via a tactile input device such as a mouse, by clicking on the mouse to open the pull-down menu and then selecting a number ranging between 1-10.

A user can repeat such operation for any other content object that is identified by one of the links present within box 212. Accordingly, each content object identified by a link within box 212 and present within a user's personal web page has an associated pull-down menu that is used to rate the corresponding content object(s). On a scale of 1-10, 10 is provided as the highest rating.

When a content object is newly added to box 212, displayed as a listing of a new link, the pull-down menu 236 initially appears blank. In order to rate a particular content object, the user manipulates the pull-down menu to select a rating number, then clicks the tactile input device in order to send the selected rating by selecting button 218.

According to one implementation, the ability to use pull-down menu 236 and assign a rating to a link corresponding to a new content object is only enabled during the several weeks after a user has subscribed to a specific content object. In effect, the rating that is issued by the user is dynamic, and the user can change the rating at will.

FIG. 15 is a diagram showing the personal web page of FIG. 14, but after selecting rating "5" for the content object corresponding with link 254, and after selecting "send ratings" button 218 of FIG. 14. As shown in FIG. 13, a user has sent ratings relating to a link of a content object to Applicant's web site, herein Applicant's HowZone.com system. The screen of FIG. 15 shows one exemplary user's personal web page corresponding with their "personal HowZone".

After clicking button 218 in FIG. 14, the user's content objects listing in the user's personal web page is automatically reordered by Applicant's system, placing highest-ranked links at the top of the individual's personal web page. Such automatic reordering of ranked content object links is one beneficial feature of Applicant's invention. Optionally, actual content objects can be displayed and ranked in a similar manner.

It is understood that a user can send content object ratings in the above manner to Applicant's system as often as the user wants to by simply clicking button 218 within box 212 of the user's personal web page.

It is also understood that ratings which are sent by a user upon clicking button 218 are stored within an enrollments database table which relates the user to the specific content object. As discussed previously above, such enrollments table includes specific fields, such as a field for a user identification (I.D.), as well as other fields. It is further understood that this aggregated rating which is the average of all ratings issued by all current users of the content object is stored in a content object database table.

FIG. 16 is a diagram of a screen display that a client provides to a user corresponding with the screen display of FIG. 7 when navigating Applicant's web page. A content object identified and accessed by link 196 is associated with information that shows the number of users who have accessed the information identified by number of users field 180, the average user rating identified by current rating field 182, and a cost associated with an access fee field 184 which users will pay in order to obtain the information corresponding with link 196. Accordingly, the ratings which are issued by all of the users that have subscribed to a content object are averaged, then displayed in the content object listing via rating field 182.

It is important to understand that the content objects are displayed with the most highly rated content objects being listed first. In other words, the content object links are displayed in ranked order. The ratings issued by all users which have subscribed to a content object are added together, and the sum is then divided by the number of users. In other words, the ratings are averaged. The resulting averaged ratings are then stored in a content object database table. The content object listing is a dynamically generated web page which reads and displays information from a database. As this page is being prepared in order to display it to a user, the database is read, and the resulting content objects, along with their ratings, are returned from the database. While the page is being assembled prior to displaying the page to the user, the content objects are sorted into descending order by the average rating.

FIG. 17 is a diagram of a screen display that a client provides to a user after the user selects a link corresponding with a content object which shows a content detail page for the corresponding single content object. As is apparent from viewing the screen display of FIG. 17, the same rating is shown in FIG. 17 as was displayed in the category listing of FIG. 16. Accordingly, each content object has a content detail page which also shows the average daily rating. When a user clicks on a content object to view the content detail page, the same rating appears on the content detail page, corresponding with what is shown in FIG. 17. This page is also dynamically generated by a database and it is created in the same way in which information is generated with respect to the screen display of FIG. 16.

E. Dynamically Generated Multiple Point-of-Entry Category Network

Figure 18:
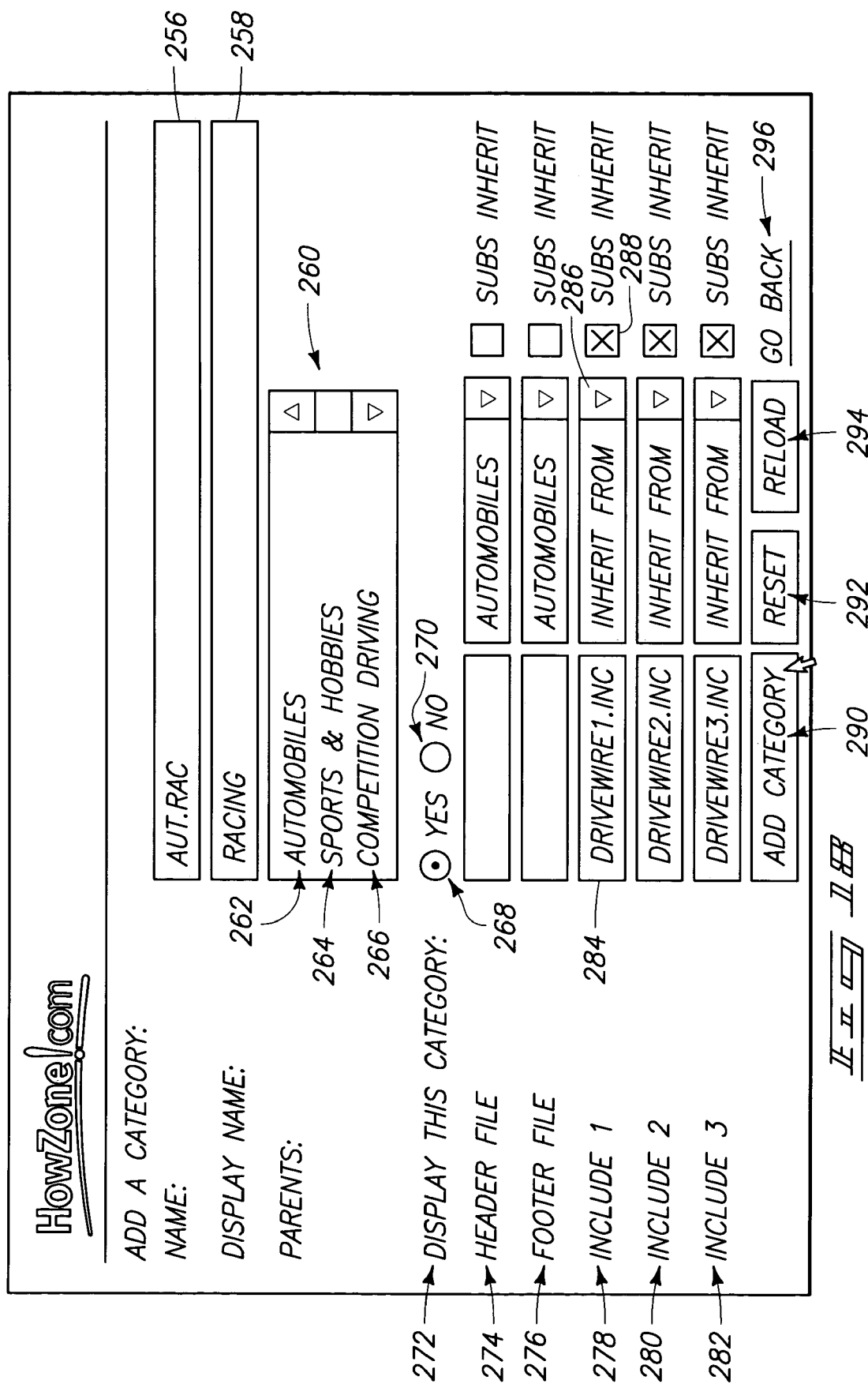
FIG. 18 is a diagram of a screen display used by HowZone administrators to add a new category to the category listing in the screen displays of FIGS. 7 and 16.

FIG. 18 is a diagram of an add new category screen display that a system administrator for Applicant's web site can access by way of the World Wide Web (WWW). The screen display allows a system administrator to add a new category to a category network within Applicant's web site. It is understood that the page representing the screen display of FIG. 18 is password protected, and only an authorized system administrator can access the corresponding page. Typically, an administrator would be required to enter a name within an internal database name entry box 256 which must be unique. Secondly, the administrator enters a display name within a user readable name entry box 258 which is not necessarily unique.

Entry box 256 receives an internal database name comprising an internal name that is used solely within the database, and is viewable only by a system administrator. Entry box 258 receives a user readable name comprising a name which appears in readable form to a user on Applicant's web site.

In operation, an administrator then assigns one or more parents to the category "aut.rac", displayed as "racing", wherein the assigned parents are displayed within a scrolling list box 260. New category parents are added by selecting one or more category parents, such as "Automobiles" category parent indicator 262, "Sports & Hobbies" category parent indicator 264, and "Competition" category parent indicator 266. Technologies for selecting multiple items within a scrolling list box are presently understood in the art, and entail using a mouse, cursor, and shift or control key to select multiple items. By assigning one or more parents to a category, the administrator determines where in a category network a specific category will appear.

A "display this category" section 272 includes a "yes" radio button 268 and a "no" radio button 270, wherein buttons 268 and 270 are alternately selectable by a user in order to determine whether or not a new category will be visibly displayed to users.

An administrator can assign "include" files for a header, a footer, and "other" information, such as advertisements, so that a category page will have a desired appearance. Header file section 274 enables the administrator to add a specific header file or cause it to be inherited from a parent by selecting a parent via dynamically generated pop-up menu 286. Similarly, a footer file section 276 enables an administrator to assign "include" files for a footer. Furthermore, "include 1" section 278, "include 2" section 280, and "include 3" section 282 enable the assignment of "include" files for other information, such as advertisements. Each of such sections 274-282 includes an include file entry box 284. A pop-up menu 286 is also provided in order to further define the "include" files and their association.

An administrator, perhaps, instead of assigning an include file for a header, a footer, or other information, can use pop-up menus 286 in order to assign a category from which the "include" files will be inherited. Accordingly, they will assume the same appearance.

Optionally, an administrator can check a "subs inherit" check box 288 in order to cause other categories, lower on the inheritance tree, to receive the "include" files from this category. As a result, the categories beneath the present one are caused to display the same "include" files, and they will have the same visual appearance to a user.

An "add category" button 290 enables addition of the new category to Applicant's tree structure. A "reset" button 292 is provided for resetting information displayed within FIG. 18. A "reload" button 294 is provided in order to reload information presented within the screen display of FIG. 18. A "go back" link 296 enables a user to exit this page without making any changes to, the database or to Applicant's web site.

The screen display of FIG. 18, in summary, provides an administrative function and is available to pre-approved staff or administrators of Applicant's web site by way of a password-protected web page (not shown). A category network is made up of individual categories which have an attribute called a parent. For example, a "fax machine" category may have a parent category entitled "office products", and another parent category entitled "home office". Such a dynamic parent relationship that allows multiple parents creates a category network.

Through a common user interface, categories are given their basic "look and feel" by assigning "include" files to the top portion, or header; the bottom portion, or footer; and various other areas of the page, or "include" files. This hierarchy allows branding to be varied, and further allows a variety of product sales opportunities for companies which wish to partner with Applicant's web site. It is understood that "include" files may be resident on a partner company's web server so that they remain under the partner company's control, and may be modified by the partner company at will. Alternately, they may be uploaded to and stored within Applicant's web site and system or, further alternately, they may be stored on yet another server. In fact, they may be stored on any Internet-connected server capable of storing data and making that data available to the Internet.

As shown in FIG. 18, each "include" file section 278, 280 and 282 includes a check box which causes the categories beneath this category, or the ones which have this category as a parent, to use the same "include" files. Accordingly, the categories beneath this category take on the same appearance as the parent category. Such an inheritance allows the category network to have consistent appearance which can be varied on child categories as well.

Also adjacent each "include" file section 278, 280 and 282 is a pop-up menu 286 containing a dynamically generated list of all the parent categories. Selection of one of these parent categories causes the category to inherit the appearance imposed by the "include" files on the parent category, or for that matter the parents' parent category. Since a category can have multiple parents, pop-up menu 286 is necessary in order to declare a specific parent from which a specific category should inherit its appearance.

As shown in FIG. 18, an "add category" page is shown. Categories can also be edited through the same user interface. This technique allows instant reconfiguration of the category network by adding or changing parents. In operation, category information is stored in a database table, and the parent/child relationships are then stored in a separate database table which is solely employed to store the relationships between categories. If a category has only one parent category, there is only one entry in the relationships database table to identify the sole parent category as a parent to the category in question. If a category has two or more parent categories, there are two or more entries (one for each category-parent relationship) in the relationships database table.

Figure 19:
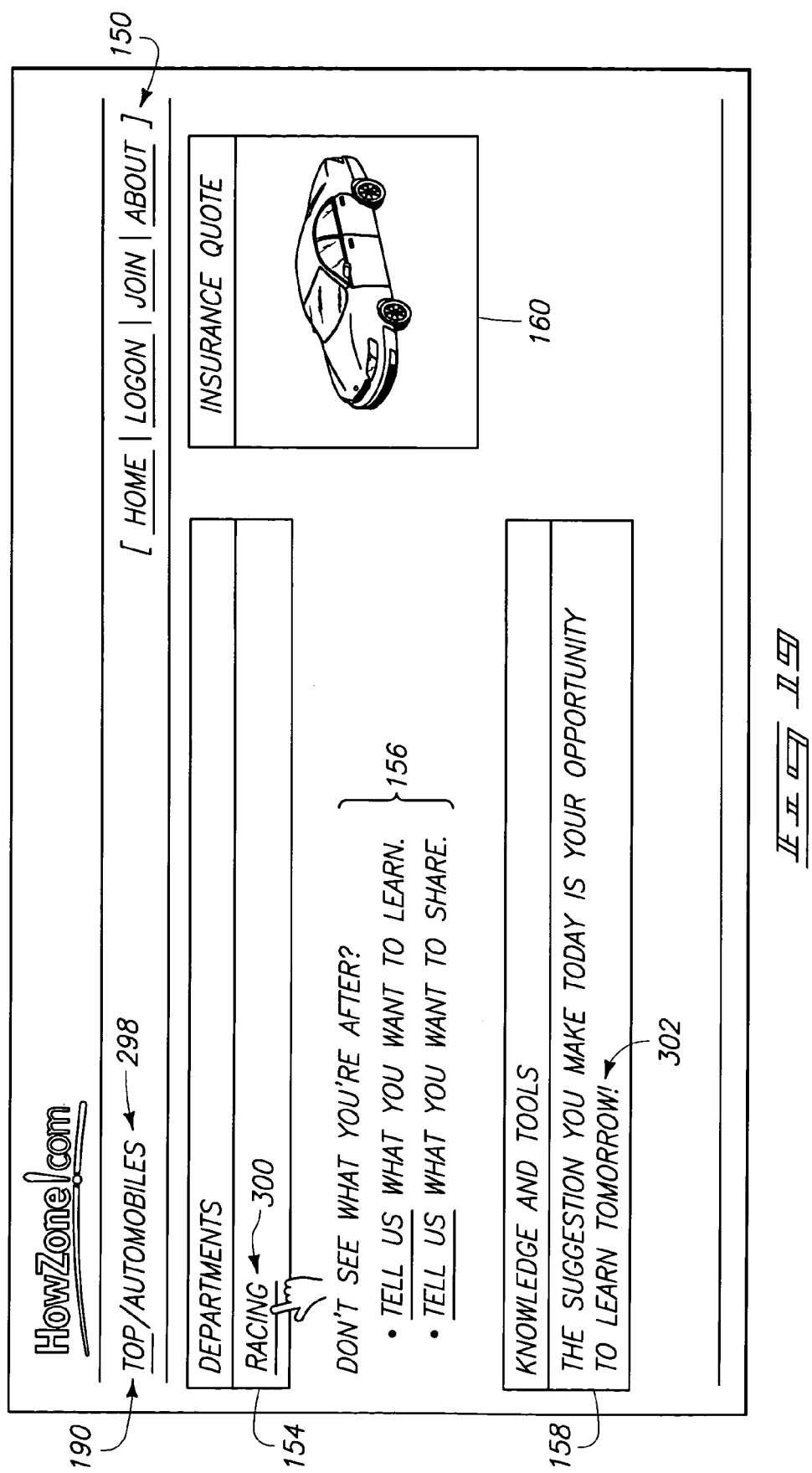
FIG. 19 is a diagram of a screen display illustrating the basic elements of an exemplary category network page for an "automobiles" category with a "top" parent category as viewed by a user.

FIG. 19 is a diagram of a category network page screen display that a client provides to a user by way of Applicant's web site, and following addition of the category to Applicant's web site using the technique depicted in FIG. 18. The screen display of FIG. 19 is displayed to a user by way of a client such as a computer having a screen display. The screen display of FIG. 19 comprises a web page which represents an "automobiles" category identified by an "automobiles" present page identifier 298. Site navigation bar 150 also includes "top" link 190 which represents a parent category to the "automobiles" category that is identified by the category network page of FIG. 19. Accordingly, FIG. 19 illustrates the "automobiles" category, with current category listing box 154 including a "racing" sub-category link 300, and with content objects link listing box 158 including a textual statement 302 that encourages a user to make a suggestion for desired content objects relating to this topic.

Once a category has been added by an administrator, the category immediately appears on each parent category as a selectable hypertext link. For example, the newly added "racing" category appears on the parent "automobiles" category as a sub-category of the "automobiles" category within box 154. A user can navigate to a category page corresponding with the newly added "racing" category merely by clicking on "racing" sub-category link 300. Additionally, a user can trace their previous steps in a backwards direction up the category tree by clicking on link 190, corresponding with the parent category "top". Such action enables a user to traverse the category network in an "up-tree direction".

Accordingly, it is possible that a new category may not have a content object assigned to it at the time the new category is added. Once content objects have been assigned to the new category, the content objects will appear on the corresponding category page, and the content object can be selected by users for inclusion into their personal web page, or personal HowZone.

It is understood that the category network resulting from Applicant's dynamically generated category network is publicly viewable by users and contributors of information. A category is accessed by a user who clicks on the specific category which is displayed within box 154 of a parent category network page. In this manner, a user can navigate from a parent to a child, and thereby traverse the category network in a "down-tree" direction.

As shown in FIG. 19, site navigation bar 150 is provided on each page within the category network. Bar 150 provides a historical path that a user has taken in order to navigate to the current category page by displaying a set of navigable links. For example, "top" link 190 is displayed alongside the present category for the category page in FIG. 19. Here, "top" link 190 corresponds with a "TOP" category that is the parent to the "automobiles" category identified by the "automobiles" present page identifier 298.

Figure 20:
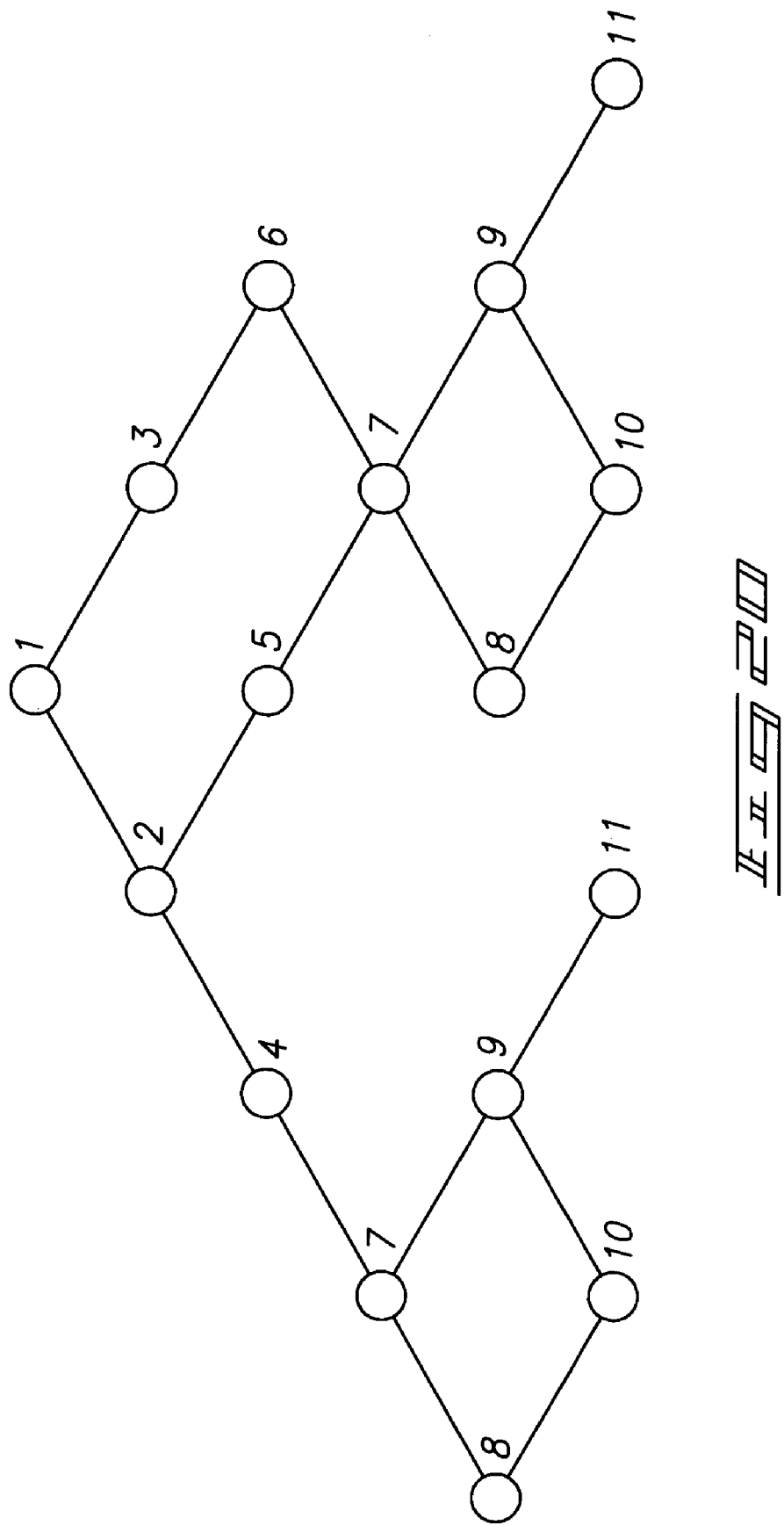
FIG. 20 is a diagram of a dynamically generated category network corresponding with the screen displays of FIGS. 7 and 16, and illustrating the case where a dynamic category network includes two categories having multiple parents.

FIG. 20 is an exemplary navigational tree structure realized by Applicant's dynamically generated category network, as implemented using Applicant's system and web site. As shown in FIG. 20, the concept of a dynamic category network is illustrated, wherein individual numbered categories are illustrated as potentially having multiple parents. It is understood that each numbered category corresponds with an actual category, such as the "automobiles" category identified by present page identifier 298 of FIG. 19. For example, category 7 is shown as having parent categories 5 and 6. Because it is possible for a category to have multiple parents, users can take different paths in order to navigate to the same category. For example, a user can enter the category network of FIG. 20 at category 1, and can further navigate to category 7 in one of two possible ways. One way involves navigating successfully through categories 1, 2, 4, and 7. Another way involves navigating successfully through categories 1, 3, 6 and 7.

As shown in FIG. 20, a user can also navigate to category 7 by way of categories 5 and 6. It is also possible to enable navigation to category 7 by way of categories 1, 2 or 3, if desirable, by modifying the navigational tree structure. In such a configuration, it would be even easier for a user to navigate to category 7 from various locations within the navigational tree structure, thereby making it easier to navigate through Applicant's web site.

The above-described dynamic parent assignment of FIG. 20 imparts a network structure which gives Applicant's web site, HowZone.com, more techniques to present content and to display commerce in front of a user community which is utilizing Applicant's web site and associated functionality.

Figure 21:
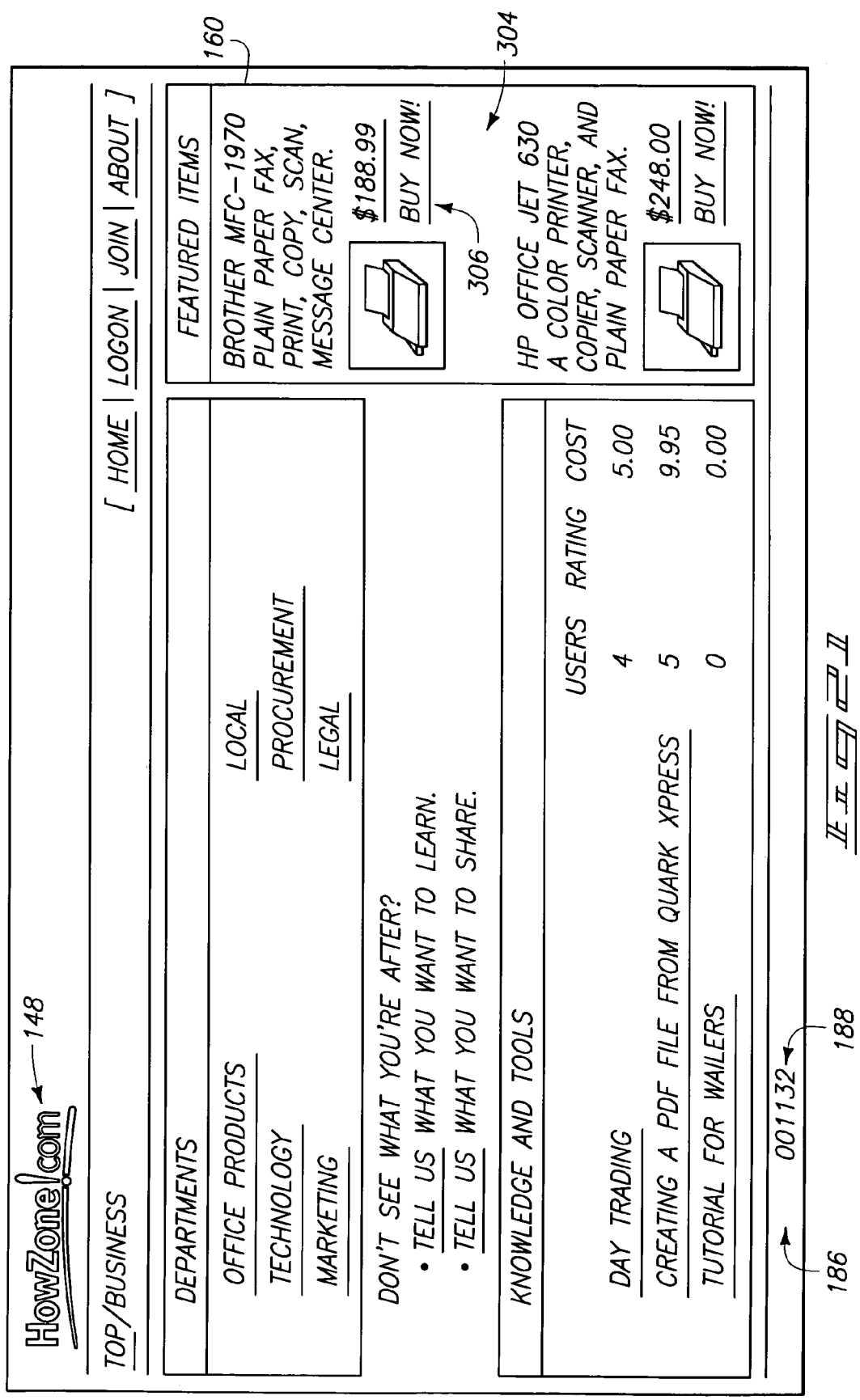
FIG. 21 is a diagram of a screen display for a "business" category page displaying "include files" for a header, a footer, and a commerce banner.

FIG. 21 is a diagram of a "business" category network page screen display that is displayed to a user via a client. More particularly, the screen display of FIG. 21 illustrates the implementation of "include" files which were previously discussed with reference to FIG. 18, as applied to header 148, footer 186, and "other embedded content" depicted in box 160. While navigating the category network of Applicant's web site, users encounter "include" files which impart branding and commerce features to each category page.

With reference to header 148, a logo identifying Applicant's web site as "HowZone.com" is illustrated to a user who navigates to the category page of FIG. 21. However, it is understood that any of a number of different textual and/or logo designs could be presented within header 148. For example, a privately branded third-party logo could be illustrated within header 148, along with selected down-tree categories (not shown). It is understood that a privately branded third-party logo comprises a logo that identifies a web page as belonging to a third-party entity, such as some "other" store or Internet site, but which is actually hosted on Applicant's web site under such third-party logo.

Footer 186 includes page counter 188. However, it is also understood that footer 186 can include a copyright notice, or any other type of textual and/or graphical information that is easily added/updated within a footer format.

Box 160 displays "other" information via a single "include" file which shows a third-party Internet commerce site from which printers can be purchased. For example, the "other" information can include textual and/or graphical information for "ABC Office Products", a third-party commerce site, including links which enable a user to navigate to the site and purchase identified office products therefrom via box 160.

Box 160 includes a commerce content object 304, including one or more links 306. As shown in content object 304, link 306 enables a user to navigate directly to a third-party web site in order to purchase a multiple-function peripheral device having facsimile, printing, copying, scanning, and messaging capabilities.

It is understood that one or more of the "include" files can be assigned to the "business" category which is shown in the screen display of FIG. 21. The assignment of such "include" files to a category and corresponding screen display can be carried out by staff of Applicant's web site, or the "include" files can be inherited by sub-categories from a parent, such as from the "top" category parent.

For purposes of this disclosure, an "include" file comprises a "snippet" of HTML, which is called by Applicant's web site, HowZone.com, when a page needs to be served to a user who is accessing Applicant's web site. The "snippet" of HTML is then inserted into the rest of the HTML which the user is accessing, thereby making up the category page when the page is requested by a user. Such a modular approach to HTML page assembly is readily understood within the art. However, Applicant has provided the additional feature of "inheritance" of the "include" files which adds a significant benefit over the prior art techniques. Furthermore, Applicant has provided the capability of utilizing multiple parent categories for a single sub-category which further extends the capabilities of Applicant's system over presently understood prior art techniques.

FIG. 22 illustrates a screen display showing the "business" category page previously depicted in FIG. 21. However, box 160 displays a different "include" file comprising a commerce content object 1304 that differs from commerce content object 304 (of FIG. 21). As shown in FIG. 22, commerce content object 1304 comprises an advertisement from an office supply store that differs from the office supply store associated with commerce content object 304 (of FIG. 21). Additionally, commerce content object 1304 does not include any links, whereas commerce content object 304 (of FIG. 21) includes links such as link 306 (of FIG. 21) which enables a user to buy an office product from a corresponding office products web site.

By changing the "include" file corresponding with commerce content object 1304, the page illustrated by the screen display of FIG. 22 is imparted with a different appearance. Such appearance is changed by an administrator using an administrative function of Applicant's web site whenever it is desirable.

An administrator of Applicant's web site can control which "include" files will appear on which category page(s). Furthermore, such administrator can control which "include" files are inherited from specific parent categories, and which "include" files are passed on to child (or sub-) categories. For the case where there are no "include" files specified for a category or inherited from a parent category, a default "include" file is made to appear instead.

FIG. 23 illustrates a screen display that depicts a "multiple-point-of-entry" capability that is provided by Applicant's system and web site. As shown by the screen display in FIG. 23, site navigation bar 150 does not include the parent category corresponding with "top" link 190 (of FIG. 22). Instead, only the "business" present page identifier 192, corresponding with the "business" category, is provided on site navigation bar 150. Such an ability to provide "multiple-point-of-entry" capabilities enables Applicant's web site to specially configure a subset of a dynamically generated category tree, wherein the subset supports co-branding in order to present information within one or more distributed access points.

According to the screen display of FIG. 23, a co-branded header is depicted as "ABC Office Products". Such header 1148 differs from header 148 (of FIG. 22) which identifies Applicant's web site as "HowZone.com". FIG. 23 illustrates the ability to co-brand, or independently label, a subset of Applicant's dynamically generated category tree for selective distribution of information. Independent labelling of selected content is supported by multiple points of entry where each point of entry can appear isolated from other portions of the same dynamically generated category network. In essence, each category within the dynamically generated category network is capable of displaying a unique appearance which is inherited from a parent category up the category tree. Each category includes navigational links and one or more content objects. Each content object is capable of being assigned to multiple categories, and the categories can have multiple parents, as was previously described above. Those categories having multiple parents receive inherited characteristics/features from a specific parent that govern appearance.

Each category page within Applicant's category network is accessed with a web browser by entering a Uniform Resource Locator (URL). By appending a category identification (cid), or I.D., a user is enabled entry into the category network at that specific location. More particularly, a ?cid=## is appended to the URL, thereby specifying an entry point. An "up-tree" navigation path is generated as a user traverses a category tree by holding past category identifications (cids) as variables within the current page. The up-tree navigation path is generated using these variables. When entering the category network at a specific point, such as at the "business" category of FIG. 23, the parents of this category are not displayed.

As a user proceeds in a "down-tree" direction to categories which are children of the point of entry (POE), the "up-tree" navigation path is displayed to a user within site navigation bar 150. After proceeding along a "down-tree" navigation path, the user can use the displayed "up-tree" navigation links within bar 150 in order to get back to the point of entry, or for that matter any intermediate location identified by a link and displayed within the navigation path.

For example, if a user goes to a URL of http://www.HowZone.com, the user will navigate directly to the top of a category tree. If the same user goes to a URL of http://www.HowZone.com?=cid3, that user will be directed to a category I.D. 3, and an "up-tree" path will not be displayed to the user on the screen display.

As a user proceeds along a "down-tree" navigation path of a category tree, the "up-tree" navigation path will be displayed to the user. This displayed path gives the user a way to traverse back to any point along the navigation path extending as far back as the original point of entry.

For the case where the point of entry is not at the top of the category network, there is no way to navigate to the top of the category tree. Furthermore, the user will not even be made aware that there are any parent categories existing above the topmost category that is provided at the displayed point of entry from which the user first arrived. The user will only be able to traverse the category network in a "down-tree" direction, with the displayed "up-tree" navigation path extending only as far as the original point of entry. Accordingly, this feature gives Applicant's web site the ability to have an infinite number of distinct category trees present within the category network. Furthermore, it enables the category network to support an infinite number of potential customers by enabling co-branding, or independent branding of selected portions of the category tree as identified by the "ABC Office Products" header 1148 of FIG. 23.

F. Documentation/Quantification of Demand for Information

Figure 24:
FIG. 24 is a diagram of a screen display showing a link, found on each category page, and used to collect suggestions from users.

FIG. 24 illustrates a screen display for an "automobiles" category page including link 172 which is used to collect suggestions from users of Applicant's web site. Link 172 is located on each category page of Applicant's web site. In operation, a user selects, or clicks, link 172 in order to navigate to a user request form which is described below with reference to FIG. 25. Accordingly, link 172 comprises a content object request link that is present on each category page. By selecting link 172, a user navigates to user request form 308 of FIG. 25 where the user can describe and submit their request. Users are then encouraged to disclose to Applicant's web site the specific things that they would like to learn, or in which they show an interest. Accordingly, the process begins when a user clicks link 172, then navigates to form 308 (of FIG. 25) where the user enters information.

FIG. 25 illustrates a screen display that presents a request form 308 which enables a user to describe a request regarding information which they would like to learn, and to submit the request. As shown in FIG. 25, a user identification (I.D.) text/data entry field 310 enables a user to enter a user identification. Accordingly, field 310 enables a user to submit their user identification. A suggestion input section 312 includes a plurality of radio buttons which enable a user to identify the type of suggestion being submitted based upon a list of exclusively selectable items that are identified by each radio button 314. A request data entry box 316 is provided into which a user types or imports a description of what the user is requesting. Payment data entry field 318 enables a user to insert a description of what they would be willing to pay for the above-described request, as detailed in box 316. Accordingly, a user can describe what they are interested in. Hence, a user can assign a monetary value to their request. A "submit" button 324 enables a user to submit information which has been added to field 310, section 312, box 316, and field 318.

Accordingly, "submit" button 324 enables a user to submit their request to Applicant's web site. A reset button 326 enables a user to reset the information provided within form 308 of FIG. 25. A "go back" link 328 enables a user to return to the screen display of FIG. 24.

An "I need a user I.D." link 320 enables a user to navigate to a screen display where the user can register for and receive a user identification. Typically, the user I.D. comprises a user identification number and/or name. Additionally, a "what are these?" link 322 enables a user to navigate to a screen display (not shown) that explains each of the suggested input sections provided within section 312.

As shown in FIG. 25, user request form 308 enables a user to provide information about their specific requests, then submit the information to Applicant's web site, HowZone.com. Accordingly, Applicant's web site is able to document submitted interest in a topic on the part of one or more individuals or users of Applicant's web site. For example, a user can provide a URL which directs staff at Applicant's web site to a specific web page that is related to the user's request, such as by inserting the URL within box 316. Field 318 then enables the user to assign a value, such as a dollar amount, to which the user is willing to pay, which is directly related to the requested information, and which indicates how valuable the provision of the requested information is to that particular user.

Applicant's web site then maintains a compilation of user requests within a database. Furthermore, Applicant's web site will notify a user by way of e-mail when the user's requested information becomes available. For example, an information provider may be encouraged to provide such information because of a documented demand which has been accumulated by individuals submitting requests by way of form 308 of FIG. 25, and a user will be notified by e-mail when the information is made available.

FIG. 26 illustrates a screen display of an administrative page 330 for Applicant's web site where requests are approved by a system administrator. Administrative page 330 enables a system administrator to review user requests that have been submitted by way of form 308 (of FIG. 25). More particularly, a system administrator accesses a web page corresponding with the screen display of FIG. 26. Such screen display displays a user's request in an editable form 332. The user's request is called up from a database, then loaded into form 332 when the system administrator accesses this editable form 332 of administrative page 330.

As shown in FIG. 26, form 332 includes a "contributor" e-mail link 334 which enables navigation back to the user request form 308 of FIG. 25. A contribution-type descriptor 336 is herein identified as a "tutorial", which corresponds with selected radio button 314 of input section 312 (of FIG. 25). Form 332 also includes a "title" entry box 338, a descriptor entry scrolling list box 340, a "department" pop-up menu 342, a "suggested link" data entry box 344, a "suggested user access fee" data entry box 346, a "suggested user access duration" data entry box 348, a "disposition" section 350 including radio buttons such as "listed" radio button 352, an "edit contribution" button 354, a "reset" button 356, and a "go back" link 358.

When an administrator accesses administrative page 330, a user request displays a "disposition" within "disposition" section 350 by selecting the radio button for "conceived". Such automatic selection of the "conceived" radio button indicates that a suggestion has been "conceived", or suggested, but the suggestion has not yet been approved by staff or an administrator of Applicant's web site.

One feature provided by Applicant's system enables an administrator, upon accessing page 330, to directly contact a user by e-mail in order to discuss the user's request. One such technique would entail providing a link to the contributor's e-mail address directly on one of form 308 and statement 302 of FIGS. 25 and 26, respectively. Optionally, box 344 of FIG. 26 can be configured so as to launch an e-mail program that automatically configures the contributor's e-mail address and prompts the administrator to submit an e-mail to the contributor.

An administrator writes a publicly visible title for the user request by inserting a title within title entry box 338. The administrator can then edit the user's description in order to prepare a publicly visible description by editing the text which is provided within descriptor entry scrolling list box 340. The administrator can then assign the user request to a specific category where the request will appear to users of Applicant's web site. Such assignment is carried out by the administrator accessing a list of specific categories which are selected from pop-up menu 342.

A system administrator can also add or edit URLs which have been provided by the user, or which the administrator feels is appropriate for the user request. More particularly, a URL is entered and/or revised within "suggested link" data entry box 344. Furthermore, the administrator can add or edit the original dollar value that was assigned by a user by merely editing a "suggested user access fee", $20.00, that is displayed within access fee data entry box 346, or by entering such a number within box 346. The number entered within box 346 will then become the suggested access fee for a content object that is yet to be created using techniques described further below.

By entering a value within "suggested user access duration" data entry box 348, an administrator can assign an access period for the content object which has yet to be created.

If an administrator decides to approve a user request, the administrator then sets the "disposition" of the user request within "disposition" section 350 to the "listed" radio button 352, in which case the user request will appear as a content object within the category network of Applicant's web site, HowZone.com.

If the administrator decides to reject a user request, the administrator merely needs to set the "disposition" section 350 to the "denied" radio button. For this case, the user request is then discarded.

Generally, user requests are stored in the database as a content object. The content object is assigned a status of "conceived", and it can be edited by staff that maintain Applicant's web site. The user requests do not appear in listings until they have been approved by such staff and/or an approved administrator.

Each user request is collected as a free-form description. As part of the approval process, Applicant's web site staff add a title, and they edit the corresponding description. The staff also assigns the request so that it appears in a particular category, and adds or edits a URL, a suggested access fee and a duration, as discussed above.

As a further part of the approval process, such staff attempts to determine the uniqueness and appropriateness of the user request. Such an undertaking by staff may result in reclassification of the request, or in editing of the request, as discussed above in greater detail.

Once a user request is approved, the status of the corresponding content object is changed to "listed" within the "disposition" section 350. Content objects that have a "listed" status are then publicly visible, and, at that instant, other users can join a "waitlist" in order to be notified when that content object has been made publicly available for their consumption.

As shown in FIG. 26, an administrator selects "edit contribution" button 354 by clicking on the button in order to execute the edits which have been made by the administrator to the user request.

FIG. 27 illustrates a screen display showing a newly requested content object that has been approved by an administrator for addition to the category network of Applicant's web site. A pre-existing "racing" link, also shown in FIG. 24, represents a corresponding content object which is accessed by clicking on a "racing" sub-category link 360 within current category listing box 154. A newly requested and approved content object is accessed by way of "Mitsubishi Montero Racing" content object link 362, which is provided to a user within content objects link listing box 158 once the new content object has been approved, and receives a "listed" status. After such receipt, the new content object appears within the category network by adding link 362 within box 158, as well as further displaying associated links indicative of adding the content object within the category tree at various corresponding locations within Applicant's web site.

While navigating through Applicant's web site using various links, users can visually identify the names of the corresponding content objects by way of the links, and users can click on such links in order to view information about the requested and approved content objects.

As previously discussed with reference to FIG. 26, content objects which have a status of "listed" within "disposition" section 350 (of FIG. 26) are made visible within the category network alongside content objects having a status of "under construction" and "active". By making "listed" content objects visible alongside "under construction" and "active" content objects, many of content objects are listed within Applicant's web site, and any requested, yet still unavailable, content objects receive significant exposure and viewership which is needed in order to aggregate and/or build consumer demand.

It is understood that a user anywhere within Applicant's web site needs to merely click on the associated link, or name, of any content object in order to display an associated content detail page. The action of selecting such an associated link also indicates that a user is interested in such identified content object.

FIG. 28 illustrates the screen display for a content detail page for a content object that has not yet been made available to users of Applicant's web site. General information 364 about the content object "Mitsubishi Montero Racing" is displayed to a user. A "join the waitlist" link 366 enables a user to join a waitlist by way of the screen display of FIG. 29. The screen display of FIG. 28 is displayed to a user when the user selects link 362 of FIG. 27. A user can read content object information 364 which pertains to the specific content object.

If the user reads the information, then determines that they would like to access this particular content object, the user merely needs to click on link 366 in order to navigate to the screen display of FIG. 29 in order to join a waitlist. Upon joining the waitlist, the user will be notified when the content object will become available for consumption by the user.

By reviewing information 364 of FIG. 28, the user becomes aware that the content object that they are interested in receiving does not yet exist in Applicant's web site. Furthermore, the user is given the ability to join a waitlist by way of the screen display of FIG. 29 comprising a list of people who are waiting for this specific content object to be made available to them. By selecting link 366, the user is given the ability to join the waitlist by navigating to the screen display of FIG. 29. Furthermore, the selection of link 366 is a strong indication to the web site host that the user is strongly interested in this particular content object. Such interest can be utilized in efforts to coerce or encourage a content object provider to provide the desired content.

Also according to FIG. 28, a "make it happen" link 368 and a "Perhaps You!" link 372 enable a user to become a contributor by navigating to the screen display of FIG. 32. Go back link 370 enables a user to navigate back to the screen display of FIG. 27.

FIG. 29 is a diagram of a screen display illustrating a page where a user joins a waitlist. A text entry field 374 is provided to enable a user to enter a user identification. A payment entry field 376 enables a user to enter a payment quantity that they would be willing to pay for receiving the content object that is described in the screen display of FIG. 28. An "I need a user I.D." link 378 enables a user to submit a request for a user I.D. via a separate screen display (not shown). A waitlist counter statement 380 indicates the number of users currently on the waitlist for this content object. A "submit" button 382 enables a user to submit the information entered within fields 374 and 376 to Applicant's web site, thereby adding them to the waitlist for the content object described in FIG. 28. A "reset" button 384 enables a user to reset the information which has been entered into fields 374 and 376. A "go back" link 386 enables a user to navigate back to the screen display of FIG. 28.

After a user selects link 366 of FIG. 28, the user navigates to the screen display of FIG. 29 where they are able to join a waitlist by way of entering information in fields 374 and 376 and by selecting button 382. A user provides their user identification within field 374 and further inputs how much they would be willing to pay to gain access to the content object described in FIG. 28.

It is understood that Applicant's web site, HowZone.com, will maintain a waiting list, or waitlist, for content objects that have not yet been made available to users by content providers. Only registered users will be enabled the ability to join a waitlist. Registered users will be asked to provide their e-mail address, with the e-mail address being stored in a user information database that is accessible by Applicant's web site.

The waitlist is then stored in an enrollments database, wherein the enrollments database relates a user with a content object. The user information is stored in a user information database, and the content object is stored in a content object information database.

G. Compelling Contribution of Information

FIG. 30 is a diagram of a screen display illustrating a content detail page that includes a waitlist. The following group of screen displays disclose the process by which a potential contributor of content objects is approved by authorized staff or an administrator at Applicant's web site. Approved staff at Applicant's web site place a specific content object listing into the category network, or category tree, of Applicant's web site using the administrative page 330 depicted above with reference to FIG. 26. As shown in FIG. 30, a "day trading" content object title 388 is presented to users along with general content object information 1364. The "content object" information 1364 associated with the "day trading" content object of FIG. 30 indicates that "5" users would like this content object, are willing to pay $5.00 for five weeks, and that the "status" indicates that a tutor to provide this content object. Since the "status" indicates that a tutor is needed, the "day trading" content object associated with FIG. 30 has yet to have any content assigned to it.

By interacting with the screen display of FIG. 30, users are able to read about the "day trading" content object, then to join a waitlist by way of link 366. A knowledgeable user will see the waitlist, or waiting list, and realize how many people want this specific knowledge indicated by the "day trading" content object and associated description.

One technique for encouraging a contributor to meet the aggregated demand that is displayed in FIG. 30 is to have staff of Applicant's web site contact a likely contributor, then make the contributor aware of the waiting list displayed in FIG. 30 which is aggregated via Applicant's "waitlist" feature provided by FIG. 29. Another technique involves contributors navigating through Applicant's web site, then encountering the enumerated number of users who are waiting (by joining the waitlist) to obtain the specific content object. The contributor can also see what these users are willing to pay for the content object.

As a result, contributors will be more likely to contribute, and the content library within Applicant's web site will grow relatively quickly as users identify the content objects in which they have an interest, and contributors realize the aggregated demand for the specific content object, as well as the dollar value that individuals are willing to pay to obtain such desired content object.

By selecting link 368 or link 372, a potential contributor navigates to the screen display of FIG. 32, where they fill out a form announcing their intent to make a contribution to Applicant's web site.

It is understood that Applicant's web site encourages content object contributions from individuals as well as organizations. By displaying the size of the waitlist via user waitlist number display 390 within the screen display of FIG. 30, user demand is plainly made visible to a potential contributor, as well as to other potential users. Furthermore, earning potential is made plainly visible by way of a "suggested access fee" statement 392. Accordingly, a potential contributor merely needs to look at number display 390 and statement 392 in order to realize aggregated user demand, as well as such users' willingness to pay for the content object, thereby showing the size of the waiting list and also showing the earning potential to the potential contributor if they are to contribute the desired content object.

According to one business model, Applicant's web site will not always charge an access fee for a user. In such cases, the earning potential for a contributor may actually be zero, and the contributor makes a contribution based solely upon knowledge that the user demand will be met as a result of their contribution being made to Applicant's web site.

According to another business model, Applicant's web site will occasionally engage a contributor in a revenue sharing model, wherein advertising revenue and/or access fee revenue is shared with contributors based upon the amount of contribution and/or based upon a defined contractual relationship.

FIG. 32 is a diagram of a screen display illustrating a contributor form 394 that an expert uses in order to state their interest in submitting a specific contribution to Applicant's web site. More particularly, FIGS. 32A-32C, assembled according to FIG. 31, form another screen which is accessed by clicking on link 368 or link 372 of FIG. 30. Contributor form 394 includes a description 395 of the terms by which a contributor is encouraged to contribute content, as well as the terms of payment for such contribution. Form 394 also includes a contributor user I.D. field entry box 396. A contributor, in the form of an expert, fills in form 394 by entering their user identification, as well as further information described below.

Form 394 also includes a user waitlist number display 390, indicating the number of users currently on the waitlist; an income potential field 400, indicating the immediate income potential pursuant to the terms of the above-described contribution agreement; a suggested content object title entry box 402; a suggested content object description entry box 404; a suggested user access fee entry box 406; a suggested user access duration entry box 408; a contributor qualifications entry box 410; a URL entry box 412; payment method radio buttons 414 and 416; credit card number entry box 418; credit card expiration date entry box 420; credit card user name entry box 422; submit button 424; reset button 426; and "go back" link 428.

In an operation, an expert, or contributor, fills in form 394 and, if Applicant's web site charges a fee to host the expert's contribution, the expert provides credit card information by way of selecting one of radio buttons 414 or 416, and filling out boxes 418, 420 and 422.

An "I need a user I.D." link 398, similar to link 378 of FIG. 29, enables a user to navigate to a screen display (not shown) where the user can request and receive a user identification, such as a user identification number.

An expert also submits a written summary of their qualifications within box 410. Such written summary aids staff at Applicant's web site in determining the expert's qualifications to contribute content objects to Applicant's web site. An expert can also refer web site staff to a URL by way of box 412 in order to submit content such as submitting an on-line resume for the expert, or to submit sample published content objects in order to discern qualifications of the expert.

Experts submit information to Applicant's web site via form 394 which pertains to the expert in order to enable staff at Applicant's web site to make decisions about whether the contributor is truly an expert. Furthermore, staff can determine whether the contributions from this contributor should be added to Applicant's web site.

Information collected from form 394 is then stored in a database at Applicant's web site. For the case where Applicant's web site charges an expert a hosting fee in order to keep the expert's content within Applicant's system, the expert's credit card information is obtained from form 394 and the expert is charged a hosting fee, such as a monthly or one-time fee.

For the case where an expert's content is based upon "fee-for-access", Applicant's web site collects fees from users of the expert's content, and where revenue is shared with the contributor (or expert), payments are made to the contributor by issuing a credit against the credit card which is provided within form 394. In this manner, a need to issue checks is eliminated, and a fully automated transaction process is implemented via form 394. From a contributor's standpoint, the contribution of content into Applicant's web site will most likely reduce the credit card balance, in some cases even necessitating the credit card company to disburse money back to the expert who holds the credit card.

Figure 34B:
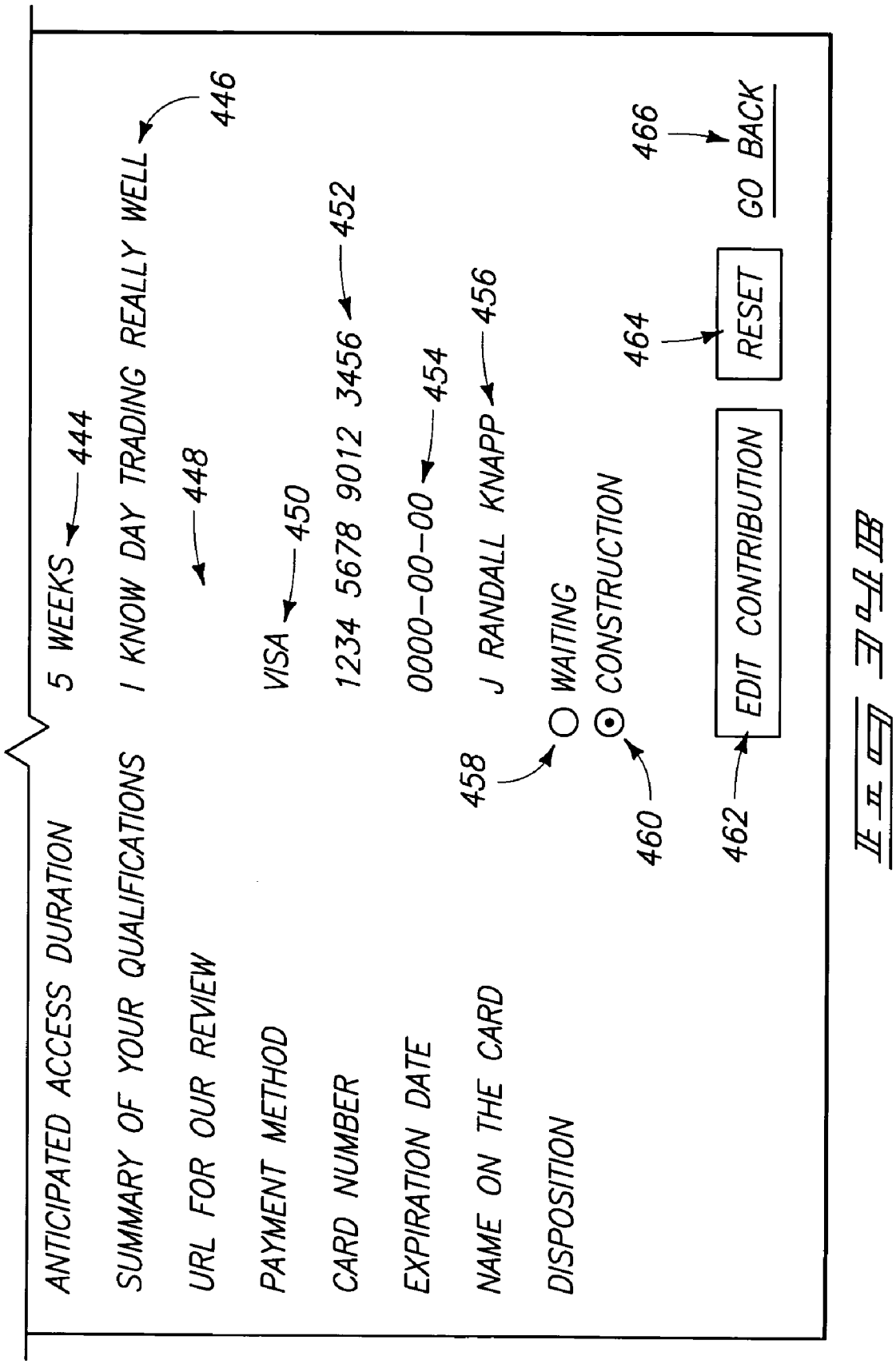

FIGS. 34A-34B, assembled together according to FIG. 33, comprise a diagram of a screen display showing an approval administrative page 429 where a contributor is approved by an administrator or authorized staff of Applicant's web site. Once a contributor has submitted their information by way of contributor form 394 (of FIG. 32), staff at Applicant's web site are able to use administrative page 429 to review the contributor's qualifications, discuss details with the contributor by way of e-mail, and to decide whether to accept the contributor's contribution by importing it into Applicant's web site where it is made available to users.

More particularly, a contributor e-mail link 430 allows an administrative user to send e-mail to the contributor in order to send comments and inquiries to the contributor by way of a separate e-mail client. A particular type of contribution is identified textually within field 432 as a "tutorial". A title for the contribution is identified by field 434 as "day trading". A description of the contribution is provided within description field 436 as "something about day trading". A department is described within a department field 438 shown as a "business" department. A URL field 440 enables the display of an associated URL for an existing document, although none is shown within field 440 of FIG. 34. An anticipated access fee is shown in "access fee" field 442; here the anticipated access fee is $5.00. An anticipated access duration is shown within an "access duration" field 444, here listed as five weeks. A summary of a contributor's qualifications is provided within contributor qualifications field 446. A URL for review by the administrator and/or staff is provided within URL field 448, although none is shown in FIG. 34. A payment method is provided within credit card field 450, with a corresponding credit card number provided within field 452, an expiration date provided within field 454, and a credit card user name provided within field 456.

Furthermore, disposition of a contribution is categorized by one of radio buttons 458 and 460. Waiting radio button 458 indicates that the editable contribution is waiting for review by the administrator. Selection of "construction" radio button 460 indicates that the staff has approved the contributor, which changes the status of the content object to "construction". Once this has occurred, the contributor can make their contribution. Accordingly, Applicant's web site controls the approval process, and only approved contributors can contribute content objects. After the contributor has been approved, a related content object is added to the contributor's list of contributions. This list of contributions is accessed within the contributor's personal web page, or personal How-Zone, and the contributor can begin to create, upload, and/or link to the contributor's content.

Administrative page 429 also includes an "edit contribution" button 462 which edits the content on the administrative page during the approval process of the contributor. A "reset"

button 464 enables the administrator to reset details on the administrative page. A "go back" link 466 enables the administrator to navigate back to exit this function without making changes.

H. Distribution of Content Objects to an Audience

FIG. 35 is a diagram of a screen display illustrating a "business" category placed within the category network, or category tree, of Applicant's web site. It is understood that Applicant's web site, HowZone.com, does not solely interact with users who access Applicant's web site. Instead, the content on Applicant's web site is delivered to certain users by establishing a visually perceptible presence where the users are connected to a network or users are visiting or shopping. In order to implement this feature, components of Applicant's web site and category tree are broken down into component parts by selecting relevant sub-categories of Applicant's category network, and utilizing a subset of the total number of content objects provided on Applicant's web site. Partner web sites embed the resulting sub-categories, or pages, into the partner web site.

Additionally, Applicant's system utilizes specific content objects by putting the content objects into a self-contained HTML content delivery device, or content bomb, that is posted on a third-party web site. Applicant's system also places labeling, or tokens, on products that are located in bricks-and-mortar stores, such as on store shelves, thus making it easy for users to identify relevant content objects of interest in an actual, physical marketplace.

Accordingly, several distribution techniques and procedures are provided for placing content objects at visible locations, in front of a relatively large audience of potential consumers. As shown in FIG. 35, users navigate into Applicant's web site, HowZone.com, where they encounter content objects within a category network that are arranged according to a category tree structure, as described above. Typically, a user will start at the top of the category tree; for example, a user might start at "top" link 190, then navigate down to the "business" category identified by "business" present page identifier 192.

According to some prior art techniques, web traffic is developed by creating a web site, and traditional advertising and coupon offers are used to drive traffic to the created web site. However, this is a relatively expensive proposition for a company.

Applicant's web site, HowZone.com, uses a category system as described above which has a multiple point-of-entry (POE) capability which supports co-branding, and which lets Applicant's web site create partner-specific pages, wherein a partner can embed such pages in their respective web site.

FIG. 36 is a diagram of a screen display showing the multiple point-of-entry (POE) capability of Applicant's web site. As shown in the screen display of FIG. 36, the "top" category link of FIG. 35 is not illustrated in FIG. 36. Additionally, the screen display of FIG. 36 illustrates co-branding, wherein header 1148 illustrates the web site as "ABC Office Products". Accordingly, "ABC Office Products" is a partner that is promoting one or more links to Applicant's web site, wherein the partner can maintain a user's focus on content objects that are relevant to the partner's business and which appear like their own web site.

Partners for Applicant's web site then select which categories to list within their portion of the category tree within Applicant's web site.

The partners then select which content objects to place within those categories. The partners generate commerce offerings for inclusion on the pages. For example, content box 160 illustrates one such commerce offering. Furthermore, the partners select co-branding page appearance for their portion of the category network present on Applicant's invention. The specifics of such category tree are illustrated within site navigation bar 150, as well as within listing box 154. Applicant's web site furthermore provides a partner with a URL which the partner can use in order to link to a personalized section of the category tree for Applicant's web site.

In operation, the partner (here, "ABC Office Products") drives user traffic to the pages which correspond to their personalized section of Applicant's category network. Users can then add content to their personalized HowZones when viewing the partner web site.

Each category page present within the category network of Applicant's invention is accessed by way of a web browser by entering a URL. If a category identification (cid), or I.D., is appended to the URL, then the user will enter the category network at that location.

For example, if a user goes to a URL entitled "http://www.HowZone.com", the user will be at the top of the category tree. If the user goes to a URL of "http://www.HowZone.com?=cid3", they will be at a category I.D. 3, and no "up-tree" path will appear to the user. It is understood that Applicant's web site will prepare branches of the tree for specific partners, and the partners will be linked to the branches by specifying the appropriate "cid" number.

FIG. 37 is a diagram of a screen display showing one alternative method for distributing content to users through one type of distributed information access point. More particularly, a content object distribution mechanism comprising a content object banner 238 is shown embedded within a co-branded web site. Banner 238 is viewed by generic browser overlay 140, and contains a co-branded header 1148, identifying the partner as "ABC Outdoor Equipment". Banner 238 is displayed alongside ABC web site content 457 displayed on the "ABC Outdoor Equipment" web site.

Details of banner 238 were described previously with reference to FIG. 8. According to such description, banner 238 includes a scrolling list 242, a "join" link 246, and a "MyHowZone" link 248. Banner 238 also includes header 148, which indicates the source of banner 238 as identifying Applicant's web site, HowZone.com. The display and distribution of banner 238 by way of third-party web sites provides an interface for users. First, users can read content object descriptions in a pop-up window, then users can click on the "Add to your personal HowZone" link 222 of FIG. 12 in order to add the corresponding content object to their personal web page, or personal HowZone. Secondly, users can join and obtain a free personal web page, or personal HowZone, if they don't already have one. Thirdly, users can access their personal web page, or personal HowZone, by way of link 248. Even furthermore, users can jump to Applicant's web site, HowZone.com, by clicking on header 148, which also serves as a link that enables a user to navigate to the home page of Applicant's web site.

As shown in FIG. 37, banner 238 provides an additional distribution method over that previously disclosed with reference to FIG. 36. In operation, partners of Applicant's web site, such as "ABC Outdoor Equipment", will select individual content objects which they feel will aid the partner in selling more products and/or services to users. Staff at Applicant's web site then put these content objects in a menu selection structure within a "snippet" of HTML.

Banner 238 provides one snippet of HTML in which the menu selection structure is found. Accordingly, banner 238 provides a portable piece of HTML which is put onto a web page that is frequented by users who are potentially interested in the selected content objects. Typically, such users will be interested in buying products that are sold by the partner of Applicant's web site, in this case "ABC Outdoor Equipment".

It is further understood that a portable piece of HTML may be distributed using a banner ad, as shown in FIG. 37. However, it is also understood that a "snippet" of HTML can further comprise stand-alone HTML tables of various shapes and sizes and containing similar information and links. It is even further understood that the same information and links can take the form of text containing hypertext links which can be embedded anywhere within any web page.

It is understood that the use of banners enables the selling of products. However, banners oftentimes are ignored by users who navigate through a third-party web site. By inserting "snippets" of HTML in the form of "distributed How-Zones", Applicant's web site dispenses know-how, which in turn sells products to users of partner web sites. Accordingly, the enhanced banners 238 distributed by Applicant's web site are generally welcomed by users, and are not ignored. One reason for such banner 238 not being ignored is that traditional functionality is associated with banner 238 because the banner provides the ability to obtain a personal web page on Applicant's web site. Accordingly, content objects can be accumulated and/or aggregated by a user where they can later retrieve such content objects through the collected association of links which have been distributed thereto.

For purposes of this disclosure, the enhanced banner 238 is referred to as a "distributed HowZone" which includes self-contained HTML, wherein the self-contained HTML provides a link to one or more servers associated with Applicant's web site.

Enhanced banner 238 illustrates one exemplary menu selection structure comprising a scrolling list 242. However, it is understood that the menu selection structure can take any of a number of different forms, including pop-up menus and multiple pop-up menus in which one pop-up menu is embedded in a second pop-up menu, hereinafter referred to as a "pop-up content bomb". Irrespective of the format of the main selection structure, a user can navigate through a menu selection structure, view content detail pages, and choose content objects.

Once a user has selected an element from within enhanced banner 238, a pop-up window provides a description, as in FIG. 12, and a link, such as link 222 of FIG. 12, which the user clicks on in order to add the selected content object to the user's personal web page, or personal HowZone. Accordingly, enhanced banner 238 provides a "distributed How-Zone" to users of co-branded web sites, as well as to users of Applicant's web site. Such enhanced banners 238 can also be enabled with a logon function by way of link 248 which enables users to access their personal web page. Furthermore, such enhanced banners 238 can be enabled with a "join" function by way of link 246 which enables a user who does not presently have a personal web page on Applicant's web site to link to Applicant's web site so that they can obtain such a personal web page. It is further understood that content object selections made by a user from any distributed How-Zone found on any third-party web site are centrally aggregated into that user's personal HowZone. It is even further understood that the user can access their personal HowZone from within any distributed HowZone on any third-party web site and it will contain all content objects selected by that user from any distributed HowZone or from the HowZone.com web site.

The above features are provided by using a content library, as previously disclosed, which contains content object detail pages having a selection link. A user accesses any of these content object detail pages by inputting a URL that is provided in a specified format. One exemplary format is as follows:

http://www.HowZone.com/contentdetail.php3?cid=9

The above URL requests a detail page, and provides a content I.D. (cid).

The corresponding links on specific items appear in the menu selection structure of enhanced banner 238. When users click an item, the associated content detail page is displayed in response thereto. Accordingly, enhanced banner 238 provides a portable piece of HTML that may be distributed by banner ad distribution companies such as DoubleClick, Inc., which is located at 450 W. 33rd Street, New York, N.Y. 10001. Details of such advertisement distribution over networks is described in U.S. Pat. No. 5,948,061, assigned to Double-Click, Inc., herein incorporated by reference.

FIG. 38 is a simplified schematic diagram showing a point-of-purchase customer, or user, 468 encountering a product package 459 on which a content distribution token 461 is applied. Token 461 includes a web site identifier 463 and indicia 465. Indicia 465 provides a distribution mechanism that is associated with at least one content object. User 468 enters a personal user number and indicia 465 in order to cause distribution of the associated content objects to be distributed to the user's personal web page within Applicant's system. Further details on how the indicia are entered in order to induce the distribution are described below in greater detail with reference to FIG. 39.

As shown in FIG. 38, product package 459 contains a label, or token, which is provided in a visibly perceptible location on package 459. Optionally, token 461 can be applied or printed directly onto a product. Even further optionally, token 461 can be provided on a brochure, pamphlet, leaflet, billboard, or other advertising circular, or for that matter, on any visually perceptible medium from which the user can visibly discern indicia 465. Accordingly, such indicia can be submitted to Applicant's web site and server by way of a wireless web appliance 467, as previously described above with reference to FIG. 1.

According to one implementation, product package 459 represents a product which is sold by a partner of Applicant's web site at a "bricks-and-mortar" physical store. In addition to having product features printed directly on the product package, token 461 comprises a label that is adhered and/or printed onto the box or package 459. Furthermore, such label is reprinted in product documentation and on the product itself.

Accordingly, token 461 enables yet another distribution technique for distributing the location of content objects to users by way of Applicant's system and web site. Partners of Applicant's web site will select individual content objects they think will help them sell the product within product package 459. Staff at Applicant's web site then associate these content objects by way of database records containing links to content on Applicant's web site servers, or located elsewhere. These content objects are associated one to the other, and the staff generate a product-specific identification number that corresponds with an aggregated set of content objects, comprising indicia 465. Such staff maintain the association as long as the partner relationship exists.

Accordingly, Applicant's web site provides a web-based user selection facility, wherein the entering of indicia 465 selects the associated content objects, and puts links to the content objects in the user's personal web page. Optionally, the content objects can be directly distributed to the user's personal web page in response to receipt of indicia 465 being delivered from the user via appliance 467 and Applicant's web site.

Applicant also provides artwork representing the logo for Applicant's web site, as well as product-specific indicia 465, representing an identification number relating to Applicant's web site and which relates to the product, and which can be placed on the product packaging, on product documentation, directly on the product, or on the partner's web site. Furthermore, the indicia 465 can be placed in advertisements that are distributed by the partners or by other third parties.

As shown in FIG. 38, users 468 encounter indicia 465, comprising identification numbers, while they are shopping at a bricks-and-mortar store, or while they are reading a paper or other written material. The user then connects to Applicant's web site, HowZone.com, via wireless web appliance 467.

A user selection facility as described above supports web-enabled appliances, such as a web-enabled cell phone, as well as standard web browsers. Depending on the type of user, separate facilities are provided to support access. Also, content objects which are associated with a product-specific indicia 465 may include one or more of the following: user guides for complex products, on-line warranty registration interfaces, service request interfaces, support interfaces, tutorials, tips and tricks, application guides, and maintenance reminders.

A web-enabled cell phone facility provides limited access to one specific web site whose only purpose is accepting input from indicia 465 by users, comprising identification numbers.

It is understood that users connect to Applicant's web site by way of a web cell phone or a web personal computer. Such users can input their user identification and a product-specific identification number comprising indicia 465. Applicant's web site and system put the content objects associated with the product-specific indicia 465 into the user's personal HowZone. Alternatively, Applicant's web site and system place links to such content objects in the user's personal web page. Accordingly, users consume the content objects, directly or indirectly, and the users are enticed to buy more product which is associated with token 461.

FIG. 39 illustrates in greater detail a user interface 470 for wireless web appliance 467. More particularly, user interface 470 includes a screen display 472 comprising a "select cdtoken" element 474, a "token indicia" element 476, a "user I.D." element 478, and a "go" button 480, and a key pad 482. Element 474 indicates to a user that they are to select information off a particular token with indicia 465 (of FIG. 5) being entered within "token indicia" element 476, and a user identification being inserted within "user I.D." element 478. "Go" button 480 is selected in order to submit the corresponding indicia and user identification to Applicant's web site, wherein the corresponding content objects are loaded into Applicant's personal web page corresponding with the indicia which has been submitted thereby. Key pad 482 enables a user to selectively configure screen display 472 so as to add required information and submit such information therein to Applicant's web site.

I. Content Linking, Uploading, and/or Delivery

FIG. 40 is a diagram of a screen display illustrating a personal web page, or personal HowZone, 1198 configured for user "John Knapp". A user identifier 1200 is provided within site navigation bar 1150 entitled "Personalized for John Knapp". Links 202, 204, 206, 208 and 210 enable navigation through additional web pages of "John Knapp's" personal HowZone.

As shown in FIG. 40, "contributions" link 204 is being selected by user "John Knapp" by way of personal web page 1198. Once a user has volunteered to be a contributor to Applicant's web site, and the contribution has been approved by the staff at Applicant's web site, a contributor can access their contributions page by way of their personal web page 1198 via link 204.

If a user wants to manage a content contribution, the user accesses their contributions by selecting link 204. Individual content object links such as link 254 are displayed within box 212. Additionally, further details of each content object can be obtained by selecting an associated "more" link 486 that opens a new screen display (not shown) containing more information about the content object.

Applicant's web site stores information about content objects, as well as contributors, in databases. All access to these databases is implemented by way of a web browser such as Netscape Navigator or Microsoft Internet Explorer. Applicant's web site makes no distinction between users and contributors, such as between students and teachers, and therefore everyone can be both a student and a teacher.

Each user's personal web page, or personal HowZone, holds both content objects that they have selected, as well as content contributions they have made to Applicant's web site. In the latter case, the content contributions are accessed by way of a link which is found within their personal web page, such as by way of content object link 254.

The content upload and delivery system of Applicant's web site supports the upload and storage of web content onto servers at Applicant's web site. Furthermore, the content upload and delivery system supports the storage of links to web pages within a database. The management of this content is done by individual users, using their personal web pages. Furthermore, the content is approved by staff at Applicant's web site using the administrative page 585 of FIG. 52. In operation, individual users access content from within their personal web pages, such as from web page 1198 of FIG. 40.

Figure 42A:
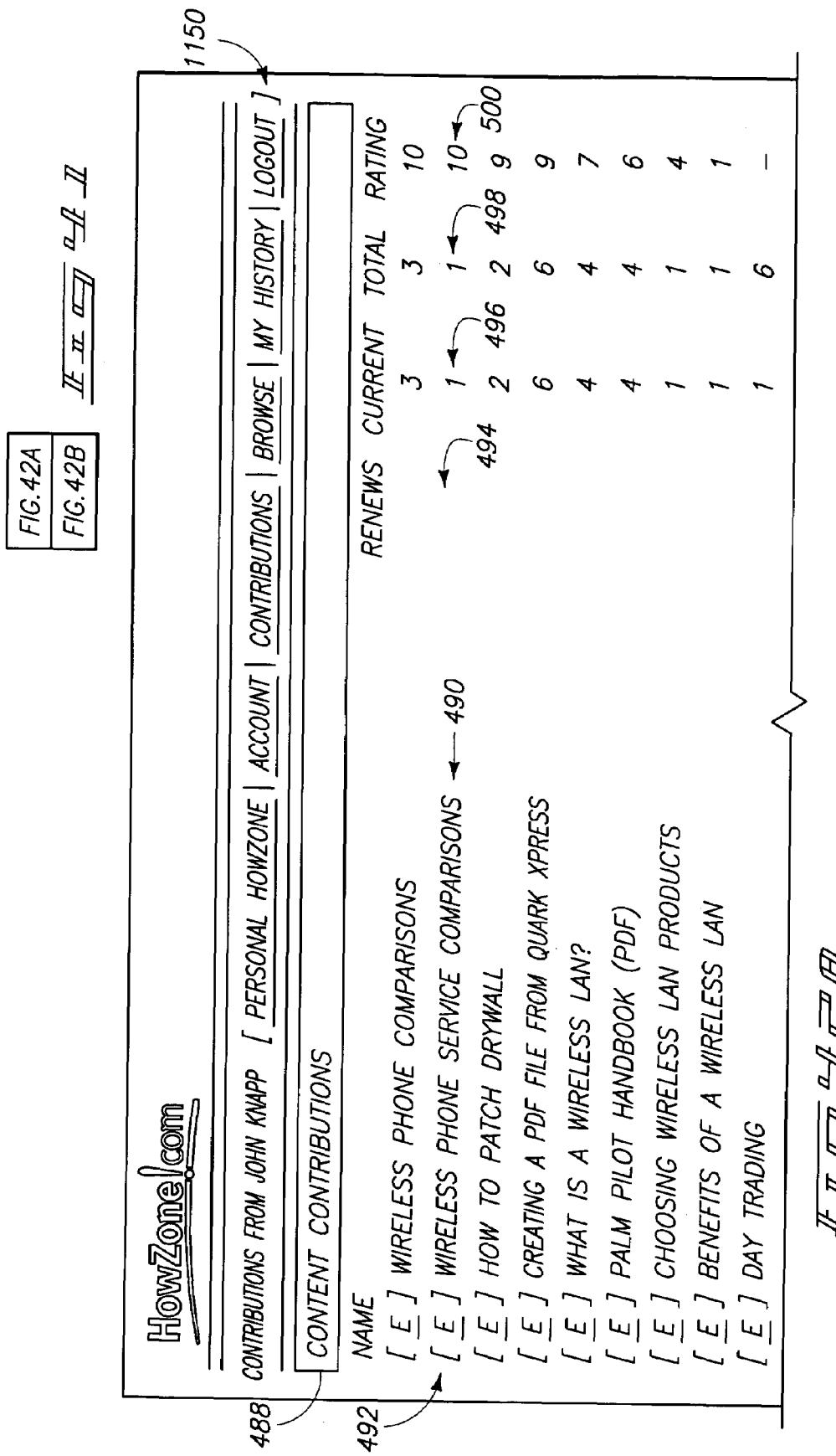

FIG. 42 is a diagram of a screen display showing content contributions that a user has made to Applicant's web site. More particularly, FIGS. 40A and 40B, assembled together according to FIG. 41, form another screen which is accessed by selecting link 204 in FIG. 40. Accordingly, a user can visually identify a listing of all content contributions that they have made, as well as statistics associated with each of the listings. More particularly, an exemplary "wireless phone service comparisons" contribution 490 is shown associated with an "edit contributions" link 492 which enables editing of such contribution. Furthermore, contribution 490 is associated with the following information: renewals by way of a renewals field 494, current number of users by way of a current users field 496, total number of users by way of a total users field 498, and ratings by way of an average rating field 500.

A user can select a single, specific contribution which they desire to manage by simply clicking on link 492.

It is understood that contributions only appear within the listing of FIG. 42 after the contributor has been approved by the staff at Applicant's web site according to the techniques previously described above. The content contributions listing, provided beneath content contributions heading 488, and all related statistics, are stored in a database, and the page which is displayed to a user is dynamically generated, and contains current information. A user selects a content object they wish to manage, then clicks onto the link associated with that content object, such as link 492.

It is understood that several different types of content objects are provided within Applicant's web site and system.

Several types of links include links to external web pages, links to discussion forums, "tools" like maintenance reminders and on-line warranty registration interfaces, and "tutorials".

By example, a tutorial content object comprises a set of web files, a tutorial specific discussion forum, and student note-taking tools, as well as external web page links. All of the above are stored within Applicant's web site and system. These web files, tools and links are displayed to a user through a content delivery mechanism provided on Applicant's web site, within a standard web browser using JavaScript capabilities. A "go back" link 502 is also provided, enabling a user to navigate back to the screen display of FIG. 40.

FIG. 43 is a diagram of a screen display showing a link content builder page 504 provided for a content object type comprising a link. All other content object types, except for tutorial content objects, use a similar content builder page.

As shown in the screen display of FIG. 43, link content builder page 504 includes a "date created/modified" field 506, a contributor profile entry box 508, and other information associated with building content, such as a content title field 509, herein described as "How to Clean a Clogged Drain". Additionally, page 504 includes a URL entry box 510, a "test URL" link 512, an "Exit, Not Done" button 514, and a "go back" link 518.

When a contributor wishes to manage a contribution that takes the form of a link, or any other type of content object, save for a tutorial, the user uses a page such as page 504 in FIG. 43.

The contributor inputs their personal profile by typing, or entering, the profile in a standard web page text entry field provided within contributor profile entry box 508. The contributor then inputs a full URL which will become the link that a user retrieves in order to follow and access the content object using Applicant's web site.

If a contributor is finished with working on a content object at the present time, but the content object is still not ready for a user, the contributor can click "Exit, Not Done" button 514 so they can save their work, leave and come back at a later time in order to finish work on this content object.

If a contributor is done with the work on the content object and is ready to submit it for approval, the user can click on "Exit, Done!" button 516. However, it is understood that approval by staff at Applicant's web site may or may not be required, based upon work flow rules that have been established by Applicant's web site.

The above-described information is then stored in a database, and the associated page that a user sees is dynamically generated, with the page containing current information.

In most cases, a contributor will want a user to know about the contributor. In order to meet this user desire, the contributor will input a profile within contributor profile entry box 508. The contributor wants the users to be able to access content so they also input a URL into box 510.

At this stage in the work flow process, a contributor can only modify their profile and the link to the content object. Applicant's web site and staff maintain control over the other elements which are displayed in non-editable form on page 504. The only way to change the other non-editable elements is by using Applicant's web site administrative page which is shown below in greater detail with reference to FIG. 52.

FIG. 44 is a diagram of a screen display illustrating another personal web page 198. A content object access link 520 entitled "How to Clear a Clogged Drain" is provided within box 212 and is associated with a "more" link 522. Upon completion and approval of the content object assigned to link 520 by staff at Applicant's web site, the content object appears within the category network of Applicant's web site, and associated web pages. Therefore, a user can select the content object by way of the associated links which are provided embedded within Applicant's web site. This enables the user to add such content object to their personal, or personalized, web page 198, and the URL that is input by the contributor by way of the content builder page in FIG. 43 is assigned to a hypertext link within the user's personal web page.

FIG. 45 is a diagram of a screen display showing a content object that a user has accessed from within their personal web page of FIG. 44 which is accessed by selecting content object access link 520 within FIG. 44. In response thereto, the corresponding content object is presented to a user by way of a separate window 530 comprising the screen display of FIG. 45. More particularly, screen display 528 is generated when a user selects link 520 in FIG. 44 from within their personal web page 198. As a result, the content object is loaded into the user's web browser. The page is loaded into a window which is separate from the one containing the user's personal web page.

Accordingly, screen display 528 comprises a separate window from the user's personal web page. The content object types are loaded into separate windows so that a user always has access to their personal web page by merely selecting the other window in which the personal web page is displayed. After a user is done reviewing a content object within screen display 528, the user then closes window 530 in which screen display 528 is presented to the user.

As shown in FIG. 45, individual content objects are loaded into a standard web browser window 530, and a user is free to manipulate any links that are found within this content object.

For the case of discussion forms or other types of content objects that require a user identification, Applicant's web site and system passes a user identification number into the content object by appending the user identification as an argument onto the link. For example, one appended exemplary user identification link comprises "http:URLaddress.com?userid=1". Accordingly, a user is not forced to use a second login process. Therefore, access to a personal web page requires login by a user so that Applicant's web site and system know and can monitor the identification of a particular user.

FIG. 46 is a diagram of a screen display showing a content builder page 1504 for a "tutorial" type of content object similar to the content builder page 1504 for the "link" type of content object of FIG. 43. For the "tutorial" type of content object, content builder page 1504 includes a contributor profile and a contributor profile entry box 534 in which a potential contributor can input their profile information. A content type field 536 identifies the content type as a "tutorial". A content elements box 538 contains contributed content elements by indicating file names or links, when such content elements were added, as well as when such content elements were last modified. As shown in FIG. 46, no content elements are present within box 538 because the screen display of FIG. 46 shows link content builder page 504 at an initial stage where a "tutorial" type of content object is just starting to be built by a contributor.

The screen display of FIG. 46 differs from a screen display showing how content is built for content objects other than a tutorial. For example, content builder page 504 of FIG. 43 shows how content is built for a "link" type of content object. In contrast, link content builder page 1504 of FIG. 46 shows how content is built for a "tutorial" content object. When a contributor has been approved for a "tutorial" type of content object, and the contributor is ready to create a tutorial, the contributor uses the content builder of FIG. 46 in order to upload and, later, manage web files for the contributor's tutorial.

As shown in box 538, when a potential contributor first begins, the contributor is presented with an empty content elements box 538. An "add page" link 541 enables a user to begin the process of adding a tutorial which will be stored within the Applicant's web site and system. It is understood that contributor profile entry box 534 is essentially the same as contributor profile entry box 508 (of FIG. 43).

The information displayed in the screen display of FIG. 46 is stored in a database that is associated with Applicant's web site. A user sees a page that is dynamically generated and which contains current information that is contained within the database. In operation, a contributor adds a profile, then uploads pages to Applicant's web site and system, more particularly onto one or more servers for Applicant's web site.

FIG. 47 is a diagram of a screen display in which a local file selection dialog box 537 is shown opened, wherein a user is in the process of selecting a file from the user's hard disk on a client. By selecting one or more files in a box 537, the user can upload information to the content builder on Applicant's web site. The user uploads files, then stores the files on a web server of Applicant's web site. As shown in FIG. 47, file selection dialog box 537 comprises a Macintosh dialog box which is enabled by a Macintosh operating system provided by Apple Computer, of Cupertino, Calif. However, it is understood that the appearance of the dialog box 537 depends on the operating system of the client computer.

As shown in FIG. 47, a file selection dialog box 537 is opened by selecting local file selection browse button 562 that is associated with either a page upload entry box 560 or a graphic upload entry box 564. By selecting one of browse buttons 562, file selection dialog box 537 is opened as shown in FIG. 47. A user then selects either a page or a file for graphic upload by selecting the item from within a file selection scrolling list box 550 utilizing a tactile input device such as a mouse.

By way of box 537, a user can select page or graphics files located on the user's hard disk drive via file selection scrolling list box 550. Additionally, it is understood that a user can generate such files ahead of time, then upload the files via box 537. An "eject" button 540 is provided within box 537 to eject a removable floppy disk from a client computer to facilitate uploading of a page or file. A "desktop" button 542 enables a user to navigate to the top of a user's file tree. A "cancel" button 544 enables a user to close file selection dialog box 537. An "open" button 546 enables a user to select a chosen file from file selection scrolling list box 550. The selected file is then added to the content builder add tutorial page 548 (of FIG. 48) before being uploaded to Applicant's web site.

The information contained within content builder add tutorial page 548 of FIG. 47 is stored in a database, and the page a user sees is dynamically generated and contains current information. As shown in FIGS. 46 and 49, content elements box 538 comprises an add/edit page, with such page supporting the upload of tutorial web pages and web graphics which may appear within the web pages of a specific tutorial.

It is understood that tutorials present within Applicant's web site and system are capable of containing any mix of pages which are stored within Applicant's web site, and links to external web pages. Each element present within a tutorial, including stored web pages and external links, has a title which is used by the tutorial navigation system of Applicant's web site as described below.

FIG. 48 is a diagram of a screen display including a content builder add tutorial page 548 showing a completed first tutorial content builder page, including graphics which are being uploaded to Applicant's web site, as selected by way of the screen display 548 including box 537 and button 552 of FIG. 47. Upon completion of the first tutorial, a user then uploads the resulting page to Applicant's web site by selecting "upload/reload page" button 552. Button 552 also enables a user to later modify a page, or graphics on the page, by selecting button 552 in order to reload the files. Accordingly, old files present on Applicant's web site and system are replaced by selecting button 552 during such an operation. A "go back" button 554 enables a user to navigate back to page 1504 of FIG. 46.

As shown in FIG. 48, a page title entry box 555 enables a user to insert a page title such as "Introduction". Additionally, as shown in FIG. 48, a tutorial page can alternatively comprise a remote web page by entering a URL within a remote web page URL entry box 556 (of FIG. 48). A "test URL" link 557 enables a user to test a URL that has been entered within a remote web page URL entry box 556 by navigating to the web page corresponding with the URL.

As shown in FIG. 48, a user can assign page order by manipulating the "appears" display order pop-up menu 558 in order to select a page order identifier such as "first", "last", or "after page number_____". It is understood that such pop-up menu is dynamically generated, and contains a listing of all current pages that are present within the tutorial. Accordingly, a user can select any one of such pages present within the tutorial, and can insert another tutorial page at a preselected location between such pages that are already present.

As shown in FIG. 48, a user can prepare tutorial pages one at a time, then upload the prepared pages by way of box 560 and button 552. It is understood that Applicant's web site and system does not include HTML editing tools. Instead, a contributor builds web pages and graphics using other software such as independently or commercially available HTML editing tools, then uploads the prepared web pages and/or graphics by way of the features provided in the screen display of FIG. 48.

FIG. 49 is a diagram of a screen display showing a resultant content builder page 1504 after a tutorial page has been uploaded to Applicant's web site in response to selecting button 552 of FIG. 48. As a result, the content is added onto page 1504. The addition of two pieces of content is shown in content elements box 538.

As shown in FIG. 49, contributor profile scrolling text entry box 561 contains a contributor profile entitled "I Know Day Trading Really Really Well". Content elements box 538 illustrates a page that has been added to the link content builder page 1504 as identified within file name field 565, "add graphics" link 567, a "date added" field 569, a "date modified" field 571, and a "delete" link 581. Link 581 enables a user of page 1504 to delete content that has been added within box 538. Content elements box 538 also illustrates a chart that has been added therein.

Additionally, a user is shown in the process of adding another page by selecting "add page" link 541 which navigates the user back to content builder add tutorial page 548 of FIG. 48. Accordingly, a user can continue to add pages to their tutorial using the features of content builder add tutorial page 548 (of FIG. 48). The resulting information is stored within a database. A user sees a dynamically generated page which contains current information. Accordingly, there is no practical limit to the number of pages that may be contained within a tutorial, except for limitations in memory associated with storing such pages.

As shown in FIG. 49, a user may delete any page they have added but no longer want by merely selecting "delete" link 581. Furthermore, a user may add graphics to an existing page, or they may edit an existing page, or an existing graphics object by selecting an edit content element link 563. However, it is understood that the editing of an existing page is limited to the following: changing the title of the existing page; changing the order of the existing page within the tutorial; and uploading a revised version of the existing page. Furthermore, it is understood that the editing of an existing graphic is limited to uploading a revised version of the graphic. Furthermore, it is understood that, within Applicant's web site and system, all uploaded elements for a specific tutorial are stored within a single directory present within the web server of Applicant's web site.

Figure 51B:
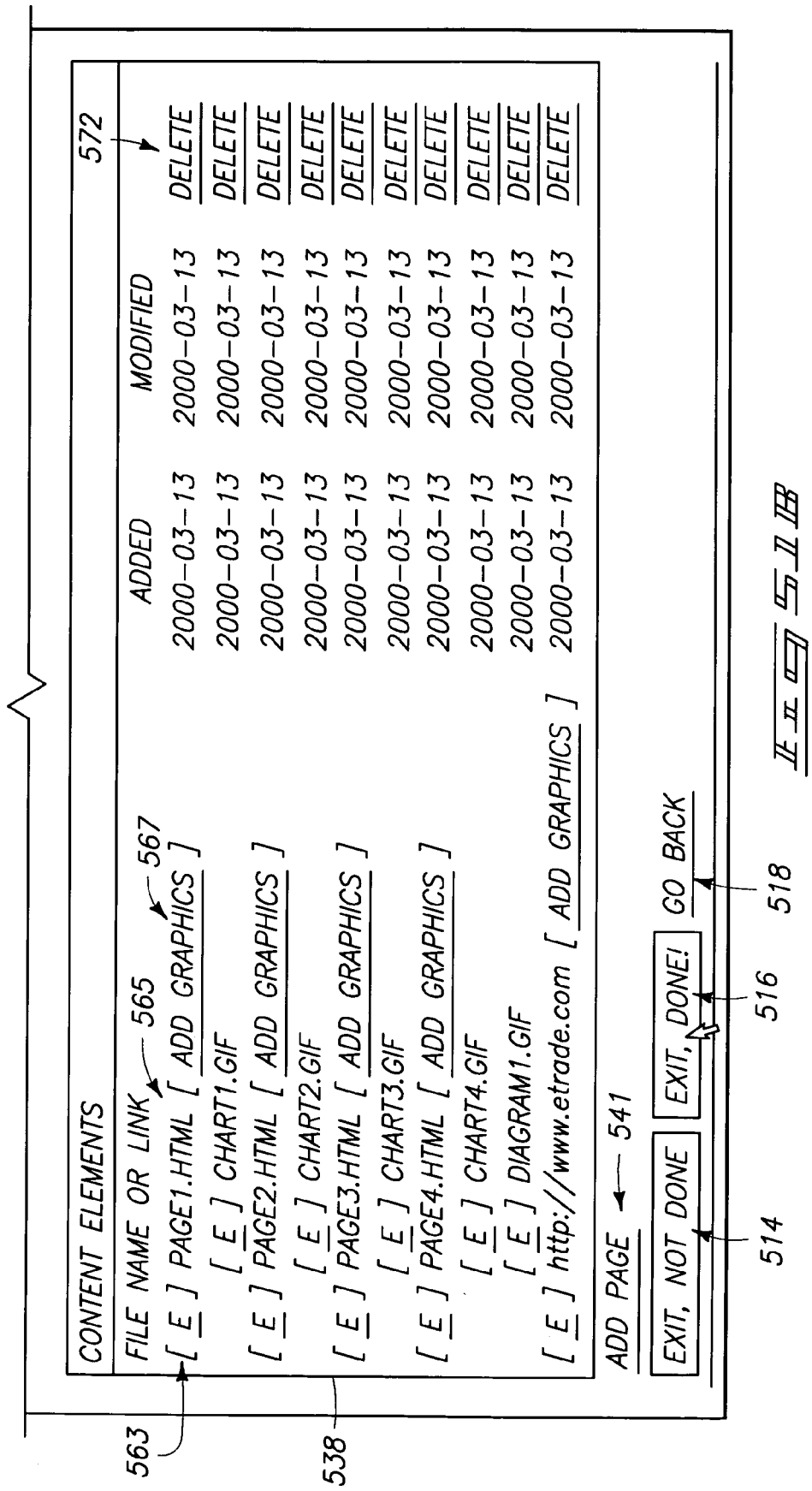

FIG. 51 is a diagram of a screen display illustrating a completed tutorial showing four pages and a link which have been added and saved into Applicant's web site and system. More particularly, FIGS. 51A and 51B, assembled according to FIG. 50, form another screen that shows a completed tutorial. After a user has completed adding content objects to their tutorial, the user then tells Applicant's web site that they are done by clicking "EXIT, DONE!" button 516. If the user is not done, but the user wishes to save the work that they have done by adding content objects to their tutorial, the user can return later by selecting "EXIT, NOT DONE" button 514, which saves their work at a location where they can later return to the work to continue adding content objects to the tutorial by way of "ADD PAGE" link 541. Furthermore, "GO BACK" link 518 enables a user to navigate backwards to the screen display of FIG. 42.

The information contained within page 1504 in FIG. 51 is stored in a database, and the page is dynamically generated when requested by the user and contains information read from the database as the page is generated. It is understood that the content elements displayed within FIG. 51 can include links to external files. The editing of such content elements will be limited to: changing the title of a content element; changing the order of content elements within the tutorial; and changing the URL associated with locating the content element. It is further understood that tutorials within Applicant's web site and system will have tutorial-specific discussion forms, and a student note-taking capability.

FIG. 52 is a diagram of a screen display showing an administrative page 585 that enables staff at Applicant's web site to approve a content object that is being contributed by a specific contributor identified by link 430. The type of contribution is identified by field 432. An approval team of staff members at Applicant's web site is provided with the ability to use private administrative pages, such as page 585, to issue approvals when a content object is completed. Such approval team staff members are provided with the ability to edit the name, description, location within the category network, URL, access fee (if any), and access duration (if limited). Such editing is carried out by way of modifying the content presented within title field 1434, description field 1436, department field 1438, existing document URL field 1440, suggested user access fee field 1442, and suggested user access duration field 1444. A "test URL" link 583 enables a user to test view the content provided at the corresponding URL within field 1444. Mutual selection of one of radio buttons 566, 568 or 570 enables an administrative user to selectively configure the disposition of such content object between a status of "under construction", "ready", and "open", respectively.

Link 430 provides an e-mail connection with the content provider which enables approval team staff members to discuss the content object by way of e-mail with the associated contributor, using one of a number of e-mail services presently available and understood within the art.

Once an approval team staff member at Applicant's web site has determined that the content object is ready to be approved, the staff member then sets the disposition to radio button 568, and clicks "edit contribution" button 1462. "Reset" button 1464 enables such staff member to reset the information provided within page 585. "Go back" link 1466 enables a user to exit the page without making any changes.

Information that is input by way of page 585 is stored within a database. The page that a user sees is dynamically generated, and contains current information read from a database as the page is generated. The approval team staff members at Applicant's web site are able to review and approve content objects in order to maintain quality and control of information that is compiled and disseminated by Applicant's web site to users. Additionally, administrative staff members can bypass the approval process if it is determined that such approval process becomes a bottleneck by slowing down distribution of information to users and by disabling such functionality from Applicant's web site.

FIG. 53 is a diagram of a screen display showing a content object type of tutorial via a tutorial content object page 572. A tutorial of page 572 contains at least one content object presented within a browser overlay 1140 that identifies Applicant's web site and navigation system. Such browser overlay is illustrated as being provided by a Netscape Navigator Version 4.5. However, it is understood that other types of browsers can also be utilized.

As shown in FIG. 53, a pop-up navigation menu 575 enables a user to navigate the content object of page 572 by selecting page titles which bring the user to a specific page of information of the content object. A "close" link 573 enables a user to close the content object of page 572. It is understood that this is one of many potential tutorial navigation and content object presentation methods. Other alternate systems are possible, such as placing navigational links beside or below content or within another browser window.

Once a tutorial has been approved and users select the content object so that it is linked and/or added to their personal web page, users can access the tutorial by clicking a link within their personal web page. Such link points to a display in navigation structure provided by browser overlay 1140 and comprising an HTML frame set with a dynamically generated navigation frame presented on top, and with content pages presented below, such as page 572. Accordingly, the individual tutorial pages, such as page 572, linked with, and/or stored within, the web server of Applicant's web site, are loaded into this display structure.

A user navigates pages, such as page 572, with the tutorial by using a JavaScript pop-up menu system, such as pop-up navigation menu 575, that is presented within the top frame of browser overlay 1140 within the display and navigation structure. Such information is stored in a database. Accordingly, the tutorial is displayed in a web browser window that is separate from the web browser window containing the user's personal web site.

FIG. 54 is a diagram of a screen display showing a dynamically generated pop-up navigation tool/window 574 comprising a window that can be opened by a user within the tutorial delivery system of Applicant's web site. In order to change pages, a user manipulates a tactile input device, such as a mouse, by clicking and dragging across a dynamically generated page list associated with a window of pop-up navigation tool/window 574. When the user releases their mouse, the selected page of the tutorial is presented within the associated bottom frame of page 572. For example, a user is shown releasing their mouse on a selected page 576 entitled "Preflighting Your Publication". Accordingly, the associated information is retrieved from storage within Applicant's system, and the page is presented to the user. Furthermore, it is understood that pop-up navigation tool/window 574 is formed using standard JavaScript techniques as is known within the art.

Figures 55, 56A:
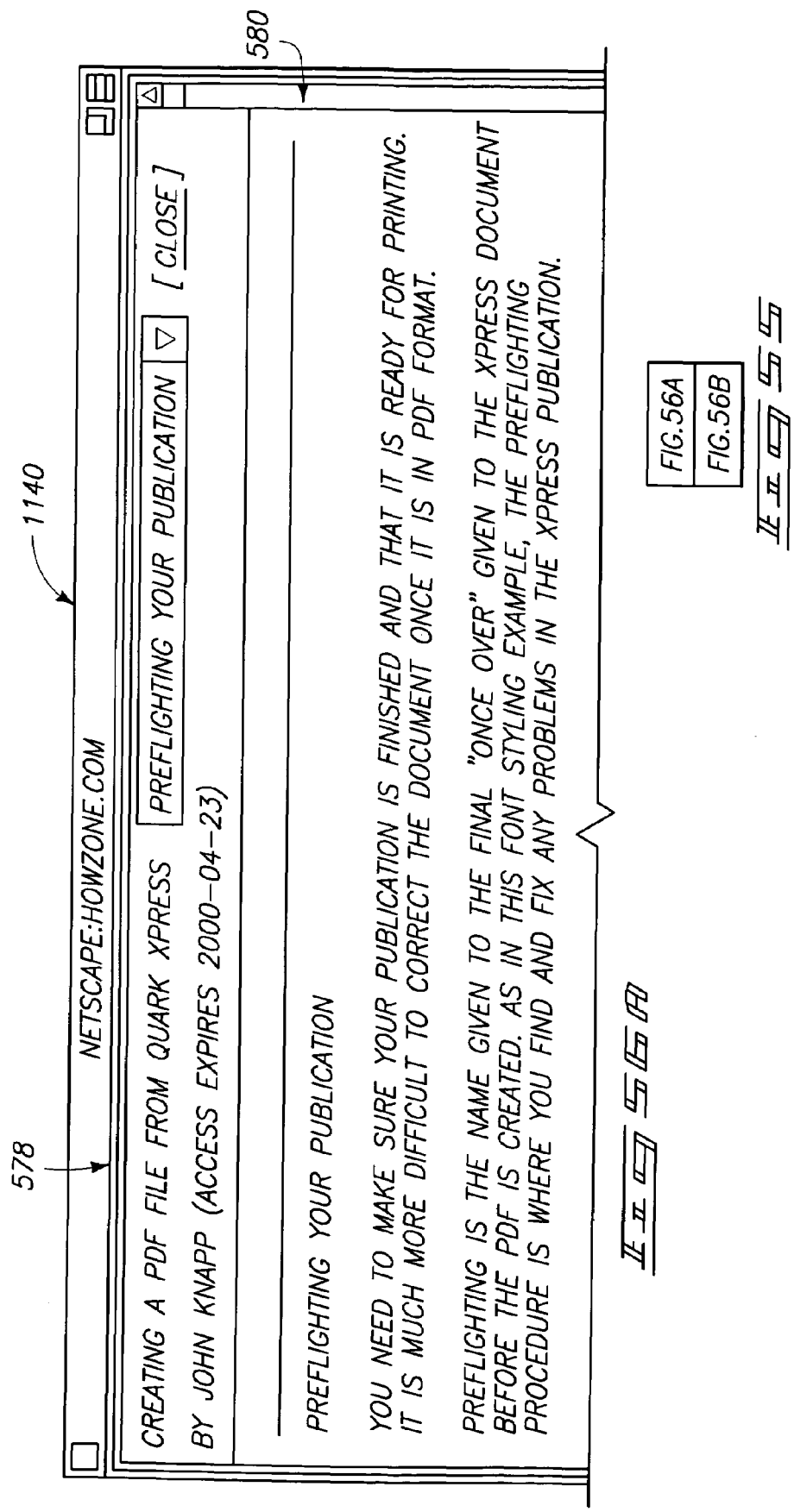

FIG. 56 is a diagram of a screen display showing another content object page 578 which has just been selected using the pop-up navigation tool/window 574 of FIG. 54. More particularly, FIGS. 56A and 56B, assembled according to FIG. 55, form another screen which shows such page 578 that corresponds with the selected page entitled "Preflighting Your Publication".

Figure 57:
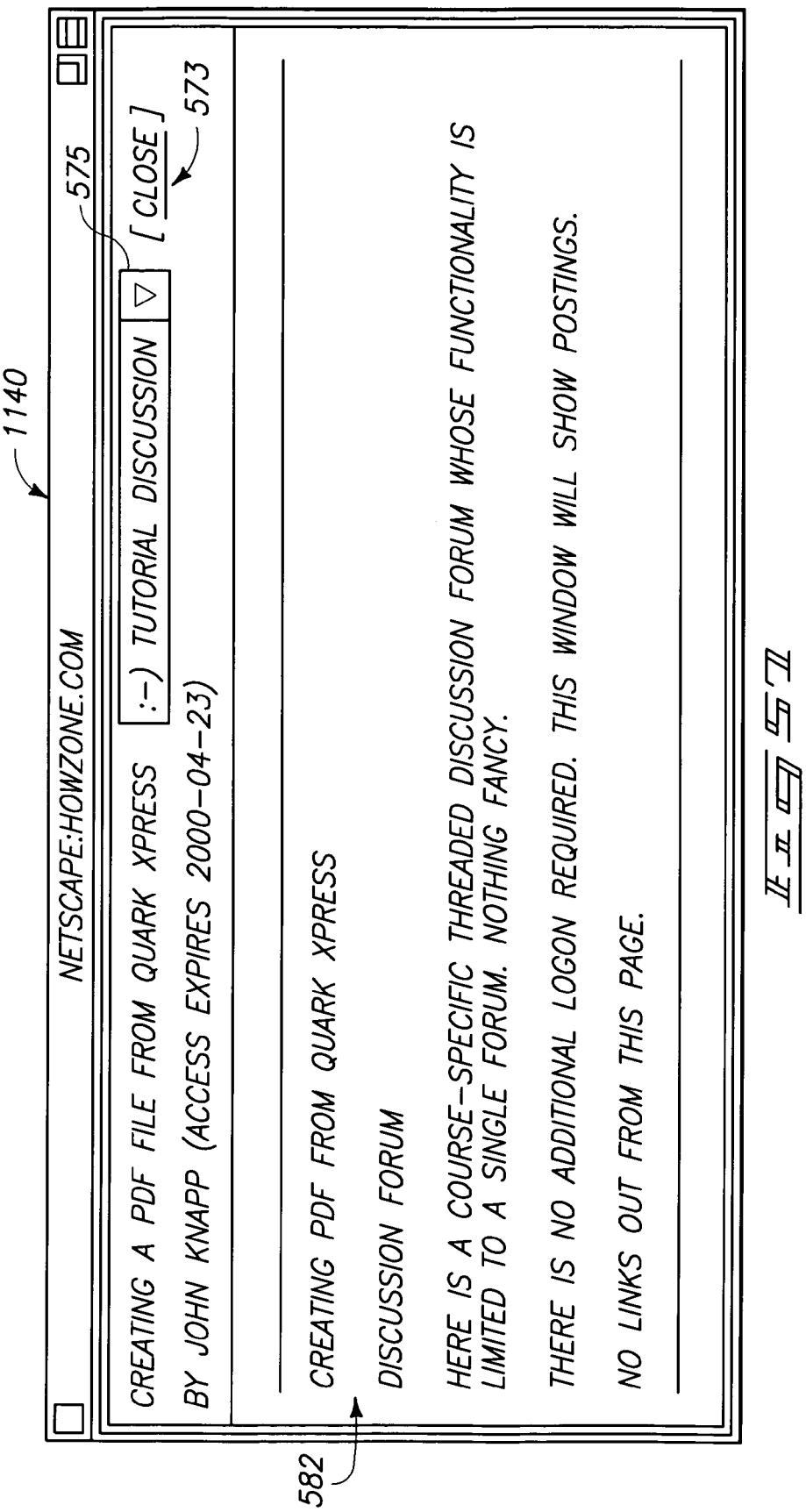
FIG. 57 is a diagram of a screen display showing a dedicated discussion forum that is provided with each tutorial, wherein users can discuss things that the users are learning.

FIG. 57 is a diagram of a screen display representing a dedicated discussion forum that each tutorial contains where users can discuss things that they are learning from the tutorial. A user can access the tutorial specific discussion forum by selecting it from navigation pop-up navigation menu 575. A user identity is passed to the forum so that the user does not need to log on to the forum, after previously having logged into Applicant's web site. Accordingly, a second login procedure is eliminated. The information associated with page 582 is stored in a database, and again, the information is dynamically generated and updated as often as every minute. It is understood that the discussion forum functionality provided by such tutorial discussion utilizes a separate application presently available from http://www.araxe.fr/w-agora. Such separate application is integrated within Applicant's web site.

FIG. 58 is a diagram of a screen display representing a student notepad page 584 that is provided with each tutorial. More particularly, each tutorial has a dedicated student note-taking function that is enabled by page 584, wherein users can keep their personal notes similar to notes that the user might write within the margins of a textbook that they are reading. Such functionality is navigated to by selecting "student notepad" within pop-up navigation menu 575. Accordingly, a user can access the tutorial note-taking tool, which is private and only accessible by such user, by selecting it via pop-up navigation menu 575. The corresponding information is stored within a database, and is updated dynamically as often as every minute. The private note-taking tool functionality utilizes a presently available application, such as that available from http://keilor.cs.umass.edu/diary/index.php3. Such separate application is integrated within Applicant's web site.

FIG. 59 is a diagram of a screen display showing the ability for tutorials to contain links to external web pages by selecting a Quark XPress external web page link 586 present within pop-up navigation tool/window 574. Accordingly, a user can access external web pages merely by selecting external web page link 586 via pop-up navigation tool/window 574, using the corresponding pop-up navigation menu 575. Again, the link to the external web page is stored in a database. Furthermore, the tutorial can consist exclusively of external links, wherein a listing of links is merely provided by such tutorial. Such facility, coupled with an access fee in commercial application, enables Applicant's web site the ability to deliver a complete pay-for-use content distribution system and method.

FIG. 61 is a diagram of a screen display showing an external web page 588 appearing within a tutorial display and navigation system of Applicant's web site. More particularly, FIGS. 61A and 61B, assembled according to FIG. 60, form another screen display showing web page 588 where a user selects an external web page, then loads it within a bottom frame of browser overlay 1140. The user may then manipulate any links that are found within the external web page, such as "support" link 590. The external web pages, present within a tutorial, appear within the same structure as tutorial pages that are stored within a web server of Applicant's web site.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An apparatus for distributing content objects to a personalized access point of a user over a network based environment, comprising:

a server including a database operative to store indicia associated with at least one content object and further operative to store user identifiers as well as information about which content objects have been selected by a particular user;

a selection client communicating with the server via a communication link and configured to allow a user to select content objects to add to a personalized access point by submitting an indicia and a user identifier to the server; and a retrieval client communicating with the server over a communication link allowing a user to retrieve information from a personalized access point;

wherein, in response to submission of the indicia and user identifier, at least one of: (a) a content object, and (b) a link to a content object are added to the personalized access point of the particular user and wherein the particular user can retrieve the content object through their personalized access point from the retrieval client.

2. The apparatus of claim 1 wherein the selection client is comprised of at least one of a personal computer, a wireless client, a networked cash register, a bar code scanner, and an electronic product code reader.

3. The apparatus of claim 2 wherein the selection client is configured to allow another person to interact with the selection client on behalf of the user.

4. The apparatus of claim 2 where the selection client is a wireless client, and further comprising a wireless network, and wherein the wireless client has a user interface operative to submit the indicia and the user identifier to the server.

5. The apparatus of claim 1 wherein the selection client comprises one of: a web page, a computer kiosk, and a computer readable file storage medium.

6. The apparatus of claim 1 wherein the selection client is further configured to accept payment of content access fees, wherein the payment enables access to the selected content for a predetermined length of time.

7. The apparatus of claim 1 wherein the retrieval client is further configured to limit access to content which requires an access fee if the current date is greater than the content selection date plus the pre-determined length of time.

8. The apparatus of claim 1 wherein the indicia is provided in a visually perceptible location on at least one of: a web page, an email message, a label, a brochure, a pamphlet, a product, product documentation, a product package, a billboard, a sign, and an advertisement.

9. The apparatus of claim 1 where the selection client is further operative to accept content contributions from a user.

10. The apparatus of claim 1 where the retrieval client is further operative to allow a user to manage any content contributed by them.

11. An apparatus for distributing content through one or more distributed information access points to a centralized access point of a user, comprising:
- at least one server operative to store one or more of: a) content, b) links to content, c) information about content, and d) information about users including information about which content a user has chosen;
- a centralized access point of a user accessible via a communications link and operative to provide the user with access to content chosen by or for the user;
- at least one distributed information access point accessible via a communications link and operative to implement one or more of: a) list one or more content objects, b) allow a user to choose content for addition to their centralized access point, and c) provide the user with logon access to their centralized access point; and
- an administrative interface in communication with the server and operative to create groupings of content into one or more distributed information access points;
- wherein a user is enabled with the capability to log on to their centralized access point from one or more distributed information access point(s) and access content chosen from one or more distributed information access point(s).

12. The apparatus of claim 11 wherein the distributed information access point comprises one or more of: a) a web page; b) a plurality of web pages; c) a portion of a web page; d) an email message; and e) a portion of an email message.

13. The apparatus of claim 11 wherein the distributed information access point is further operative to accept content contributions from a user.

14. The apparatus of claim 11 wherein the centralized access point is further operative to enable a user to manage any content contributed by them.

15. The apparatus of claim 11 wherein the administrative interface is further operative to manage content contributed by users.

16. A method of distributing content through distributed information access points, comprising:
- providing a database on a server accessible over a communication link capable of storing information about: a) content, and b) users;
- assembling content into one or more distributed information access points which are in communication with the database over the communication link;
- presenting one or more distributed information access points to one or more potential users at a visually perceptible location;
- selecting content from one or more of an entire range of distributed information access points for addition to a centralized access point of the particular user; and
- accessing the centralized access point of the particular user from one or more distributed information access points to gain access to the selected content.

17. The method of claim 16 wherein selecting and accessing are implemented by the particular user.

18. The method of claim 16 wherein the visually perceptible location comprises one or more of: a) an email message; b) a portion of an email message; c) a web page; and d) a portion of a web page.

19. The method of claim 16 wherein selecting content from one or more distributed information access points comprises using a device with a communications link to submit information to the database on the server.

20. The method of claim 19 wherein submitting information to the database on the server comprises submitting information about: (a) the selected content, and (b) the particular user.

* * * * *